(12) United States Patent
Mikami et al.

(10) Patent No.: US 12,315,923 B2
(45) Date of Patent: May 27, 2025

(54) POSITIVE ELECTRODE ACTIVE MATERIAL, METHOD FOR MANUFACTURING POSITIVE ELECTRODE ACTIVE MATERIAL, AND SECONDARY BATTERY

(71) Applicant: SEMICONDUCTOR ENERGY LABORATORY CO., LTD., Atsugi (JP)

(72) Inventors: Mayumi Mikami, Kanagawa (JP); Aya Uchida, Tochigi (JP); Yumiko Yoneda, Kanagawa (JP); Yohei Momma, Kanagawa (JP); Masahiro Takahashi, Kanagawa (JP); Teruaki Ochiai, Kanagawa (JP)

(73) Assignee: Semiconductor Energy Laboratory Co., Ltd., Atsugi (JP)

(*) Notice: Subject to any disclaimer, the term of this patent is extended or adjusted under 35 U.S.C. 154(b) by 0 days.

(21) Appl. No.: 17/729,170

(22) Filed: Apr. 26, 2022

(65) Prior Publication Data

US 2022/0255076 A1 Aug. 11, 2022

Related U.S. Application Data

(63) Continuation of application No. 16/611,791, filed as application No. PCT/IB2018/053274 on May 11, 2018.

(30) Foreign Application Priority Data

May 19, 2017 (JP) .................................. 2017-099871

(51) Int. Cl.
*H01B 1/08* (2006.01)
*C01G 53/00* (2006.01)
(Continued)

(52) U.S. Cl.
CPC ............ *H01M 4/525* (2013.01); *C01G 53/50* (2013.01); *H01B 1/08* (2013.01); *H01M 4/131* (2013.01);
(Continued)

(58) Field of Classification Search
CPC ............ H01B 1/00; H01B 1/08; C01G 53/44; H01M 4/0471; H01M 4/131; H01M 4/36; H01M 4/505
See application file for complete search history.

(56) References Cited

U.S. PATENT DOCUMENTS 4,302,518 A 11/1981 Goodenough et al.
4,668,595 A 5/1987 Yoshino et al.
(Continued)

FOREIGN PATENT DOCUMENTS

CN 001698222 A 11/2005
CN 001715193 A 1/2006
(Continued)

OTHER PUBLICATIONS

Jung et al "Improved electrochemical performances of LiMn0.05Co0.95O1.95F0.05 (M=Mg, Al, Zr) at high voltage", Electrochimica Acta 68 (2012) 153-157.*
(Continued)

*Primary Examiner* — Mark Kopec
(74) *Attorney, Agent, or Firm* — Fish & Richardson P.C.

(57) ABSTRACT

A positive electrode active material having high capacity and excellent cycle performance is provided. The positive electrode active material has a small difference in a crystal structure between the charged state and the discharged state. For example, the crystal structure and volume of the positive electrode active material, which has a layered rock-salt crystal structure in the discharged state and a pseudo-spinel crystal structure in the charged state at a high voltage of
(Continued)

approximately 4.6 V, are less likely to be changed by charge and discharge as compared with those of a known positive electrode active material.

49 Claims, 43 Drawing Sheets

(51) Int. Cl.
| | |
|---|---|
| C01G 53/50 | (2025.01) |
| H01M 4/131 | (2010.01) |
| H01M 4/133 | (2010.01) |
| H01M 4/134 | (2010.01) |
| H01M 4/139 | (2010.01) |
| H01M 4/36 | (2006.01) |
| H01M 4/505 | (2010.01) |
| H01M 4/525 | (2010.01) |
| H01M 6/16 | (2006.01) |
| H01M 10/0525 | (2010.01) |
| H01M 4/02 | (2006.01) |

(52) U.S. Cl.
CPC ........... *H01M 4/133* (2013.01); *H01M 4/134* (2013.01); *H01M 4/139* (2013.01); *H01M 4/366* (2013.01); *H01M 4/505* (2013.01); *H01M 6/164* (2013.01); *H01M 10/0525* (2013.01); *C01P 2002/74* (2013.01); *H01M 2004/028* (2013.01)

(56) References Cited

U.S. PATENT DOCUMENTS

| | | |
|---|---|---|
| 5,240,794 A | 8/1993 | Thackeray et al. |
| 5,443,929 A | 8/1995 | Yamamoto et al. |
| 5,604,396 A | 2/1997 | Watanabe et al. |
| 5,705,291 A | 1/1998 | Amatucci et al. |
| 5,718,877 A | 2/1998 | Manev et al. |
| 5,766,800 A | 6/1998 | Manev et al. |
| 5,783,333 A | 7/1998 | Mayer |
| 5,824,278 A | 10/1998 | Yao |
| 5,834,139 A | 11/1998 | Shodai et al. |
| 5,871,866 A | 2/1999 | Barker et al. |
| 5,910,382 A | 6/1999 | Goodenough et al. |
| 6,085,015 A | 7/2000 | Armand et al. |
| 6,127,065 A | 10/2000 | Yamamoto et al. |
| 6,218,050 B1 | 4/2001 | Yoon et al. |
| 6,277,521 B1 | 8/2001 | Gao et al. |
| 6,346,348 B1 | 2/2002 | Nakajima et al. |
| 6,458,487 B1 | 10/2002 | Takeuchi et al. |
| 6,514,640 B1 | 2/2003 | Armand et al. |
| 6,582,814 B2 | 6/2003 | Swiler et al. |
| 6,589,499 B2 | 7/2003 | Gao et al. |
| 6,680,143 B2 | 1/2004 | Thackeray et al. |
| 6,737,195 B2 | 5/2004 | Kweon et al. |
| 6,753,111 B2 | 6/2004 | Kweon et al. |
| 6,846,592 B2 | 1/2005 | Kweon et al. |
| 6,878,490 B2 | 4/2005 | Gao et al. |
| 6,919,144 B2 | 7/2005 | Miyazaki et al. |
| 6,974,601 B2 | 12/2005 | Kweon et al. |
| 6,984,469 B2 | 1/2006 | Kweon et al. |
| 7,018,741 B2 | 3/2006 | Suhara et al. |
| 7,138,209 B2 | 11/2006 | Kweon et al. |
| 7,294,435 B2 | 11/2007 | Miyamoto et al. |
| 7,303,840 B2 | 12/2007 | Thackeray et al. |
| 7,309,546 B2 | 12/2007 | Kweon et al. |
| 7,368,071 B2 | 5/2008 | Dahn et al. |
| 7,393,476 B2 | 7/2008 | Shiozaki et al. |
| 7,504,180 B2 | 3/2009 | Tatsumi et al. |
| 7,635,536 B2 | 12/2009 | Johnson et al. |
| 7,709,148 B2 | 5/2010 | Kawasato et al. |
| 7,709,151 B2 | 5/2010 | Inoue et al. |
| 7,736,807 B2 | 6/2010 | Hasegawa et al. |
| 7,790,308 B2 | 9/2010 | Johnson et al. |
| 7,892,679 B2 | 2/2011 | Shimizu et al. |
| 7,927,506 B2 | 4/2011 | Park |
| 7,935,270 B2 | 5/2011 | Park |
| 8,003,256 B2 | 8/2011 | Ohishi |
| 8,007,941 B2 | 8/2011 | Kweon et al. |
| 8,034,486 B2 | 10/2011 | Kweon et al. |
| 8,080,340 B2 | 12/2011 | Thackeray et al. |
| RE43,276 E | 3/2012 | Kweon et al. |
| 8,137,844 B2 | 3/2012 | Awano et al. |
| 8,236,449 B2 | 8/2012 | Nakura |
| 8,470,477 B2 | 6/2013 | Miwa et al. |
| 8,476,510 B2 | 7/2013 | Swager et al. |
| 8,557,440 B2 | 10/2013 | Yu et al. |
| 8,685,569 B2 | 4/2014 | Oguni et al. |
| 8,685,570 B2 | 4/2014 | Miwa et al. |
| 8,709,654 B2 | 4/2014 | Takeuchi et al. |
| 8,753,532 B2 | 6/2014 | Levasseur et al. |
| 8,808,918 B2 | 8/2014 | Jung et al. |
| 8,877,377 B2 | 11/2014 | Hosoya |
| 8,877,381 B2 | 11/2014 | Yasuda et al. |
| 8,883,351 B2 | 11/2014 | Todoriki et al. |
| 8,906,547 B2 | 12/2014 | Taniguchi et al. |
| 8,927,148 B2 | 1/2015 | Kawakami |
| 8,945,770 B2 | 2/2015 | Koo et al. |
| 8,945,772 B2 | 2/2015 | Kawakami et al. |
| 8,951,448 B2 | 2/2015 | Toyama et al. |
| 9,093,702 B2 | 7/2015 | Kim et al. |
| 9,105,926 B2 | 8/2015 | Fujiki et al. |
| 9,225,003 B2 | 12/2015 | Yukawa |
| 9,227,850 B2 | 1/2016 | Ooishi |
| 9,293,236 B2 | 3/2016 | Kawakami et al. |
| 9,362,557 B2 | 6/2016 | Watanabe et al. |
| 9,385,366 B2 | 7/2016 | Yamakaji et al. |
| 9,391,322 B2 | 7/2016 | Liu et al. |
| 9,478,796 B2 | 10/2016 | Li et al. |
| 9,505,631 B2 | 11/2016 | Masukuni et al. |
| 9,515,313 B2 | 12/2016 | Umeyama et al. |
| 9,577,247 B2 | 2/2017 | Nishide et al. |
| 9,614,225 B2 | 4/2017 | Park |
| 9,666,326 B2 | 5/2017 | Kawakami et al. |
| 9,698,420 B2 | 7/2017 | Ishizaki et al. |
| 9,786,903 B2 | 10/2017 | Ryu et al. |
| 9,812,709 B2 | 11/2017 | Endoh et al. |
| 9,871,246 B2 | 1/2018 | Kim et al. |
| 9,899,664 B2 | 2/2018 | Yamaki et al. |
| 9,923,244 B2 | 3/2018 | Takanashi et al. |
| 9,979,021 B2 | 5/2018 | Paulsen et al. |
| 10,044,035 B2 | 8/2018 | Paulsen et al. |
| 10,050,266 B2 | 8/2018 | Hoshina et al. |
| 10,050,268 B2 | 8/2018 | Choi et al. |
| 10,128,495 B2 | 11/2018 | Satow et al. |
| 10,170,763 B2 | 1/2019 | Blangero et al. |
| 10,243,215 B2 | 3/2019 | Shitaba et al. |
| 10,361,432 B2 | 7/2019 | Takaichi et al. |
| 10,777,815 B2 | 9/2020 | Kanada et al. |
| 10,903,490 B2 | 1/2021 | Choi et al. |
| 2001/0010807 A1 | 8/2001 | Matsubara |
| 2002/0102459 A1 | 8/2002 | Hosoya et al. |
| 2002/0110736 A1 | 8/2002 | Kweon et al. |
| 2002/0164156 A1 | 11/2002 | Bilbrey |
| 2002/0195591 A1 | 12/2002 | Ravet et al. |
| 2003/0104279 A1 | 6/2003 | Miyazaki et al. |
| 2003/0134186 A1 | 7/2003 | Shizuki |
| 2004/0142241 A1 | 7/2004 | Nagayama |
| 2004/0191628 A1 | 9/2004 | Inoue et al. |
| 2004/0229123 A1 | 11/2004 | Takahashi et al. |
| 2004/0229124 A1 | 11/2004 | Miyamoto et al. |
| 2004/0234857 A1 | 11/2004 | Shiozaki et al. |
| 2005/0019662 A1* | 1/2005 | Suhara ............... C01G 51/42 429/231.95 |
| 2006/0051671 A1 | 3/2006 | Thackeray et al. |
| 2006/0051673 A1 | 3/2006 | Johnson et al. |
| 2006/0057466 A1 | 3/2006 | Suhara et al. |
| 2006/0121352 A1 | 6/2006 | Kejha et al. |
| 2006/0188780 A1 | 8/2006 | Fujii et al. |
| 2006/0210879 A1 | 9/2006 | Kawasato et al. |
| 2006/0263690 A1 | 11/2006 | Suhara et al. |
| 2006/0275664 A1 | 12/2006 | Ohzuku et al. |
| 2006/0286459 A1 | 12/2006 | Zhao et al. |

(56) References Cited

U.S. PATENT DOCUMENTS

| | | |
|---|---|---|
| 2007/0026315 A1 | 2/2007 | Lampe-Onnerud et al. |
| 2007/0099086 A1 | 5/2007 | Kang et al. |
| 2007/0117014 A1 | 5/2007 | Saito et al. |
| 2007/0122712 A1 | 5/2007 | Kang et al. |
| 2007/0148546 A1 | 6/2007 | Shimizu et al. |
| 2007/0160906 A1 | 7/2007 | Tooyama et al. |
| 2007/0212609 A1 | 9/2007 | Iwami |
| 2007/0224506 A1 | 9/2007 | Ooyama et al. |
| 2008/0131780 A1* | 6/2008 | Kawasato ............ H01M 4/525 429/231.95 |
| 2008/0166637 A1 | 7/2008 | Inagaki et al. |
| 2008/0241693 A1 | 10/2008 | Fukuchi et al. |
| 2009/0011335 A1 | 1/2009 | Takeda et al. |
| 2009/0017383 A1 | 1/2009 | Suhara et al. |
| 2009/0081547 A1 | 3/2009 | Nakura |
| 2009/0087731 A1 | 4/2009 | Fukui et al. |
| 2009/0104532 A1 | 4/2009 | Hosoya |
| 2009/0123813 A1 | 5/2009 | Chiang et al. |
| 2009/0123842 A1 | 5/2009 | Thackeray et al. |
| 2009/0148772 A1* | 6/2009 | Kawasato ............ C01G 51/42 264/681 |
| 2009/0220862 A1 | 9/2009 | Toyama et al. |
| 2010/0019194 A1 | 1/2010 | Fujiwara et al. |
| 2010/0035147 A1 | 2/2010 | Kotato et al. |
| 2010/0086854 A1 | 4/2010 | Kumar et al. |
| 2010/0129714 A1 | 5/2010 | Toyama et al. |
| 2010/0129715 A1 | 5/2010 | Saito et al. |
| 2010/0143784 A1 | 6/2010 | Johnson et al. |
| 2010/0143799 A1 | 6/2010 | Park |
| 2010/0159330 A1 | 6/2010 | Sugiura et al. |
| 2010/0178464 A1 | 7/2010 | Choi et al. |
| 2010/0216024 A1 | 8/2010 | Kanno et al. |
| 2010/0233542 A1 | 9/2010 | Endo et al. |
| 2010/0247986 A1 | 9/2010 | Toyama et al. |
| 2010/0248033 A1 | 9/2010 | Kumar et al. |
| 2010/0294985 A1 | 11/2010 | Suhara et al. |
| 2011/0020708 A1 | 1/2011 | Fujiki et al. |
| 2011/0033749 A1 | 2/2011 | Uchida et al. |
| 2011/0059367 A1 | 3/2011 | Morita et al. |
| 2011/0076564 A1 | 3/2011 | Yu et al. |
| 2011/0200879 A1 | 8/2011 | Saito et al. |
| 2011/0229757 A1 | 9/2011 | Kawakami et al. |
| 2011/0256437 A1 | 10/2011 | Katsuki et al. |
| 2011/0269023 A1 | 11/2011 | Kawakami et al. |
| 2011/0297876 A1 | 12/2011 | Masukuni et al. |
| 2011/0300441 A1 | 12/2011 | Kawakami |
| 2012/0034516 A1 | 2/2012 | Koo et al. |
| 2012/0045692 A1 | 2/2012 | Takemura et al. |
| 2012/0064406 A1 | 3/2012 | Sato et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0118149 A1 | 5/2012 | Dabrowski et al. |
| 2012/0244430 A1 | 9/2012 | Yamazaki et al. |
| 2012/0256337 A1 | 10/2012 | Yokoyama et al. |
| 2012/0258358 A1 | 10/2012 | Yura et al. |
| 2012/0258365 A1 | 10/2012 | Yokoyama et al. |
| 2012/0258369 A1 | 10/2012 | Yokoyama et al. |
| 2012/0261622 A1 | 10/2012 | Honma |
| 2012/0295163 A1 | 11/2012 | Yanagita et al. |
| 2012/0308891 A1 | 12/2012 | Todoriki et al. |
| 2012/0315544 A1 | 12/2012 | Yasuda et al. |
| 2012/0328951 A1 | 12/2012 | Hirohashi et al. |
| 2012/0328956 A1 | 12/2012 | Oguni et al. |
| 2012/0330044 A1 | 12/2012 | Hou |
| 2013/0017435 A1 | 1/2013 | Sato et al. |
| 2013/0040193 A1 | 2/2013 | Tsuchida et al. |
| 2013/0045418 A1 | 2/2013 | Oguni et al. |
| 2013/0052534 A1 | 2/2013 | Fujiki et al. |
| 2013/0052547 A1 | 2/2013 | Ogino et al. |
| 2013/0065120 A1 | 3/2013 | Miwa et al. |
| 2013/0078516 A1 | 3/2013 | Taniguchi et al. |
| 2013/0078518 A1 | 3/2013 | Thackeray et al. |
| 2013/0084384 A1 | 4/2013 | Yamakaji |
| 2013/0089786 A1 | 4/2013 | Jeong et al. |
| 2013/0130103 A1 | 5/2013 | Kim et al. |
| 2013/0134051 A1 | 5/2013 | Takahashi et al. |
| 2013/0156683 A1 | 6/2013 | Holzapfel et al. |
| 2013/0156942 A1 | 6/2013 | Yamakaji et al. |
| 2013/0157034 A1 | 6/2013 | Choi et al. |
| 2013/0164619 A1 | 6/2013 | Yamakaji et al. |
| 2013/0177806 A1 | 7/2013 | Caldwell et al. |
| 2013/0183579 A1 | 7/2013 | Kim et al. |
| 2013/0189585 A1 | 7/2013 | Kang et al. |
| 2013/0190449 A1 | 7/2013 | Kinloch et al. |
| 2013/0202953 A1 | 8/2013 | Sharma et al. |
| 2013/0212879 A1 | 8/2013 | Ogino |
| 2013/0230770 A1 | 9/2013 | Oya et al. |
| 2013/0266858 A1 | 10/2013 | Inoue et al. |
| 2013/0266859 A1 | 10/2013 | Todoriki et al. |
| 2013/0313471 A1 | 11/2013 | Endo et al. |
| 2013/0316237 A1 | 11/2013 | Miki |
| 2013/0337320 A1 | 12/2013 | Yukawa |
| 2014/0004412 A1 | 1/2014 | Ogino |
| 2014/0023920 A1 | 1/2014 | Yamazaki et al. |
| 2014/0079995 A1 | 3/2014 | Wakada |
| 2014/0099554 A1 | 4/2014 | Inoue et al. |
| 2014/0127567 A1 | 5/2014 | Kuriki et al. |
| 2014/0127568 A1 | 5/2014 | Kawakami et al. |
| 2014/0131633 A1 | 5/2014 | Ito et al. |
| 2014/0162132 A1 | 6/2014 | Ishii et al. |
| 2014/0166946 A1 | 6/2014 | Miwa et al. |
| 2014/0184172 A1 | 7/2014 | Momo et al. |
| 2014/0212759 A1 | 7/2014 | Blangero et al. |
| 2014/0225031 A1 | 8/2014 | Yasuda et al. |
| 2014/0234700 A1 | 8/2014 | Moriwaka et al. |
| 2014/0242463 A1 | 8/2014 | Song et al. |
| 2014/0295068 A1 | 10/2014 | Nanba et al. |
| 2014/0332715 A1 | 11/2014 | Kawakami et al. |
| 2014/0370184 A1 | 12/2014 | Takemura et al. |
| 2015/0014581 A1 | 1/2015 | Kawakami et al. |
| 2015/0014605 A1 | 1/2015 | Kawakami et al. |
| 2015/0064565 A1 | 3/2015 | Todoriki et al. |
| 2015/0093648 A1 | 4/2015 | Son et al. |
| 2015/0099178 A1 | 4/2015 | Kawakami et al. |
| 2015/0099179 A1 | 4/2015 | Ikenuma et al. |
| 2015/0123050 A1 | 5/2015 | Yamazaki et al. |
| 2015/0155556 A1 | 6/2015 | Kawakami et al. |
| 2015/0166348 A1 | 6/2015 | Ikenuma et al. |
| 2015/0262762 A1 | 9/2015 | Ikenuma et al. |
| 2015/0325855 A1 | 11/2015 | Kawakami et al. |
| 2015/0333320 A1 | 11/2015 | Tamaki et al. |
| 2015/0333324 A1 | 11/2015 | Umeyama et al. |
| 2015/0357641 A1 | 12/2015 | Sugie et al. |
| 2015/0380737 A1 | 12/2015 | Kawasato et al. |
| 2016/0006031 A1 | 1/2016 | Kaseda et al. |
| 2016/0006032 A1 | 1/2016 | Paulsen et al. |
| 2016/0028080 A1 | 1/2016 | Sugiura |
| 2016/0064726 A1 | 3/2016 | Ikenuma et al. |
| 2016/0087315 A1 | 3/2016 | Oyama |
| 2016/0104880 A1 | 4/2016 | Gao et al. |
| 2016/0118646 A1 | 4/2016 | Ikenuma |
| 2016/0118658 A1 | 4/2016 | Kawakami et al. |
| 2016/0141607 A1 | 5/2016 | Park et al. |
| 2016/0156030 A1 | 6/2016 | Sun et al. |
| 2016/0164089 A1 | 6/2016 | Kawakami et al. |
| 2016/0190578 A1 | 6/2016 | Momo et al. |
| 2016/0218365 A1 | 7/2016 | Yamamoto |
| 2016/0268601 A1 | 9/2016 | Paulsen et al. |
| 2016/0276658 A1 | 9/2016 | Choi et al. |
| 2016/0276659 A1 | 9/2016 | Choi et al. |
| 2016/0285102 A1 | 9/2016 | Shitaba et al. |
| 2016/0329533 A1 | 11/2016 | Tajima |
| 2016/0336595 A1 | 11/2016 | Choi et al. |
| 2016/0349905 A1 | 12/2016 | Momma et al. |
| 2016/0380271 A1 | 12/2016 | Ochiai et al. |
| 2017/0005364 A1 | 1/2017 | Yamazaki et al. |
| 2017/0018772 A1 | 1/2017 | Satow et al. |
| 2017/0040594 A1 | 2/2017 | Yamaki et al. |
| 2017/0062819 A1 | 3/2017 | Ikenuma |
| 2017/0069907 A1 | 3/2017 | Zhu et al. |
| 2017/0117589 A1 | 4/2017 | Tajima et al. |
| 2017/0179478 A1 | 6/2017 | Bruckmeier et al. |
| 2017/0187035 A1 | 6/2017 | Yanagihara et al. |

(56) References Cited

U.S. PATENT DOCUMENTS

| | | | |
|---|---|---|---|
| 2017/0207444 A1 | 7/2017 | Yanagihara et al. | |
| 2017/0256817 A1 | 9/2017 | Kadoma et al. | |
| 2017/0309910 A1 | 10/2017 | Jo et al. | |
| 2018/0013130 A1 | 1/2018 | Ochiai et al. | |
| 2018/0019462 A1 | 1/2018 | Kadoma et al. | |
| 2018/0034045 A1 | 2/2018 | Xia et al. | |
| 2018/0040888 A1 | 2/2018 | Park et al. | |
| 2018/0040897 A1 | 2/2018 | Park et al. | |
| 2018/0076489 A1 | 3/2018 | Mikami et al. | |
| 2018/0102536 A1 | 4/2018 | Kawakami et al. | |
| 2018/0108944 A1 | 4/2018 | Yamakaji | |
| 2018/0145317 A1 | 5/2018 | Momma et al. | |
| 2018/0145368 A1 | 5/2018 | Ochiai et al. | |
| 2018/0190976 A1 | 7/2018 | Blangero et al. | |
| 2018/0254477 A1 | 9/2018 | Horikawa et al. | |
| 2018/0366729 A1 | 12/2018 | Yanagita et al. | |
| 2020/0144601 A1 | 5/2020 | Takahashi et al. | |
| 2020/0152961 A1 | 5/2020 | Momma et al. | |
| 2020/0176770 A1 | 6/2020 | Takahashi et al. | |
| 2021/0104727 A1* | 4/2021 | Niwata | C01G 51/04 |
| 2021/0104743 A1 | 4/2021 | Choi et al. | |
| 2021/0167357 A1 | 6/2021 | Natsui et al. | |
| 2021/0210756 A1 | 7/2021 | Choi et al. | |
| 2021/0313571 A1 | 10/2021 | Momma et al. | |
| 2022/0052335 A1 | 2/2022 | Saito et al. | |

FOREIGN PATENT DOCUMENTS

| | | |
|---|---|---|
| CN | 001981396 A | 6/2007 |
| CN | 101148263 A | 3/2008 |
| CN | 102210045 A | 10/2011 |
| CN | 102339998 A | 2/2012 |
| CN | 102447107 A | 5/2012 |
| CN | 102569722 A | 7/2012 |
| CN | 102610806 A | 7/2012 |
| CN | 102694201 A | 9/2012 |
| CN | 102779976 A | 11/2012 |
| CN | 103022502 A | 4/2013 |
| CN | 103490060 A | 1/2014 |
| CN | 103582971 A | 2/2014 |
| CN | 104701534 A | 6/2015 |
| CN | 105024047 A | 11/2015 |
| CN | 105118991 A | 12/2015 |
| CN | 105164054 A | 12/2015 |
| CN | 105375021 A | 3/2016 |
| CN | 106025212 A | 10/2016 |
| CN | 106099098 A | 11/2016 |
| CN | 106104868 A | 11/2016 |
| CN | 102569775 B | 1/2017 |
| CN | 106450260 A | 2/2017 |
| EP | 2302725 | 3/2011 |
| EP | 2352190 A | 8/2011 |
| EP | 3219677 A | 9/2017 |
| EP | 3301076 A | 4/2018 |
| JP | 05-314965 A | 11/1993 |
| JP | 05-314995 A | 11/1993 |
| JP | 08-037007 A | 2/1996 |
| JP | 08-100107 A | 4/1996 |
| JP | 08-236114 A | 9/1996 |
| JP | 11-025983 A | 1/1999 |
| JP | 11-096993 A | 4/1999 |
| JP | 2000-501060 | 2/2000 |
| JP | 3031546 | 4/2000 |
| JP | 2000-203842 A | 7/2000 |
| JP | 3172388 | 6/2001 |
| JP | 2001-319692 A | 11/2001 |
| JP | 2002-216760 A | 8/2002 |
| JP | 2002-352802 A | 12/2002 |
| JP | 2003-068306 A | 3/2003 |
| JP | 2003-221235 A | 8/2003 |
| JP | 2003-331824 A | 11/2003 |
| JP | 2004-014381 A | 1/2004 |
| JP | 2004-103566 A | 4/2004 |
| JP | 2004-196604 A | 7/2004 |
| JP | 2004-288579 A | 10/2004 |
| JP | 2004-342554 A | 12/2004 |
| JP | 2005-158612 A | 6/2005 |
| JP | 2005-225734 A | 8/2005 |
| JP | 2005-302510 A | 10/2005 |
| JP | 2005-332629 A | 12/2005 |
| JP | 2006-164758 A | 6/2006 |
| JP | 2006-261132 A | 9/2006 |
| JP | 2006-318928 A | 11/2006 |
| JP | 2006-318929 A | 11/2006 |
| JP | 2007-128714 A | 5/2007 |
| JP | 2007-213866 A | 8/2007 |
| JP | 3959333 | 8/2007 |
| JP | 2008-060033 A | 3/2008 |
| JP | 2008-147160 A | 6/2008 |
| JP | 2008-166156 A | 7/2008 |
| JP | 2009-026640 A | 2/2009 |
| JP | 2009-179501 A | 8/2009 |
| JP | 4353808 | 10/2009 |
| JP | 2010-080407 A | 4/2010 |
| JP | 2010-102895 A | 5/2010 |
| JP | 2010-244847 A | 10/2010 |
| JP | 2010-272239 A | 12/2010 |
| JP | 2011-082133 A | 4/2011 |
| JP | 2011-138718 A | 7/2011 |
| JP | 4739780 | 8/2011 |
| JP | 2011-210694 A | 10/2011 |
| JP | 2012-043794 A | 3/2012 |
| JP | 2012-066944 A | 4/2012 |
| JP | 2012-074366 A | 4/2012 |
| JP | 2012-084257 A | 4/2012 |
| JP | 2012-508444 | 4/2012 |
| JP | 2012-169217 A | 9/2012 |
| JP | 2012-209077 A | 10/2012 |
| JP | 2013-012410 A | 1/2013 |
| JP | 2013-062082 A | 4/2013 |
| JP | 2013-087040 A | 5/2013 |
| JP | 2013-091581 A | 5/2013 |
| JP | 2013-100197 A | 5/2013 |
| JP | 2013-246936 A | 12/2013 |
| JP | 2014-049239 A | 3/2014 |
| JP | 2014-063707 A | 4/2014 |
| JP | 2014-063708 A | 4/2014 |
| JP | 2014-116111 A | 6/2014 |
| JP | 2014-139119 A | 7/2014 |
| JP | 2014-523840 | 9/2014 |
| JP | 2015-050168 A | 3/2015 |
| JP | 2015-069958 A | 4/2015 |
| JP | 2015-082374 A | 4/2015 |
| JP | 2015-088450 A | 5/2015 |
| JP | 2015-099722 A | 5/2015 |
| JP | 2015-156363 A | 8/2015 |
| JP | 2015-201432 A | 11/2015 |
| JP | 2016-076454 A | 5/2016 |
| JP | 2016-127016 A | 7/2016 |
| JP | 2017-021942 A | 1/2017 |
| JP | 2017-091777 A | 5/2017 |
| JP | 2017-168313 A | 9/2017 |
| JP | 2018-020951 A | 2/2018 |
| JP | 2018-087096 A | 6/2018 |
| JP | 2018-092934 A | 6/2018 |
| JP | 2018-147726 A | 9/2018 |
| KR | 2004-0085160 A | 10/2004 |
| KR | 2007-0033337 A | 3/2007 |
| KR | 10-0794168 | 1/2008 |
| KR | 2009-0111130 A | 10/2009 |
| KR | 2010-0052419 A | 5/2010 |
| KR | 10-0989537 | 10/2010 |
| KR | 2012-0100868 A | 9/2012 |
| KR | 2016-0092946 A | 8/2016 |
| KR | 2017-0024490 A | 3/2017 |
| TW | 201431794 | 8/2014 |
| WO | WO-1997/048643 | 12/1997 |
| WO | WO-2003/069702 | 8/2003 |
| WO | WO-2006/009177 | 1/2006 |
| WO | WO-2010/053328 | 5/2010 |
| WO | WO-2011/141486 | 11/2011 |
| WO | WO-2011/155781 | 12/2011 |
| WO | WO-2012/005180 | 1/2012 |
| WO | WO-2012/029729 | 3/2012 |

(56) References Cited

FOREIGN PATENT DOCUMENTS

| WO | WO-2012/124242 | 9/2012 |
|---|---|---|
| WO | WO-2012/132387 | 10/2012 |
| WO | WO-2013/038918 | 3/2013 |
| WO | WO-2014/061653 | 4/2014 |
| WO | WO-2014/098238 | 6/2014 |
| WO | WO-2015/136881 | 9/2015 |
| WO | WO-2015/163356 | 10/2015 |
| WO | WO-2017/061633 | 4/2017 |
| WO | WO-2020/049794 | 3/2020 |

OTHER PUBLICATIONS

Alcantara.R et al., "SPES, 6Li MAS NMR, and Ni3+ EPR evidence for the formation of Co2+-containing spinel phases in LiCoO2 cycled electrode materials", Journal of Electroanalytical Chemistry, Aug. 28, 1998, vol. 454, No. 1-2, pp. 173-181.

International Search Report (Application No. PCT/IB2018/053274) dated Aug. 21, 2018.

Written Opinion (Application No. PCT/IB2018/053274) dated Aug. 21, 2018.

Mukai.K et al., "Magnetic properties of the chemically delithiated LixMn2O4 with $0.07 \leq x \leq 1$", Journal of Solid State Chemistry, May 1, 2011, vol. 184, No. 5, pp. 1096-1104.

Wang.Z et al., "EELS analysis of cation valence states and oxygen vacancies in magnetic oxides", Micron, Oct. 1, 2000, vol. 31, No. 5, pp. 571-580, Elsevier.

Tan.H et al., "Oxidation state and chemical shift investigation in transition metal oxides by EELS", Ultramicroscopy, May 1, 2012, vol. 116, pp. 24-33, Elsevier.

Berbenni.V et al., "Thermogravimetry and X-Ray Diffraction Study of the Thermal Decomposition Processes in Li2Co3-MnCo3 Mixtures", Journal of Analytical and Applied Pyrolysis, 2002, vol. 62, pp. 45-62.

Taguchi.N et al., "Characterization of MgO-coated-LiCoO2 particles by analytical transmission electron microscopy", Journal of Power Sources, 2016, vol. 328, pp. 161-166, Elsevier.

Yano.A et al., "LiCoO2 Degradation Behavior in the High-Voltage Phase Transition Region and Improved Reversibility with Surface Coating", J. Electrochem. Soc. (Journal of the Electrochemical Society), 2017, vol. 164, No. 1, pp. A6116-A6122.

Chen.Z et al., "Staging Phase Transitions in LixCoO2", J. Electrochem. Soc. (Journal of the Electrochemical Society), 2002, vol. 149, No. 12, pp. A1604-A1609.

Shim.J et al., "Characterization of Spinel LixCo2O4-Coated LiCoO2 Prepared with Post-Thermal Treatment as a Cathode Material for Lithium Ion Batteries", Chem. Mater. (Chemistry of Materials), Apr. 10, 2015, vol. 27, No. 9, pp. 3273-3279.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Motohashi.T et al., "Electronic phase diagram of the layered cobalt oxide system LixCoO2 ($0.0 \leq x \leq 1.0$)", Phys. Rev. B (Physical Review. B), Oct. 9, 2009, vol. 80, No. 16, pp. 165114-1-165114-9.

Gabrisch.H et al., "Hexagonal to Cubic Spinel Transformation in Lithiated Cobalt Oxide TEM Investigation", J. Electrochem. Soc. (Journal of the Electrochemical Society), 2004, vol. 151, No. 6, pp. A891-A897.

Khedr.A et al., "Synthesis, Structure, and Electrochemistry of Sm-Modified LiMn2O4 Cathode Materials for Lithium-Ion Batteries", J. Electron. Mater.(Journal of Electronic Materials), Apr. 23, 2013, vol. 42, No. 6, pp. 1275-1281.

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Tukamoto.H et al., "Electronic Conductivity of LiCoO2 and Its Enhancement by Magnesium Doping", J. Electrochem. Soc. (Journal of the Electrochemical Society), Sep. 1, 1997, vol. 144, No. 9, pp. 3164-3168.

Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Wang.Z et al., "Structural and electrochemical characterizations of surface-modified LiCoO2 cathode materials for Li-ion batteries", Solid State Ionics, Jun. 2, 2002, vol. 148, No. 3-4, pp. 335-342, Elsevier.

Zou.M et al., "Synthesis and Electrochemical Performance of High Voltage Cycling LiM0.05Co0.95O2 as Cathode Material for Lithium Rechargeable Cells", Electrochemical and Solid-State Letters, 2004, vol. 7, No. 7, pp. A176-A179.

Wang.Z et al., "Improving the cycling stability of LiCoO2 at 4.5 V through co-modification by Mg doping and zirconium oxyfluoride coating", Ceramics Internationa, 2015, vol. 41, No. 1, pp. 469-474.

Cho.Y et al., "High Performance LiCoO2 Cathode Materials at 60° C. for Lithium Secondary Batteries Prepared by the Facile Nanoscale Dry-Coating Method", J. Electrochem. Soc. (Journal of the Electrochemical Society), 2010, vol. 157, No. 5, pp. A617-A624.

Wang.Z et al., "Mg doping and zirconium oxyfluoride coating co-modification to enhance the high-voltage performance of LiCoO2 for lithium ion battery", Journal of Alloys and Compounds, Feb. 5, 2015, vol. 621, pp. 212-219.

Mladenov.M et al., "Effect of Mg doping and MgO-surface modification on the cycling stability of LiCoO2 electrodes.", Electrochemistry Communications, Aug. 1, 2001, vol. 3, No. 8, pp. 410-416.

Kweon.H et al., "Effects of metal oxide coatings on the thermal stability and electrical performance of LiCoCO2 in a Li-ion cell", Journal of Power Sources, Feb. 16, 2004, vol. 126, pp. 156-162, Elsevier.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Zhao.H et al., "Improvement of electrochemical stability of LiCoO2 cathode by a nano-crystalline coating", Journal of Power Sources, May 20, 2004, vol. 132, pp. 195-200, Elsevier.

Iriyama.Y et al., "Effects of surface modification by MgO on interfacial reactions of lithium cobalt oxide thin film electrode", Journal of Power Sources, Oct. 5, 2004, vol. 137, pp. 111-116, Elsevier.

Shim.J et al., "Effects of MgO Coating on the Structural and Electrochemical Characteristics of LiCoO2 as Cathode Materials for Lithium Ion Battery", Chem. Mater. (Chemistry of Materials), [e.g. ), Suppor] Supporting Information, Mar. 24, 2014, vol. 26, No. 8, pp. 31-33.

Orikasa.Y et al., "Origin of Surface Coating Effect for MgO on LiCoO2 to Improve the Interfacial Reaction between Electrode and Electrolyte", Adv. Mater.Interfaces (Advanced Materials Interfaces), Aug. 28, 2014, vol. 1, No. 9, pp. 1400195-1-1400195-8.

Yamamoto.K et al., "Stabilization of the Electronic Structure at the Cathode/Electrolyte Interface via MgO Ultra-thin Layer during Lithium-ions Insertion/Extraction", Electrochemistry, Oct. 5, 2014, vol. 82, No. 10, pp. 891-896.

Shim.J et al., "Synergistic effects of coating and doping for lithium ion battery cathode materials: synthesis and characterization of lithium titanate-coated LiCoO2 with Mg doping", Electrochimica Acta, Dec. 20, 2015, vol. 186, pp. 201-208, Elesevier.

Yamamoto.K et al., "in situ Total-Reflection Fluorescence X-Ray Absorption Spectroscopic Study on Stability at LiFePO4 / Elecrtrolyte Interface", 224th ECS Meeting Abstract, Oct. 27, 2013, p. 923.

Wang.Z et al., "Electrochemical Evaluation and Structural Characterization of Commercial LiCoO2 Surfaces Modified with MgO for Lithium-Ion Batteries", J. Electrochem. Soc. (Journal of the Electrochemical Society), Mar. 4, 2002, vol. 149, No. 4, pp. A466-A471.

Lee.Y et al., "Phase Transition of Bare and Coated LixCoO2 (x=0.4 and 0.24) at 300° C.", J. Electrochem. Soc. (Journal of the Electrochemical Society), Jul. 28, 2005, vol. 152, No. 9, pp. A1824-A1827.

(56) References Cited

OTHER PUBLICATIONS

Geder.J et al., "Impact of active material surface area on thermal stability of LiCoO2 cathode", Journal of Power Sources, Jul. 1, 2014, vol. 257, pp. 286-292, Elsevier.
Shi.S et al., "Enhanced cycling stability of Li[Li 0.2Mn0.54Ni0.13Co0.13]O2 by surface modification of MgO with melting impregnation method", Electrochimica Acta, Nov. 1, 2012, vol. 88, pp. 671-679.
Antaya.M et al., "Preparation and Characterization of LiCoO2 Thin Films by Laser Ablation Deposition", J. Electrochem. Soc. (Journal of the Electrochemical Society), Mar. 1, 1993, vol. 140, No. 3, pp. 575-578.
Koyama.Y et al., "Co K-edge XANES of LiCoO2 and CoO2 with a variety of structures by supercell density functional calculations with a core hole", Phys. Rev. B (Physical Review. B), Feb. 27, 2012, vol. 85, No. 7, pp. 075129-1-075129-7.
Quinlan.R et al., "XPS Investigation of the Electrolyte Induced Stabilization of LiCoO2 and "AlPO4"-Coated LiCoO2 Composite Electrodes", J. Electrochem. Soc. (Journal of the Electrochemical Society), Dec. 3, 2015, vol. 163, No. 2, pp. A300-A308.
Sun.Y et al., "High-energy cathode material for long-life and safe lithium batteries", Nature Materials, Mar. 22, 2009, vol. 8, pp. 320-324.
Thackeray.M et al., "Li2MnO3-stabilized LiMO2(M=Mn, Ni, Co) electrodes for lithium-ion batteries", J. Mater. Chem. (Journal of Materials Chemistry), 2007, vol. 17, pp. 3112-3125.
Lee.S et al., "Antiferromagnetic ordering in Li2MnO3 single crystals with a two-dimensional honeycomb lattice", Journal of Physics: Condensed Matter, Nov. 14, 2012, vol. 24, No. 45, pp. 456004-1-456004-9.
Dreyer.D et al., "The Chemistry of Graphene Oxide", Chemical Society Reviews, Nov. 3, 2009, vol. 39, No. 1, pp. 228-240.
Johnson.C et al., "Lithium-manganese oxide electrodes with layered-spinel composite structures xLi2MnO3·(1-x)Li1+yMn2-yO4(0<x<1,0≤y≤0.33) for lithium batteries", Electrochemistry Communications, May 1, 2005, vol. 7 , No. 5, pp. 528-536, Elsevier.
Katsuno.H et al., "Growth modes in two-dimensional heteroepitaxy on an elasticsubstrate", J. Cryst. Growth (Journal of Crystal Growth), Feb. 15, 2005, vol. 275, No. 1-2, pp. e283-e288, Elsevier.
McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.
Joshi.T et al., "Effects of Dissolved Transition Metals on the Electrochemical Performance and SEI Growth in Lithium-Ion Batteries", J. Electrochem. Soc. (Journal of the Electrochemical Society), 2014, vol. 161, No. 12, pp. A1915-A1921.
Hong.W et al., "Modification of LiCoO2 by Surface Coating with MgO/TiO2/SiO2 for High-Performance Lithium-Ion Battery", Electrochemical and Solid-State Letters, Dec. 20, 2005, vol. 9, No. 2, pp. A82-A85.
Park.S et al., "Novel Surface Modification Technique to Improve Electrochemical Performance of LiCoO2 at High Voltage", Electrochemical and Solid-State Letters, Apr. 21, 2005, vol. 8, No. 6, pp. A299-A302.
Jo.C et al., "An effective method to reduce residual lithium compounds on Ni-rich Li[Ni0.6Co0.2Mn0.2]O2 active material using a phosphoric acid derived Li3PO4 nanolayer", Nano Research, Dec. 4, 2014, vol. 8, No. 5, pp. 1464-1479, Springer.
Tebbe.J et al., "Mechanisms of LiCoO2 Cathode Degradation by Reaction with HF and Protection by Thin Oxide Coatings", ACS Applied Materials & Interfaces, Oct. 12, 2015, vol. 7, No. 43, pp. 24265-24278.
Bensalah.N et al., "Review on Synthesis, Characterizations, and Electrochemical Properties of Cathode Materials for Lithium Ion Batteries", Journal of Material Science & Engineering, 2016, vol. 5, No. 4, pp. 1000258-1-1000258-21.
Lu.Y et al., "Recent progress on lithium-ion batteries with high electrochemical performance", Science China Chemistry, Feb. 25, 2019, vol. 62, No. 5, pp. 533-548.

Xiao.B, "Surface Modifification of Electrode Materials for Lithium-Ion Batteries", Graduate Program in Mechanical and Materials Engineering, 2006, pp. 1-235.
Ohnishi.M et al., "Investigation of the surface degradation of LiCoO2 particles in the cathode materials of Li-ion batteries using FIB-TOF-SIMS", Journal of Surface Analysis, 2013, vol. 20, No. 2, pp. 99-110.
Iwaya.K et al., "Impact of Lithium-Ion Ordering on Surface Electronic States of LixCoO2", Phys. Rev. Lett. (Physical Review Letters), Sep. 20, 2013, vol. 111, No. 12, pp. 126104-1-126104-5.
Zou.M et al., "Synthesis of High-Voltage (4.5 V) Cycling Doped LiCoO2 for Use in Lithium Rechargeable Cells", Chem. Mater. (Chemistry of Materials), Dec. 16, 2003, vol. 15, No. 25, pp. 4699-4702.
Schipper.F et al., "Study of Cathode Materials for Lithium-Ion Batteries: Recent Progress and New Challenges", Inorganics, Apr. 28, 2017, vol. 5, No. 2, pp. 1-29.
Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), 2006, vol. 153, No. 11, pp. A2152-A2157.
Liu.L et al., "Electrochemical and In Situ Synchrotron XRD Studies on Al2O3-Coated LiCoO2 Cathode Material", J. Electrochem. Soc. (Journal of the Electrochemical Society), 2004, vol. 151, No. 9, pp. A1344-A1351.
Counts.W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.
Benecke.M et al., "Effect of LiF on Hot-Pressing of MgO", J. Am. Ceram. Soc. (Journal of the American Ceramic Society), Jul. 1, 1967, vol. 50, No. 7, pp. 365-368.
Hart.P et al., "Densification Mechanisms in Hot-Pressing of Magnesia with a Fugitive Liquid", J. Am. Ceram. Soc. (Journal of the American Ceramic Society), Feb. 1, 1970, vol. 53, No. 2, pp. 83-86.
Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.
Cho.J et al., "Comparison of Al2O3- and AlPO4-coated LiCoO2 cathode materials for a Li-ion cell", Journal of Power Sources, 2005, vol. 146, pp. 58-64, Elsevier.
Jin.Y et al., "Electrochemical Characterizations of Commercial LiCoO2 Powders with Surface Modified by Li3PO4 Nanoparticles", Electrochemical and Solid-State Letters, Apr. 3, 2006, vol. 9, No. 6, pp. A273-A276.
Eom.J et al., "M3(PO4)2-Nanoparticle-Coated LiCoO2 vs LiCo0.96M0.04O2(M=Mg and Zn) on Electrochemical and Storage Characteristics", J. Electrochem. Soc. (Journal of the Electrochemical Society), Jan. 8, 2008, vol. 155, No. 3, pp. A201-A205.
Kim.Y et al., "Suppression of Cobalt Dissolution from the LiCoO2 Cathodes with Various Metal-Oxide Coatings", J. Electrochem. Soc. (Journal of the Electrochemical Society), 2003, vol. 150, No. 12, pp. A1723-A1725.
Fang.T et al., "Effect of calcination temperature on the electrochemical behavior of ZnO-coated LiCoO2 cathode", Surface & Coatings Technology , Apr. 19, 2006, vol. 201, No. 3-4, pp. 1886-1893, Elsevier.
Xia.H et al., "Phase Transitions and High-Voltage Electrochemical Behavior of LiCoO2 Thin Films Grown by Pulsed Laser Deposition", J. Electrochem. Soc. (Journal of the Electrochemical Society), Feb. 20, 2007, vol. 154, No. 4, pp. A337-A342.
Sun.Y et al., "Role of AlF3 Coating on LiCoO2 Particles during Cycling to Cutoff Voltage above 4.5 V", J. Electrochem. Soc. (Journal of the Electrochemical Society), Oct. 9, 2009, vol. 156, No. 12, pp. A1005-A1010.
Araki.K et al., "Electrochemical properties of LiNi1/3Co1/3Mn1/3O2 cathode material modified by coating with Al2O3 nanoparticles", Journal of Power Sources, Jun. 25, 2014, vol. 269, pp. 236-243.
Kim.H et al., "Capacity fading behavior of Ni-rich layered cathode materials in Li-ion full cells", Journal of Electroanalytical Chemistry, Oct. 18, 2016, vol. 782, pp. 168-173.

(56) References Cited

OTHER PUBLICATIONS

Lin.F et al., "Surface reconstruction and chemical evolution of stoichiometric layered cathode materials for lithium-ion batteries", Nature Communications, Mar. 27, 2014, vol. 5, pp. 3529-1-3529-9.
Yano.A et al., "Surface Structure and High-Voltage Charge/Discharge Characteristics of Al-Oxide Coated LiNi1/3Co1/3Mn1/3O2 Cathodes", J. Electrochem. Soc. (Journal of the Electrochemical Society), Jan. 17, 2015, vol. 162, No. 2, pp. A3137-A3144.
Yano.A et al., "Surface Structure and High-Voltage Charging/Discharging Performance of Low-Content Zr-Oxide-Coated LiNi1/3Co1/3Mn1/3O2", J. Electrochem. Soc. (Journal of the Electrochemical Society), Nov. 5, 2015, vol. 163, No. 2, pp. A75-A82.
Antolini.E, "LiCoO2: formation, structure, lithium and oxygen nonstoichiometry, electrochemical behaviour and transport properties", Solid State Ionics, 2004, vol. 170, No. 3-4, pp. 159-171.
Ding.Y et al., "Preparation of nano-structured LiFePO4/graphene composites by co-precipitation method", Electrochemistry Communications, 2010, vol. 12, No. 1, pp. 10-13, Elsevier.
Ceder.G et al., "Identification of cathode materials for lithium batteries guided by first-principles calculations", Nature, Apr. 16, 1998, vol. 392, pp. 694-696.
Gopukumar.S et al., "Synthesis and electrochemical performance of tetravalent doped LiCoO2 in lithium rechargeable cells", Solid State Ionics, Mar. 28, 2003, vol. 159, No. 3-4, pp. 223-232, Elsevier.
Indian Office Action (Application No. 201917052188) dated Feb. 15, 2021.
Taiwanese Office Action (Application No. 107116529) dated Sep. 29, 2021.
Chinese Office Action (Application No. 201880024809.4) dated Nov. 12, 2021.
Jung.H et al., "Improved electrochemical performances of LiM0.05Co0.95O1.95F0.05(M=Mg, Al, Zr) at high voltage", Electrochimica Acta, Feb. 24, 2012, vol. 68, pp. 153-157, Elesevier.
Liu.L et al., "Improvement of high-voltage cycling behavior of Li(Ni1/3Co1/3Mn1/3)O2 cathodes by Mg, Cr, and Al substitution", Journal of Solid State Electrochemistry, Oct. 21, 2008, vol. 13, No. 9, pp. 1381-1386.
Wang.D et al., "Co-modification of LiNi0.5Co0.2Mn0.3O2 cathode materials with zirconium substitution and surface polypyrrole coating: towards superior high voltage electrochemical performances for lithium ion batteries", Electrochimica Acta, Apr. 1, 2016, vol. 196, pp. 101-109.
Chinese Office Action (Application No. 202210842675.5) dated Nov. 16, 2022.
Chinese Office Action (Application No. 202210842651.X) dated Jan. 11, 2023.
Chinese Office Action (Application No. 202010845282.0) dated Feb. 28, 2023.
Indian Office Action (Application No. 202118045265) dated Jun. 30, 2023.
Aurbach et al., "On the use of vinylene carbonate (VC) as an additive to electrolyte solutions for Li-ion batteries," Electrochimica Acta, 2002, pp. 1423-1439.
Ota et al., "Effect of vinylene carbonate as additive to electrolyte for lithium metal anode," Electrochimica Acta, 2004, pp. 565-572.
Exhibit 1032 of IPR2023-01016, portions of JP-2015-201432A and Full translation, (pub date Nov. 2015).
Exhibit 1028 of IPR2023-01349, Full translation of JP-2015-201432A, (pub date Nov. 2015).
Luo.W et al., "Synthesis and Characterization of Mg Substituted LiCoO2", J. Electrochem. Soc. (Journal of the Electrochemical Society), May 10, 2010, vol. 157, No. 7, pp. A782-A790.
Ikeda.Y et al., "Mechanism of Resistance Increment for Positive Electrode of Li-Ion Battery through Calendar Life Test at High Temperature—Local Structure Analysis of Positive Active Material by Hard and Soft X-ray Absorption Spectroscopy—", GS Yuasa Technical Report, Jun. 28, 2016, vol. 13, No. 1, pp. 1-8, GS Yuasa Corporation.
Notification (Application No. 2024-108433) Dated Nov. 12, 2024.
Information Offer Form (Application No. 2024-108433) Dated Nov. 9, 2024.
Motohashi. T et al., "Electronic phase diagram of the layerd cobalt oxide system LixCoO2 ($0.0 \leq x \leq 1.0$)", (manuscript ver.), Phys. Rev. B (Physical Review. B), vol. 80, No. 16, pp. 165114-1-165114-9.
Comparison between Cited Document 5 and the specification and drawings of the present application.
Appendix C of EPR 90/019,447, portions of JP-2015-201432A and Full translation, (ref pub date Nov. 2015).
Exhibit 1041 of EPR 90/019,535, JP-2015-201432A and Full translation, (ref pub date Nov. 2015).
Appendix LL of EPR 90/019,447, JP-2012-074366A and Full translation, (ref pub date Apr. 2012).

\* cited by examiner pseudo spinel

Co: hexacoordinated oxygen site

Co₃O₄ spinel
Co(A): site A, tetracoordinated oxygen site
Co(B): site B, hexacoordinated oxygen site FIG. 21A
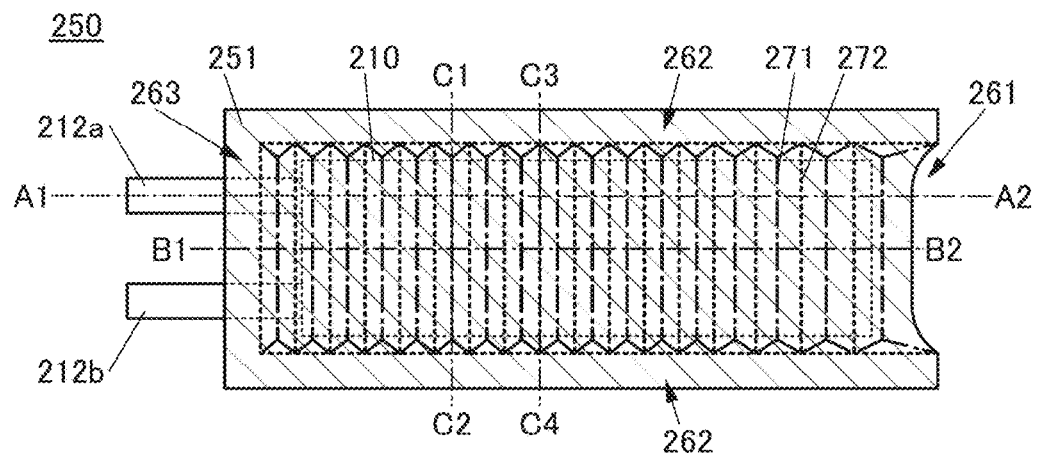
FIG. 21B1
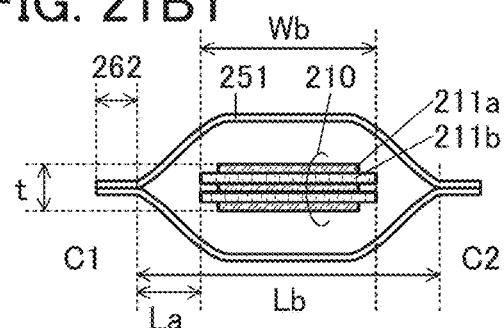
FIG. 21B2
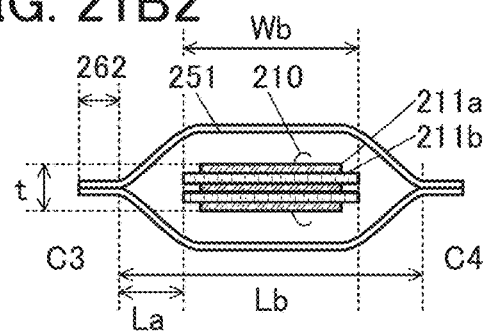
FIG. 21C
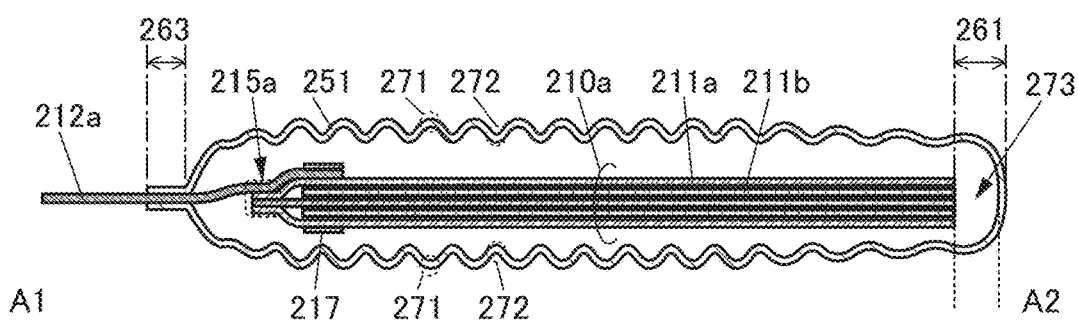
FIG. 21D
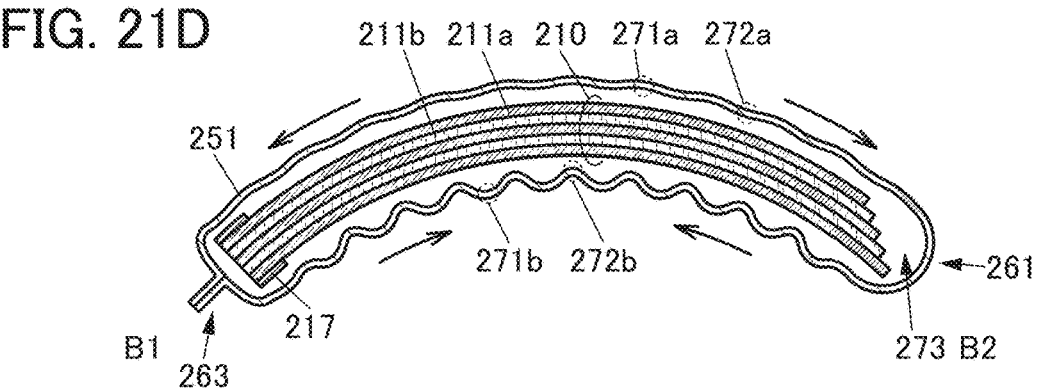

FIG. 23A
FIG. 23B
FIG. 23C
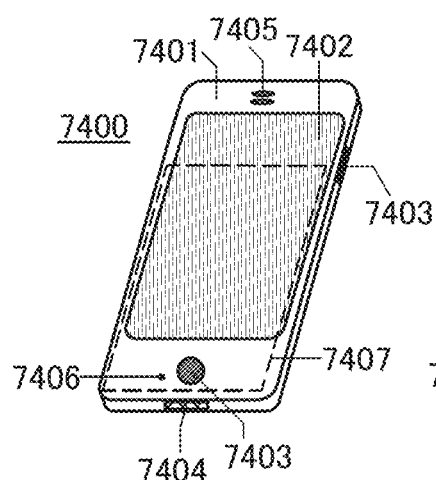
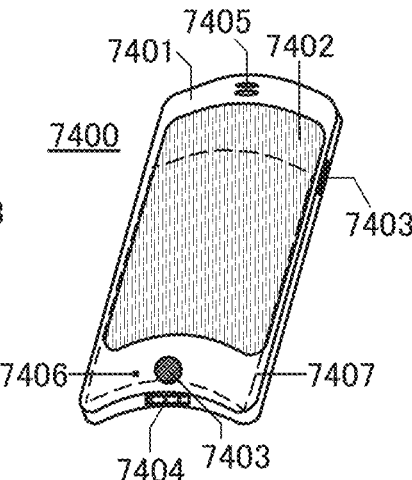
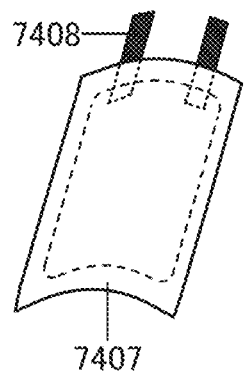
FIG. 23D
FIG. 23E
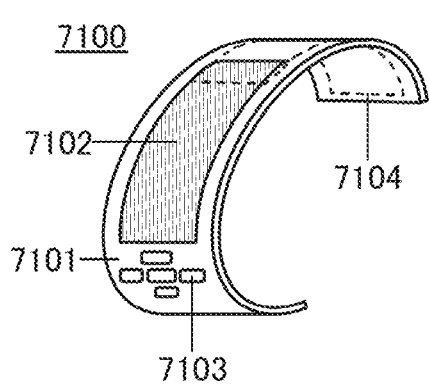
FIG. 23F
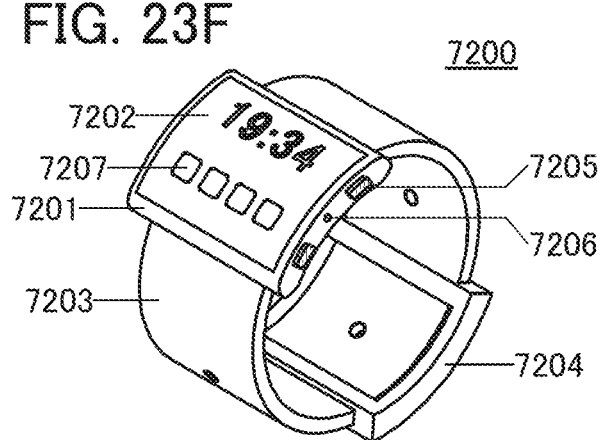
FIG. 23G
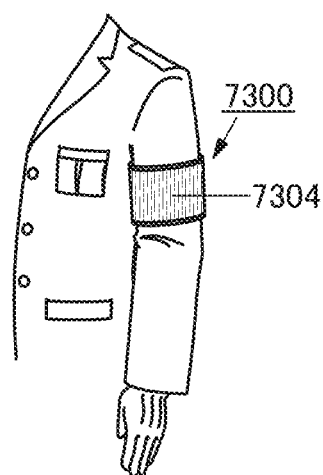
FIG. 23H
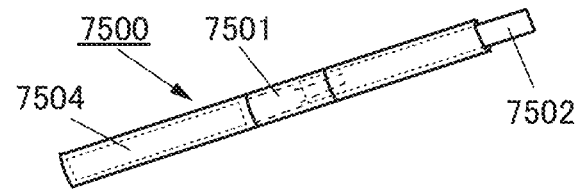

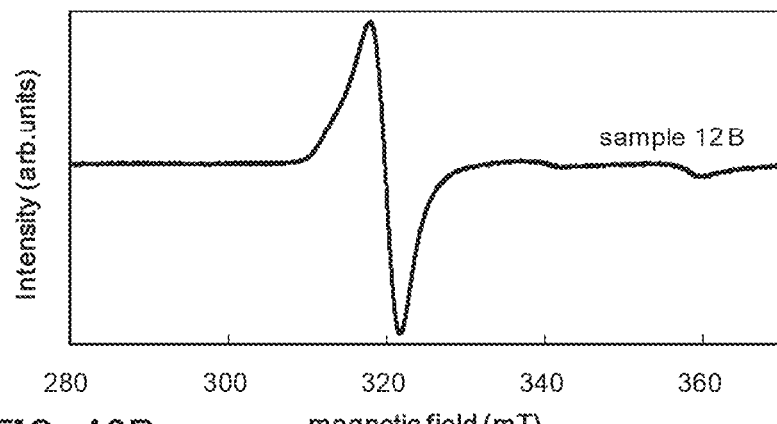
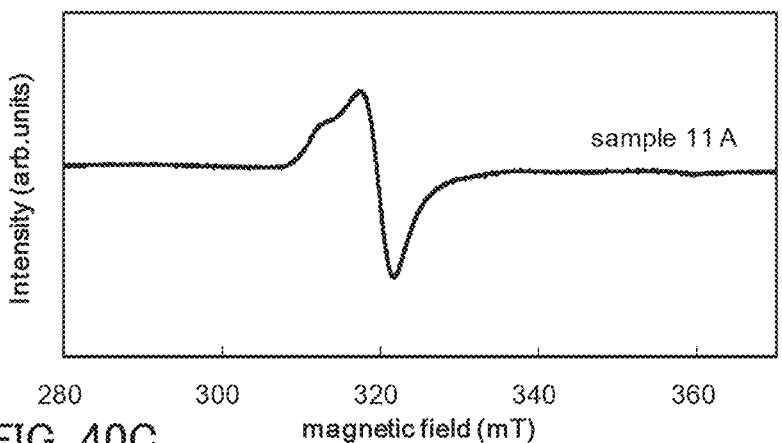
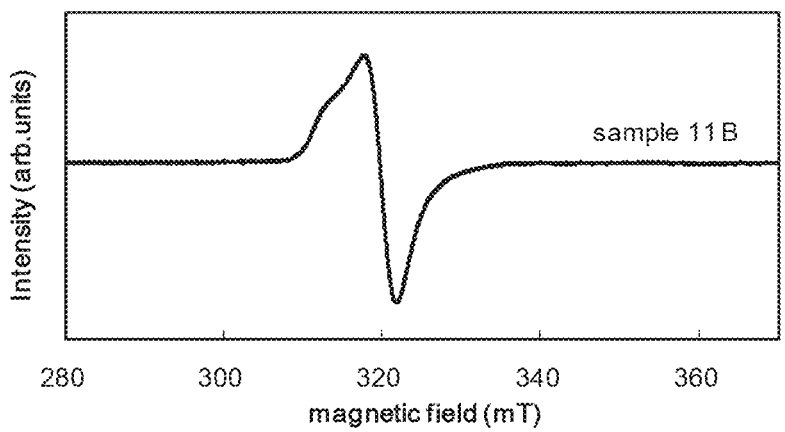

FIG. 41A1
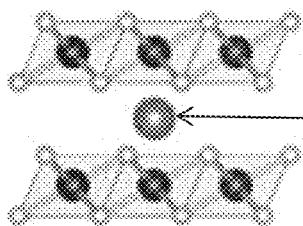
structure a : Mg, Al, Ti, or (Li) is inserted between $CoO_2$ layers in space group P-3m1
FIG. 41A2
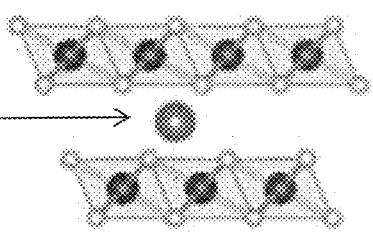
structure b : Mg, Al, Ti, or (Li) is inserted between $CoO_2$ layers in space group R-3m
FIG. 41B1
structure c : Mg, Al, or Ti is substituted at Co site in space group P-3m1
FIG. 41B2
structure d : Mg, Al, or Ti is substituted at Co site in space group R-3m

POSITIVE ELECTRODE ACTIVE MATERIAL, METHOD FOR MANUFACTURING POSITIVE ELECTRODE ACTIVE MATERIAL, AND SECONDARY BATTERY

CROSS REFERENCE TO RELATED APPLICATIONS

This application is a continuation of U.S. application Ser. No. 16/611,791, filed Nov. 7, 2019, now pending, which is a U.S. National Phase Application under 35 U.S.C. § 371 of International Application PCT/IB2018/053274, filed on May 11, 2018, which claims the benefit of a foreign priority application filed in Japan as Application No. 2017-099871, filed on May 19, 2017, all of which are incorporated by reference.

TECHNICAL FIELD

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used in a secondary battery, a secondary battery, and an electronic device including a secondary battery.

Note that a power storage device in this specification refers to every element and/or device having a function of storing electric power. For example, a storage battery (also referred to as secondary battery) such as a lithium-ion secondary battery, a lithium-ion capacitor, and an electric double layer capacitor are included in the category of the power storage device.

Note that electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, and laptop computers; portable music players; digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential to rechargeable energy supply sources for today's information society.

The performance required for lithium-ion secondary batteries includes increased energy density, improved cycle performance, safe operation under a variety of environments, and longer-term reliability, for example.

Thus, improvement of a positive electrode active material has been studied to increase the cycle performance and the capacity of the lithium-ion secondary battery (Patent Document 1, Patent Document 2, and Non-Patent Document 1). A crystal structure of a positive electrode active material also has been studied (Non-Patent Documents 2 to 4).

REFERENCES

Patent Documents

[Patent Document 1] Japanese Published Patent Application No. 2006-164758
[Patent Document 2] Japanese Translation of PCT International Application No. 2014-523840

Non-Patent Documents

[Non-Patent Document 1] Jae-Hyun Shim et al., "Characterization of Spinel $Li_xCo_2O_4$-Coated $LiCoO_2$ Prepared with Post-Thermal Treatment as a Cathode Material for Lithium Ion Batteries", *CHEMISTRY OF MATERIALS*, 27, 2015, pp. 3273-3279.
[Non-Patent Document 2] Toyoki Okumura et al., "Correlation of lithium ion distribution and X-ray absorption near-edge structure in O3- and O2-lithium cobalt oxides from first-principle calculation", *Journal of Materials Chemistry*, 22, 2012, pp. 17340-17348.
[Non-Patent Document 3] T. Motohashi et al., "Electronic phase diagram of the layered cobalt oxide system $Li_xCoO_2$ ($0.0 \leq x \leq 1.0$)", *Physical Review B*, 80 (16); 165114.
[Non-Patent Document 4] Zhaohui Chen et al., "Staging Phase Transitions in $Li_xCoO_2$", *Journal of The Electrochemical Society*, 149 (12), 2002, A1604-A1609.

DISCLOSURE OF INVENTION

An object of one embodiment of the present invention is to provide a positive electrode active material, which has higher capacity and excellent charge and discharge cycle performance, for a lithium-ion secondary battery. Another object of one embodiment of the present invention is to provide a positive electrode active material that suppresses a reduction in capacity caused by charge and discharge cycles when included in a lithium-ion secondary battery. Another object of one embodiment of the present invention is to provide a high-capacity secondary battery.

Another object of one embodiment of the present invention is to provide a secondary battery with excellent charge and discharge characteristics. Another object of one embodiment of the present invention is to provide a highly safe or highly reliable secondary battery.

Another object of one embodiment of the present invention is to provide novel materials, novel active material particles, novel storage devices, or a manufacturing method thereof.

Note that the descriptions of these objects do not disturb the existence of other objects. In one embodiment of the present invention, there is no need to achieve all the objects. Other objects can be derived from the description of the specification, the drawings, and the claims.

In order to achieve the above objects, a positive electrode active material of one embodiment of the present invention has a small change in a crystal structure between the charged state and the discharged state.

One embodiment of the present invention is a secondary battery including a positive electrode and a negative electrode. When XRD patterns of the positive electrode are analyzed by the Rietveld method, the positive electrode has a pseudo-spinel crystal structure. The proportion of the pseudo-spinel crystal structure is 60 wt % or more.

Another embodiment of the present invention is a positive electrode active material containing lithium, cobalt, magnesium, oxygen, and fluorine. The positive electrode active material has diffraction peaks at 2θ of 19.30±0.20° and 2θ of 45.55±0.10° when a lithium-ion secondary battery using the positive electrode active material for a positive electrode and lithium metal for a negative electrode is charged at 25° C. until battery voltage reaches 4.6 V and a current value is sufficiently reduced, and then the positive electrode is analyzed by powder X-ray diffraction using a CuKα1 ray.

Another embodiment of the present invention is a positive electrode active material containing lithium, cobalt, magnesium, oxygen, and fluorine. A difference in volume per unit cell between a crystal structure occupying 60 wt % or more of the positive electrode active material having a charge depth of 0.8 or greater and a crystal structure occupying 60 wt % or more of the positive electrode active material having a charge depth of 0.06 or less is 2.5% or less.

In any of the above embodiments, the positive electrode active material preferably contains at least one of Ti and Al.

According to one embodiment of the present invention, a positive electrode active material, which has higher capacity and excellent charge and discharge cycle performance, for a lithium-ion secondary battery can be provided. According to another embodiment of the present invention, a positive electrode active material that suppresses a reduction in capacity caused by charge and discharge cycles when included in a lithium-ion secondary battery can be provided. According to another embodiment of the present invention, a high-capacity secondary battery can be provided. According to another embodiment of the present invention, a secondary battery with excellent charge and discharge characteristics can be provided. According to another embodiment of the present invention, a highly safe or highly reliable secondary battery can be provided. A novel material, novel active material particles, a novel storage device, or a manufacturing method thereof can be provided.

Note that the descriptions of these effects do not disturb the existence of other effects. In one embodiment of the present invention, there is no need to achieve all the effects. Other effects will be apparent from and can be derived from the description of the specification, the drawings, the claims, and the like.

BRIEF DESCRIPTION OF DRAWINGS

In the accompanying drawings:

FIGS. 13A-1, 13A-2, 13B-1, and 13B-2 illustrate examples of secondary batteries;

FIGS. 21A, 21B1, 21B2, 21C, and 21D illustrate a bendable secondary battery;

FIGS. 23A to 23H illustrate examples of electronic devices;

FIGS. 40A to 40C show ESR signals of positive electrode active materials of embodiments of the present invention and a comparative positive electrode active material in Example 2;

FIGS. 41A1, 41A2, 41B1, and 41B2 illustrate crystal structure models used for calculation in Example 3;

BEST MODE FOR CARRYING OUT THE INVENTION

Figure 1:
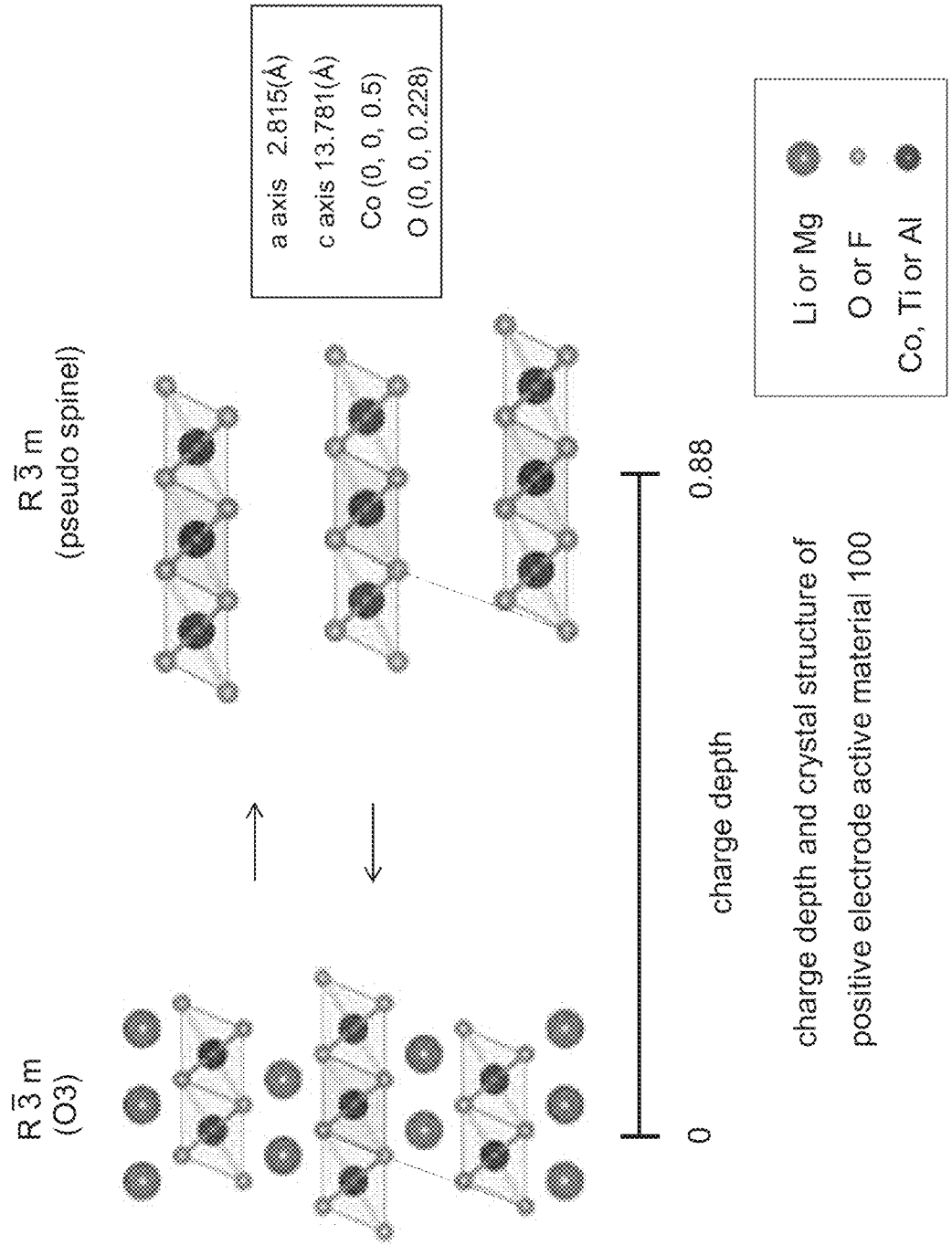
FIG. 1 illustrates charge depth and crystal structures of a positive electrode active material of one embodiment of the present invention.

Hereinafter, embodiments of the present invention will be described in detail with reference to the drawings. Note that the present invention is not limited to the description below, and it is easily understood by those skilled in the art that modes and details of the present invention can be modified in various ways. In addition, the present invention should not be construed as being limited to the description in the following embodiments.

In this specification and the like, crystal planes and orientations are indicated by the Miller index. In the crystallography, a bar is placed over a number in the expression of crystal planes and orientations; however, in this specification and the like, crystal planes and orientations may be expressed by placing a minus sign (−) at the front of a number instead of placing the bar over a number because of patent expression limitations. Furthermore, an individual direction which shows an orientation in crystal is denoted by "[ ]", a set direction which shows all of the equivalent orientations is denoted by "< >", an individual plane which shows a crystal plane is denoted by "( )", and a set plane having equivalent symmetry is denoted by "{ }".

In this specification and the like, segregation refers to a phenomenon in which in a solid made of a plurality of elements (e.g., A, B, and C), a certain element (e.g., B) is spatially non-uniformly distributed.

In this specification and the like, a surface portion of a particle of an active material or the like refers to a region from the surface to a depth of approximately 10 nm. A plane generated by a crack may also be referred to as the surface. A region whose position is deeper than that of the surface portion is referred to as an inner portion.

In this specification and the like, a layered rock-salt crystal structure of a composite oxide containing lithium and a transition metal refers to a crystal structure in which a rock-salt ion arrangement where cations and anions are alternately arranged is included and lithium and the transition metal are regularly arranged to form a two-dimensional plane, so that lithium can be two-dimensionally diffused. Note that a defect such as a cation or anion vacancy may exist. In the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, a pseudo-spinel crystal structure of a composite oxide containing lithium and a transition metal refers to a space group R-3m, which is not a spinel crystal structure but a crystal structure in which oxygen atoms are hexacoordinated to ions of cobalt, magnesium, and the like and the ion arrangement has symmetry similar to that of the spinel crystal structure. Note that in the pseudo-spinel crystal structure, oxygen atoms are tetracoordinated to a light element such as lithium in some cases. In that case, the ion arrangement also has symmetry similar to that of the spinel crystal structure.

The pseudo-spinel crystal structure can be regarded as a crystal structure that contains Li between layers randomly and is similar to $CdCl_2$ crystal structure. The crystal structure similar to the $CdCl_2$ crystal structure is close to a crystal structure of lithium nickel oxide ($Li_{0.06}NiO_2$) that is charged until charge depth reaches 0.94; however, pure lithium cobalt oxide or a layered rock-salt positive electrode active material containing a large amount of cobalt is known not to have such a crystal structure generally.

Anions of a layered rock-salt crystal and anions of a rock-salt crystal each form a cubic closest packed structure (face-centered cubic lattice structure). Anions of a pseudo-spinel crystal are also presumed to form a cubic closest packed structure. When a pseudo-spinel crystal is in contact with a layered rock-salt crystal and a rock-salt crystal, there is a crystal plane at which orientations of cubic closest packed structures formed of anions are aligned with each other. A space group of each of the layered rock-salt crystal and the pseudo-spinel crystal is R-3m, which is different from a space group Fm-3m of a general rock-salt crystal and a space group Fd-3m of a rock-salt crystal having the simplest symmetry; thus, the Miller index of the crystal plane satisfying the above conditions in the layered rock-salt crystal and the pseudo-spinel crystal is different from that in the rock-salt crystal. In this specification, a state where the orientations of the cubic closest packed structures formed of anions in the layered rock-salt crystal, the pseudo-spinel crystal, and the rock-salt crystal are aligned with each other is referred to as a state where crystal orientations are substantially aligned with each other in some cases.

Whether the crystal orientations in two regions are substantially aligned with each other or not can be judged from a transmission electron microscope (TEM) image, a scanning transmission electron microscope (STEM) image, a high-angle annular dark field scanning transmission electron microscope (HAADF-STEM) image, an annular bright-field scanning transmission electron microscope (ABF-STEM) image, and the like. X-ray diffraction (XRD), electron diffraction, neutron diffraction, and the like can be used for judging. When the crystal orientations are substantially aligned with each other, a state where an angle between the orientations of lines in each of which cations and anions are alternately arranged is less than or equal to 5°, preferably less than or equal to 2.5° is observed from a TEM image and the like. Note that, in the TEM image and the like, a light element such as oxygen or fluorine is not clearly observed in some cases; however, in such a case, alignment of orientations can be judged by arrangement of metal elements.

In this specification and the like, a theoretical capacity of a positive electrode active material refers to the amount of electricity when all lithium ions that can be inserted into and extracted from the positive electrode active material are extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, charge depth when all lithium ions that can be inserted into and extracted from a positive electrode active material are inserted is 0, and charge depth when all lithium ions that can be inserted into and extracted from a positive electrode active material are extracted is 1.

In this specification and the like, charge refers to transfer of lithium ions from a positive electrode to a negative electrode in a battery and transfer of electrons from the negative electrode to the positive electrode in an external circuit. Charge of a positive electrode active material refers to extraction of lithium ions. A positive electrode active material with a charge depth of greater than 0.5 is referred to as a charged positive electrode active material. A positive electrode active material with a charge depth of greater than or equal to 0.8 is referred to as a high-voltage charged positive electrode active material. Thus, for example, $LiCoO_2$ charged to greater than or equal to 219.2 mAh/g is a high-voltage charged positive electrode active material. Lithium cobalt oxide which contains an impurity element (here, an impurity element refers to an element other than lithium, cobalt, or oxygen) in a proportion of 5 at % or lower and is subjected to constant current charge at 25° C. until battery voltage reaches 4.6 V (in the case where lithium is used for a counter electrode) and then constant voltage charge until a current value reaches 0.01 C is also a high-voltage charged positive electrode active material.

Similarly, discharge refers to transfer of lithium ions from a negative electrode to a positive electrode in a battery and transfer of electrons from the positive electrode to the negative electrode in an external circuit. Discharge of a positive electrode active material refers to insertion of lithium ions. A positive electrode active material with a charge depth of less than or equal to 0.5 is referred to as a discharged positive electrode active material. A positive electrode active material with a charge depth of less than or equal to 0.06 or a positive electrode active material from which 90% or more of the charge capacity is discharged from a state where the positive electrode active material is charged with high voltage is referred to as a sufficiently discharged positive electrode active material. For example, $LiCoO_2$ with a charge capacity of 219.2 mAh/g is a high-voltage charged positive electrode active material, and a positive electrode active material from which more than or equal to 197.3 mAh/g, 90% of the charge capacity, is discharged is a sufficiently discharged positive electrode active material. Lithium cobalt oxide which contains an impurity element (here, an impurity element refers to an element other than lithium, cobalt, or oxygen) in a proportion of 5 at % or lower and is subjected to constant current discharge at 25° C. until battery voltage reaches 3 V or lower (in the case where lithium is used for a counter electrode) is also a sufficiently discharged positive electrode active material.

Embodiment 1

[Structure of Positive Electrode Active Material]

First, a positive electrode active material 100 of one embodiment of the present invention and a conventional positive electrode active material are explained with reference to FIG. 1 and FIG. 2, and then, a difference between the materials is described. Note that the conventional positive electrode active material described in this embodiment is simple lithium cobalt oxide ($LiCoO_2$) in which an element other than lithium, cobalt, or oxygen is neither added to an inner portion nor applied to a surface portion.

<Conventional Positive Electrode Active Material>

Examples of the conventional positive electrode active materials include lithium cobalt oxide. As described in Non-Patent Documents 2 and 3, and the like, the crystal structure of lithium cobalt oxide changes with the charge depth. FIG. 2 illustrates typical crystal structures of lithium cobalt oxide.

Figure 2:
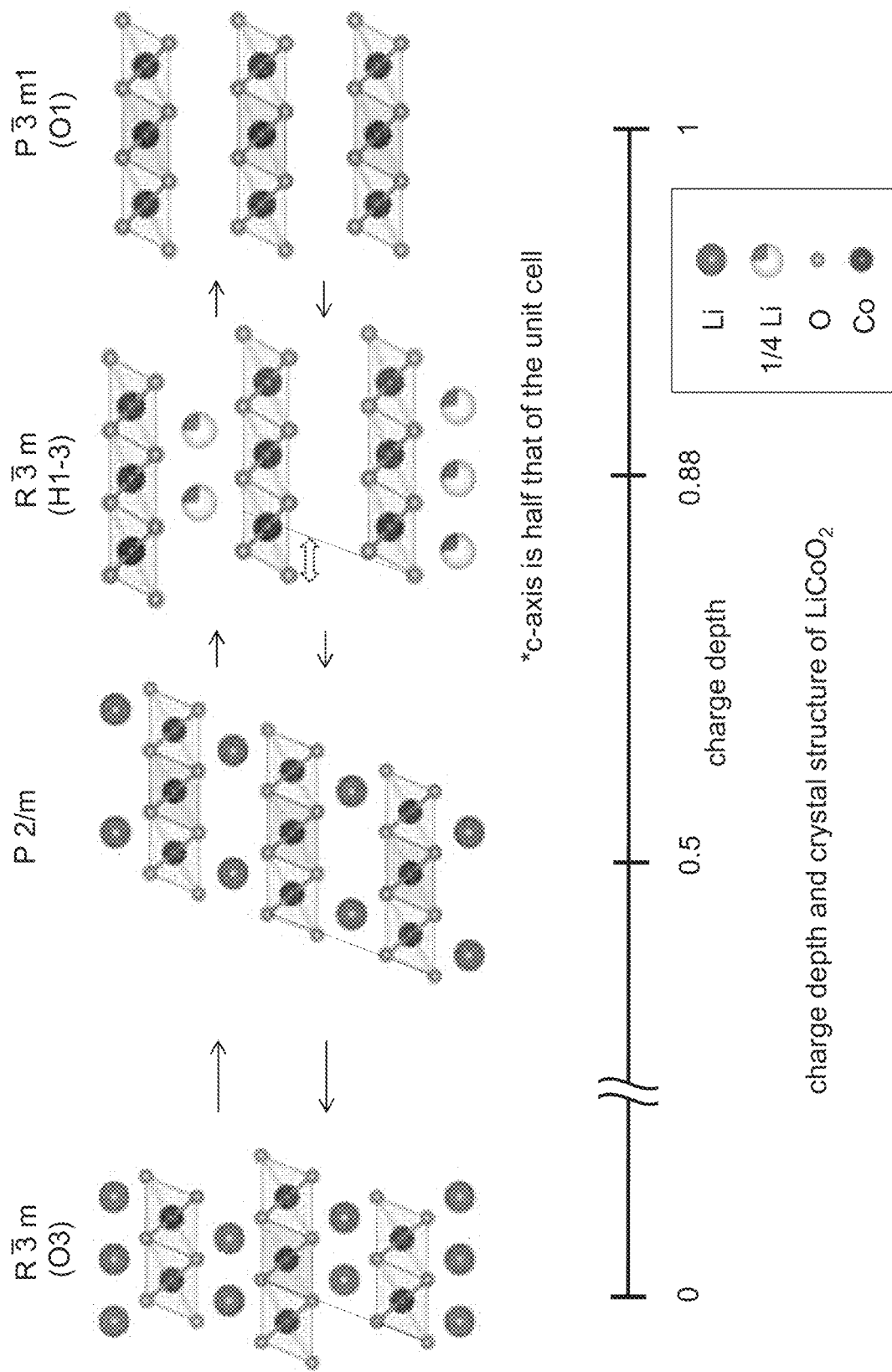
FIG. 2 illustrates charge depth and crystal structures of a conventional positive electrode active material.

As illustrated in FIG. 2, $LiCoO_2$ with a charge depth of 0 (in the discharged state) includes a region having the crystal structure of the space group R-3m, and includes three $CoO_2$ layers in a unit cell. Thus, this crystal structure is referred to as an O3 crystal structure in some cases. Note that the $CoO_2$ layer has a structure in which octahedral geometry with oxygen atoms hexacoordinated to cobalt continues on a plane in the edge-sharing state.

Furthermore, $LiCoO_2$ with a charge depth of 1 has the crystal structure of the space group P-3m1 and includes one $CoO_2$ layer in a unit cell. Thus, this crystal structure is referred to as an O1 crystal structure in some cases.

Moreover, $LiCoO_2$ with a charge depth of approximately 0.88 has the crystal structure of the space group R-3m. This structure can also be regarded as a structure in which $CoO_2$ structures such as P-3m1 (O1) and $LiCoO_2$ structures such as R-3m (O3) are alternately stacked. Thus, this crystal structure is referred to as an H1-3 crystal structure in some cases. Note that the number of cobalt atoms per unit cell in the actual H1-3 crystal structure is twice that of cobalt atoms per unit cell in other structures. However, in this specification including FIG. 2, the c-axis of the H1-3 crystal structure is half that of the unit cell for easy comparison with the other structures.

When high-voltage charge with a charge depth of approximately 0.88 or greater and discharge are repeated, the crystal structure of $LiCoO_2$ repeatedly changes between the H1-3 crystal structure and the R-3m (O3) structure (in the discharged state).

However, there is a large difference in the positions of the $CoO_2$ layers between these two crystal structures. As indicated by the dotted line and the arrow in FIG. 2, the $CoO_2$ layer in the H1-3 crystal structure largely shifts from that in the R-3m (O3) structure. Such a large structural change might adversely affect stability of the crystal structure.

A difference in volume is also large. As will be described in detail in Example 1, the H1-3 crystal structure and the O3 crystal structure in the discharged state that contain the same number of cobalt atoms have a difference in volume of 3.5% or more.

In addition, a structure including a series of $CoO_2$ layers, such as P-3m1 (O1), included in the H1-3 crystal structure is highly likely to be unstable.

Thus, the repeated high-voltage charge and discharge gradually break the crystal structure of lithium cobalt oxide. The broken crystal structure deteriorates the cycle performance. This is probably because the broken crystal structure reduces the number of sites where lithium can stably exist and makes it difficult to insert and extract lithium.

<Positive Electrode Active Material of One Embodiment of the Present Invention>

<<Inner Portion>>

In contrast, the positive electrode active material 100 of one embodiment of the present invention does not largely vary in crystal structure and volume between the sufficiently discharged state and the high-voltage charged state.

FIG. 1 illustrates the crystal structures of the positive electrode active material 100 before being charged and discharged and after being charged and discharged. The positive electrode active material 100 contains lithium, cobalt, and oxygen. In addition to the above elements, the positive electrode active material 100 preferably contains magnesium, halogen such as fluorine or chlorine, or at least one of titanium and aluminum.

The crystal structure with a charge depth of 0 (in the discharged state) in FIG. 1 is R-3m (O3) as in FIG. 2. In contrast, the positive electrode active material 100 of one embodiment of the present invention, which is sufficiently charged and has a charge depth of approximately 0.88, has a crystal structure different from the crystal structures in FIG. 2. The crystal structure of the space group R-3m is referred to as a pseudo-spinel crystal structure in this specification and the like. Although lithium is not illustrated in the pseudo-spinel crystal structure in FIG. 1 to show the symmetry of cobalt atoms and the symmetry of oxygen atoms, approximately 12 atomic % lithium with respect to cobalt practically exists between the $CoO_2$ layers. In both the O3 crystal structure and the pseudo-spinel crystal structure, a slight amount of magnesium preferably exists between the $CoO_2$ layers, i.e., in lithium sites. In addition, a slight amount of halogen such as fluorine preferably exists in oxygen sites. Furthermore, at least one of aluminum and titanium in small quantity preferably exists in cobalt sites.

In the positive electrode active material 100, a change in the crystal structure caused by extraction of lithium is reduced. As indicated by the dotted lines in FIG. 1, for example, there is little difference in the positions of the $CoO_2$ layers between the crystal structures.

As will be described in detail in Example 1, in the positive electrode active material 100, a difference in the volume per unit cell between the O3 crystal structure with a charge depth of 0 and the pseudo-spinel crystal structure with a charge depth of 0.88 is 2.5% or less, specifically, 2.2% or less.

Thus, the crystal structure is unlikely to be broken by repeated high-voltage charge and discharge.

Note that in the unit cell of the pseudo-spinel crystal structure, coordinates of cobalt and oxygen can be respectively represented by (0, 0, 0.5) and (0, 0, x), where $0.20 \leq x \leq 0.25$.

A slight amount of magnesium between the $CoO_2$ layers can reduce a difference in the positions of the $CoO_2$ layers. Thus, magnesium between the $CoO_2$ layers makes it easier to obtain the pseudo-spinel crystal structure. Therefore, magnesium is preferably distributed in the particle of the positive electrode active material 100. To distribute magnesium in the particle, heat treatment is preferably performed in the manufacturing process of the positive electrode active material 100.

However, excessively high heat treatment temperature causes cation mixing, so that magnesium is highly likely to enter the cobalt sites. When magnesium is in the cobalt sites, the R-3m structure cannot be maintained. Furthermore, when the heat treatment temperature is excessively high, cobalt might be reduced to have a valence of two or lithium might be evaporated, for example.

In view of the above, a halogen compound such as a fluorine compound is preferably added to lithium cobalt oxide before the heat treatment for distributing magnesium in the particle. The added halogen compound decreases a melting point of lithium cobalt oxide. The decreased melting point makes it easier to distribute magnesium over the particle at a temperature at which the cation mixing is unlikely to occur. Furthermore, the fluorine compound probably increases corrosion resistance to hydrofluoric acid generated by decomposition of an electrolyte solution.

A change in the crystal structure can be further reduced when at least one of titanium and aluminum in small quantity exists in the cobalt sites of the positive electrode active material 100.

Although magnesium distributed in the positive electrode active material 100 can reduce a difference in the positions of the $CoO_2$ layers, cobalt around magnesium can be easily reduced to have a valence of two to maintain the balance of charge. Thus, excessive magnesium might make part of the particle of the positive electrode active material 100 have a structure in which MgO and CoO(II) form a solid solution. A region where MgO and CoO(II) form a solid solution does not have a Li-insertion/extraction path.

However, titanium is most stable when having a valence of four and second most stable when having a valence of three, and aluminum is stable when having a valence of three. Both titanium and aluminum are unstable when having a valence of two. Thus, titanium or aluminum in the cobalt sites is less likely to be reduced to have a valence of two even when magnesium exists in the surrounding lithium sites. Therefore, MgO and CoO(II) are probably less likely to form a solid solution when a slight amount of titanium or aluminum exists in the cobalt sites.

At least one of titanium and aluminum prevents oxygen from being released easily particularly in the charged state. That is, activity of oxygen bonded to titanium or aluminum decreases to reduce a catalytic effect on oxidative decomposition of an electrolyte solution, which means that the oxidative decomposition of the electrolyte solution is less likely to occur on the surface of the positive electrode active material.

<<Surface Portion>>

Magnesium is preferably distributed over the particle of the positive electrode active material 100, and further preferably, the magnesium concentration in the surface portion of the particle is higher than the average magnesium concentration in the whole particle. The whole surface of the particle, which is a kind of crystal defects, tends to be unstable and start varying in the crystal structure. The higher the magnesium concentration in the surface portion is, the more effectively the change in the crystal structure can be reduced. In addition, a high magnesium concentration in the surface portion promises to increase the corrosion resistance to hydrofluoric acid generated by the decomposition of the electrolyte solution.

In addition, the fluorine concentration in the surface portion of the positive electrode active material 100 is preferably higher than the average fluorine concentration in the whole particle. When fluorine exists in the surface portion in contact with the electrolyte solution, the corrosion resistance to hydrofluoric acid can be effectively increased.

The concentration of titanium or aluminum is also preferably higher than the average concentration in the whole particle. A large amount of titanium or aluminum in a region where the magnesium concentration is high can very effectively reduce a change in the $CoO_2$ layer. Furthermore, the oxidative decomposition of the electrolyte solution is less likely to occur on the surface of the positive electrode active material.

As described above, the surface portion of the positive electrode active material 100 preferably has a composition different from that in the inner portion, i.e., the concentration of at least one of magnesium, fluorine, titanium, and aluminum is higher than that in the inner portion. The composition preferably has a crystal structure stable at normal temperature. Thus, the surface portion may have a crystal structure different from that of the inner portion. For example, at least part of the surface portion of the positive electrode active material 100 may have a rock-salt crystal structure. Note that in the case where the surface portion and the inner portion have different crystal structures, the orientations of crystals in the surface portion and the inner portion are preferably substantially aligned with each other.

Note that when the positive electrode active material 100 contains magnesium and titanium, the peak of the titanium concentration is preferably deeper than the peak of the magnesium concentration. Titanium can have a valence of four or three; therefore, the distance between titanium and oxygen depends on the valence number of titanium. Thus, the vicinity of titanium atoms is likely to be stable even when the distance between metal and oxygen varies. For example, when the surface portion of the positive electrode active material 100 has a rock-salt crystal structure, a titanium-containing region serves as a buffer region, which can contribute to the stabilization of the crystal structure of the inner portion.

However, as described above, the surface portion where only MgO is contained or MgO and CoO(II) form a solid solution does not have a Li-insertion/extraction path. Thus, the surface portion should contain at least cobalt, and also contain lithium in the discharged state to have the Li-insertion/extraction path. The cobalt concentration is preferably higher than the magnesium concentration.

<<Grain Boundary>>

A slight amount of magnesium, halogen, cobalt, aluminum, or titanium contained in the positive electrode active material 100 may randomly exist in the inner portion, but part of these elements is preferably segregated at the grain boundary.

In other words, the magnesium concentration in the crystal grain boundary and its vicinity of the positive electrode active material 100 is preferably higher than that in the other regions in the inner portion. The fluorine concentration in the crystal grain boundary and its vicinity is also preferably high. In addition, the concentration of titanium or aluminum in the crystal grain boundary and its vicinity is preferably high.

As the surface of the particle, the crystal grain boundary, which is plane defects, tends to be unstable and start varying in the crystal structure. The higher the magnesium concentration in the crystal grain boundary and its vicinity is, the more effectively the change in the crystal structure can be reduced. A high concentration of titanium or aluminum in the crystal grain boundary and its vicinity can very effectively reduce a change in the $CoO_2$ layer.

Even when cracks are generated along the crystal grain boundary of the particle of the positive electrode active material 100, high concentrations of magnesium and fluorine in the crystal grain boundary and its vicinity increase the concentrations of magnesium and fluorine in the vicinity of the surface generated by the cracks. Thus, the positive electrode active material including cracks can also have an increased corrosion resistance to hydrofluoric acid.

Note that in this specification and the like, the vicinity of the crystal grain boundary refers to a region of approximately 10 nm from the grain boundary.

<<Particle Size>>

Too large particle size of the positive electrode active material 100 causes problems such as difficulty in lithium diffusion and surface roughness of an active material layer in coating on a current collector. In contrast, too small particle size causes problems such as difficulty in supporting the active material layer in coating to the current collector and overreaction with an electrolyte solution. Thus, D50 (also referred to as a median diameter) is preferably 1 μm or more and 100 μm or less, further preferably 2 μm or more and 40 μm or less.

<Analysis Method>

To determine whether or not a material is the positive electrode active material 100 of one embodiment of the present invention that has a pseudo-spinel crystal structure when charged with high voltage, a high-voltage charged positive electrode is analyzed by XRD, electron diffraction, neutron diffraction, electron spin resonance (ESR), nuclear magnetic resonance (NMR), or the like. XRD is particularly preferable because the crystal structure of the positive electrode active material can be analyzed with high resolution, the degrees of crystallinity can be compared with each other, the crystal orientations can be compared with each other, distortion of lattice arrangement and the crystallite size can be analyzed, and a positive electrode obtained only by disassembling a secondary battery can be measured with sufficient accuracy, for example.

As described above, the positive electrode active material 100 of one embodiment of the present invention has a small change in the crystal structure between the high-voltage charged state and the discharged state. A material, of which 50% or more of crystal structure largely change between the high-voltage charged state and the discharged state, is not preferable because the material cannot withstand the high-voltage charge and discharge. As will be described in detail in Example 1, it should be noted that the objective crystal structure is not obtained in some cases only by addition of elements. For example, lithium cobalt oxide containing magnesium and fluorine has 60 wt % or more pseudo-spinel crystal structure in some cases, and has 50% or more H1-3 crystal structure in other cases. At a predetermined voltage, the positive electrode active material has almost 100% pseudo-spinel crystal structure, and at a voltage higher than the predetermined voltage, the positive electrode active material has the H1-3 crystal structure in some cases. Thus, to determine whether or not the material is the positive electrode active material 100 of one embodiment of the present invention, the crystal structure should be analyzed by XRD, for example.

<<Charging Method>>

High-voltage charge for carrying out the determination can be performed using lithium as a counter electrode on a CR2032 coin cell (with a diameter of 20 mm and a height of 3.2 mm).

More specifically, a positive electrode can be formed by coating a positive electrode current collector made of aluminum foil with slurry in which the positive electrode active material, acetylene black (AB), and polyvinylidene fluoride (PVDF) are mixed at a weight ratio of 95:3:2.

A lithium metal can be used for a counter electrode. Note that when the counter electrode is formed using a material other than the lithium metal, the potential of a secondary battery differs from the potential of the positive electrode. As for the potential of the positive electrode, for example, charging at 4.5 V using a graphite counter electrode substantially corresponds to charging at 4.6 V using a lithium counter electrode. Unless otherwise specified, the voltage and the potential in this specification and the like refer to the potential of a positive electrode.

As an electrolyte contained in an electrolyte solution, 1 mol/L lithium hexafluorophosphate ($LiPF_6$) can be used. As the electrolyte solution, a solution in which ethylene carbonate (EC) and diethyl carbonate (DEC) at a volume ratio of 3:7 and vinylene carbonate (VC) at a 2 wt % are mixed can be used.

As a separator, 25-μm-thick polypropylene can be used.

Stainless steel (SUS) can be used for a positive electrode can and a negative electrode can.

The coin cell formed under the above conditions is subjected to constant current charge at 4.6 V and 0.5 C and then subjected to constant voltage charge until the current value reaches 0.01 C. Here, 1 C is set to 137 mA/g, and the temperature is set to 25° C. After the charge is performed in this manner, the coin cell is disassembled to take out the positive electrode, whereby the high-voltage charged positive electrode active material can be obtained. In order to inhibit reaction with components in the external environment, the taken positive electrode active material is preferably enclosed in an argon atmosphere in performing various analyses later. For example, XRD can be performed on the positive electrode active material enclosed in an airtight container containing an argon atmosphere.

<<XRD>>

Figure 3:
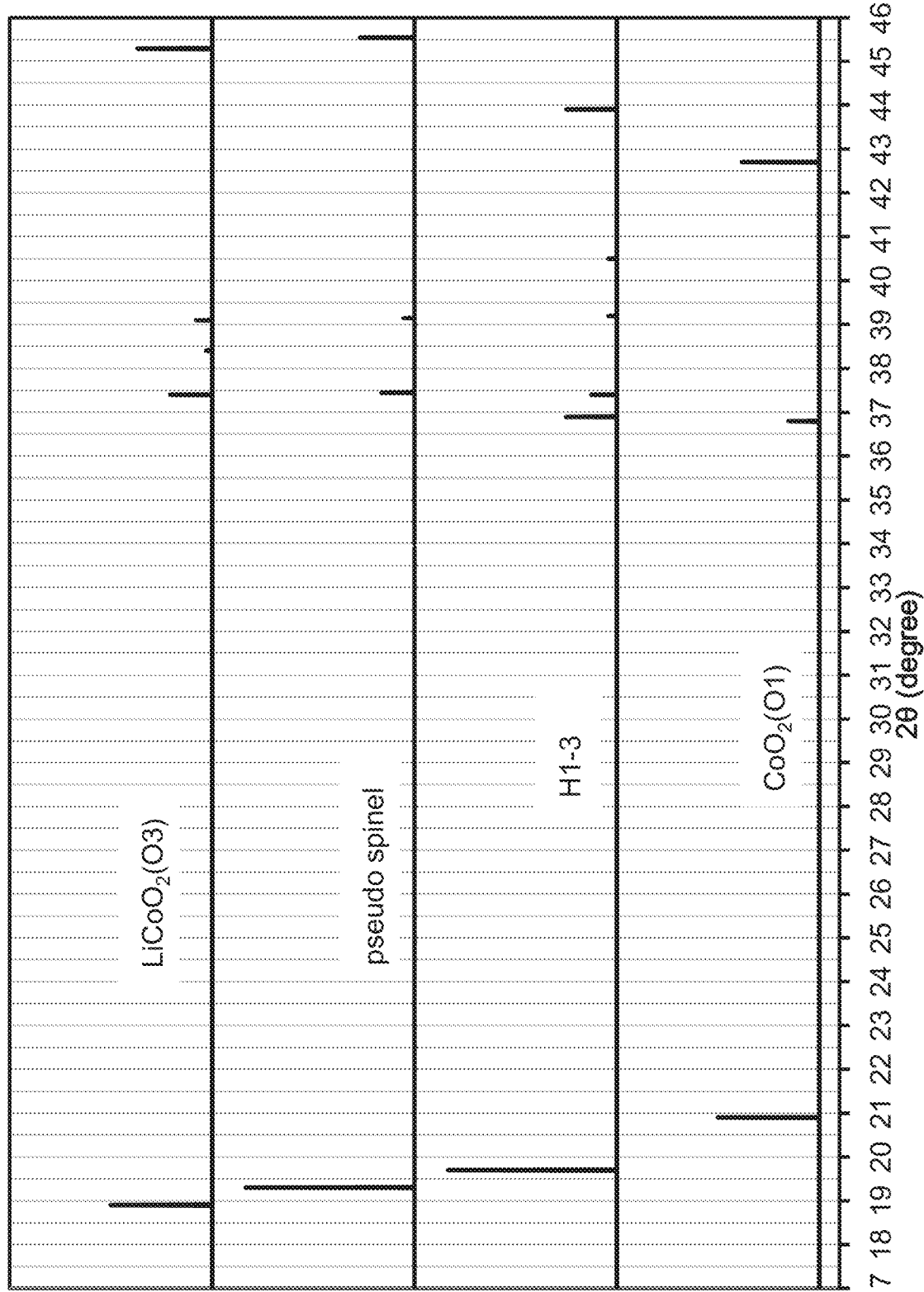
FIG. 3 shows XRD patterns calculated from crystal structures.

FIG. 3 shows ideal powder XRD patterns with the CuKα1 line that were calculated from models of a pseudo-spinel crystal structure and an H1-3 crystal structure. For comparison, FIG. 3 also shows ideal XRD patterns calculated from the crystal structure of $LiCoO_2$(O3) with a charge depth of 0 and the crystal structure of $CoO_2$ (O1) with a charge depth of 1. Note that the patterns of $LiCoO_2$ (O3) and $CoO_2$ (O1) were calculated using crystal structure data in Inorganic Crystal Structure Database (ICSD) with Reflex Powder Diffraction, which is a module of Materials Studio (BIOVIA). The range of 2θ was from 15° to 75°, the step size was 0.01, the wavelength λ1 was $1.540562\times10^{-10}$ m, the wavelength λ2 was not set, and a single monochromator was used. The pattern of the H1-3 crystal structure was calculated using the crystal structure data disclosed in Non-Patent Document 4 in a manner similar to those of other structures. The XRD pattern of the pseudo-spinel crystal structure was calculated using the crystal structure estimated from the XRD patterns of the positive electrode active material of one embodiment of the present invention with Rietveld analysis software, TOPAS version 3 produced by Bruker AXS, in a manner similar to those of other structures. Note that the XRD patterns of the positive electrode active material of one embodiment of the present invention are shown in Example 1.

As shown in FIG. 3, the pseudo-spinel crystal structure has diffraction peaks at 2θ of 19.30±0.20° (greater than or equal to 19.10° and less than or equal to 19.50°) and 2θ of 45.55±0.10° (greater than or equal to 45.45° and less than or equal to 45.65°). More specifically, the pseudo-spinel crystal structure has sharp diffraction peaks at 2θ of 19.30±0.10° (greater than or equal to 19.20° and less than or equal to 19.40°) and 2θ of 45.55±0.05° (greater than or equal to 45.50° and less than or equal to 45.60°). However, the H1-3 crystal structure and $CoO_2$ (P-3m1, O1) do not have peaks at these positions. Thus, the peaks at 2θ of 19.30±0.20° and 2θ of 45.55±0.10° in the high-voltage charged state are the features of the positive electrode active material 100 of one embodiment of the present invention.

Although the high-voltage charged positive electrode active material 100 of one embodiment of the present invention has the pseudo-spinel crystal structure, not all the particles necessarily have the pseudo-spinel crystal structure. Some of the particles may have another crystal structure or be amorphous. Note that when the XRD patterns are analyzed by the Rietveld analysis, the pseudo-spinel crystal structure preferably accounts for 50 wt % or more, further preferably 60 wt % or more, and still further preferably 66 wt % or more of the positive electrode active material. The positive electrode active material in which the pseudo-spinel crystal structure accounts for 50 wt % or more, preferably 60 wt % or more, and further preferably 66 wt % or more can have sufficiently good cycle performance.

The crystallite size of the pseudo-spinel structure of the positive electrode active material particle is decreased by at most approximately one-tenth that of $LiCoO_2$ (O3) in the discharged state. Thus, the peak of the pseudo-spinel crystal structure can be clearly observed after the high-voltage charge even under the same XRD measurement conditions as those of a positive electrode before the charge and discharge. In contrast, simple $LiCoO_2$ has a small crystallite size and a broad and small peak even when it partly has a structure similar to the pseudo-spinel crystal structure. The crystallite size can be calculated from the half width of the XRD peak.

Note that the characteristics apparent from the XRD pattern are those of the structure of the inner portion of the positive electrode active material. In a positive electrode active material with a particle size (D50) of approximately 1 μm to 100 μm, the volume of a surface portion is negligible compared with that of an inner portion, and therefore is highly unlikely to appear in the XRD pattern even when the surface portion has a crystal structure different from that of the inner portion in the positive electrode active material 100.

<<ESR>>

Figure 4A:
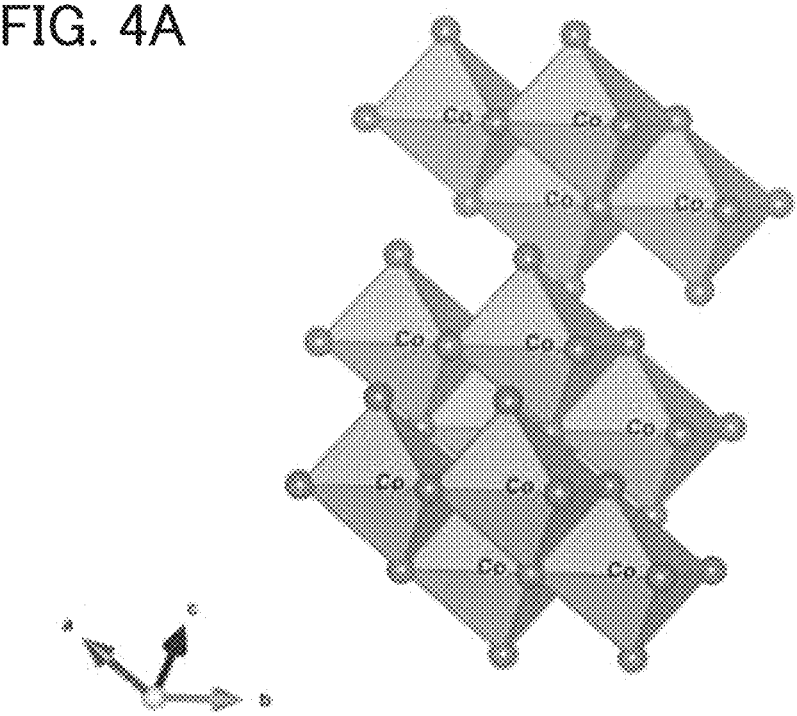
FIGS. 4A and 4B show a crystal structure and magnetism of a positive electrode active material of one embodiment of the present invention.
Figure 4B:
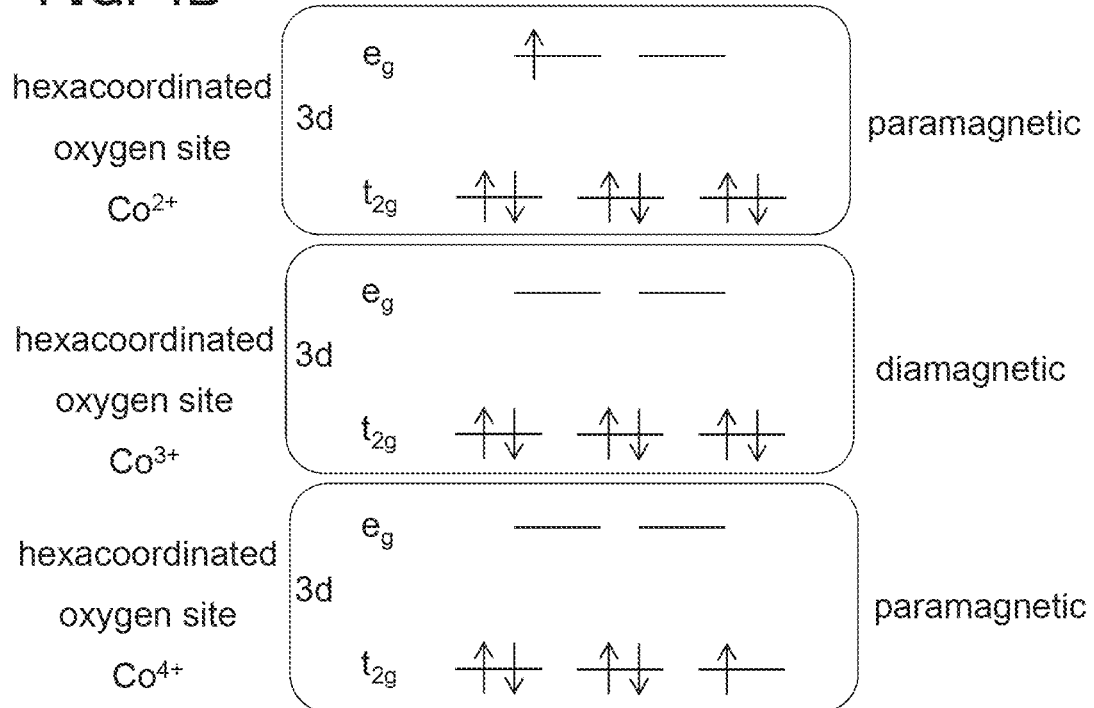

In the positive electrode active material 100 having the pseudo-spinel crystal structure, cobalt exists in the hexacoordinated oxygen site, as illustrated in FIG. 1 and FIG. 4A. In cobalt in the hexacoordinated oxygen site, a 3d orbital is divided into an $e_g$ orbital and a $t_{2g}$ orbital as shown in FIG. 4B, and the energy of the $t_{2g}$ orbital located aside from the direction in which oxygen exists is low. Part of cobalt in the hexacoordinated oxygen site is diamagnetic $Co^{3+}$ in which the entire $t_{2g}$ orbital is filled. Another part of cobalt in the hexacoordinated oxygen site may be paramagnetic $Co^{2+}$ or $Co^{4+}$. Although both $Co^{2+}$ and $Co^{4+}$ have one unpaired electron and thus cannot be distinguished from each other by ESR, paramagnetic cobalt may be either $Co^{2+}$ or $Co^{4+}$ depending on the valences of surrounding elements.

Figure 5A:
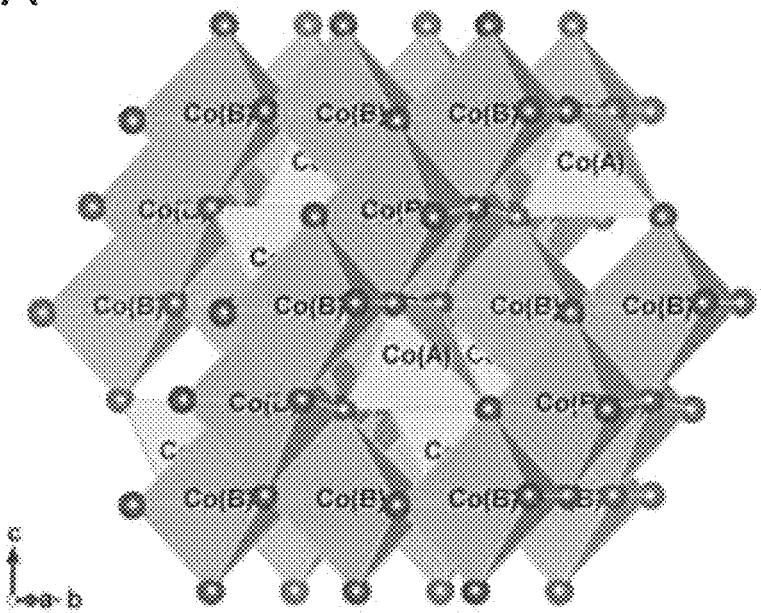
FIGS. 5A and 5B show a crystal structure and magnetism of a conventional positive electrode active material.

According to some previous documents, a positive electrode active material can have a spinel crystal structure that does not contain lithium in the surface portion in the charged state. In that case, the positive electrode active material contains $Co_3O_4$ having a spinel crystal structure illustrated in FIG. 5A.

When the spinel is represented by a general formula $A[B_2]O_4$, an element A exists in a tetracoordinated oxygen site and an element B exists in a hexacoordinated oxygen site. In this specification and the like, the tetracoordinated oxygen site is referred to as a site A, and the hexacoordinated oxygen site is referred to as a site B in some cases.

Figure 5B:
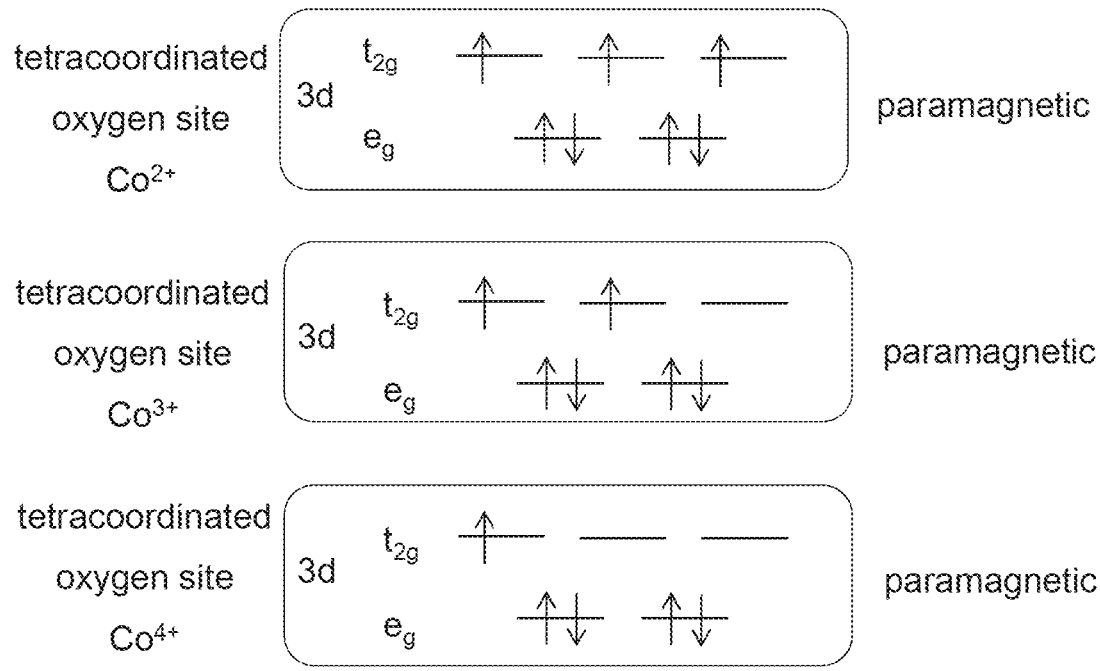

In $Co_3O_4$ having the spinel crystal structure, cobalt is not only in the hexacoordinated oxygen site B, but also in the tetracoordinated oxygen site A. In cobalt in the tetracoordinated oxygen site, the energy of the $e_g$ orbital is lower than that of the $t_{2g}$ orbital as shown in FIG. 5B. Thus, each of $Co^{2+}$, $Co^{3+}$, and $Co^{4+}$ in the tetracoordinated oxygen site includes an unpaired electron and therefore is paramagnetic. Accordingly, when the particles that sufficiently contain $Co_3O_4$ having the spinel crystal structure are analyzed by ESR, for example, the peaks attributed to paramagnetic cobalt, $Co^{2+}$, $Co^{3+}$, or $Co^{4+}$ in the tetracoordinated oxygen site, can be observed.

However, in the positive electrode active material 100 of one embodiment of the present invention, the peaks attributed to paramagnetic cobalt in the tetracoordinated oxygen site are too small in number to observe. That is, the peaks attributed to $Co_3O_4$ having the spinel crystal structure that can be analyzed by ESR or the like in the positive electrode active material of one embodiment of the present invention are lower than the peaks in the conventional positive electrode active material, or too small in number to observe, in some cases. $Co_3O_4$ having the spinel crystal structure does not contribute to the charge and discharge reaction and is thermally unstable; thus, the amount of $Co_3O_4$ having the spinel crystal structure is preferably as small as possible. In view of this, the positive electrode active material 100 also differs from the conventional positive electrode active material.

<<XPS>>

A region from the surface to a depth of approximately 2 nm to 8 nm (normally, approximately 5 nm) can be analyzed by X-ray photoelectron spectroscopy (XPS); thus, the concentrations of elements in approximately half of the surface portion can be quantitatively analyzed. The bonding states of the elements can be analyzed by narrow scanning. Note that the quantitative accuracy of XPS is approximately ±1 atomic % in many cases. The lower detection limit is approximately 1 atomic % but depends on the element.

When the positive electrode active material 100 is analyzed by XPS and the cobalt concentration is set to 1, the relative value of the magnesium concentration is preferably greater than or equal to 0.4 and less than or equal to 1.5, further preferably greater than or equal to 0.45 and less than 1.00. Furthermore, the relative value of the fluorine concentration is preferably greater than or equal to 0.05 and less than or equal to 1.5, further preferably greater than or equal to 0.3 and less than or equal to 1.00. Moreover, the relative value of the concentration of titanium or aluminum is preferably greater than or equal to 0.05 and less than or equal to 0.4, further preferably greater than or equal to 0.1 and less than or equal to 0.3.

In addition, when the positive electrode active material 100 is analyzed by XPS, a peak indicating the bonding energy of fluorine with another element is preferably higher than or equal to 682 eV and lower than 685 eV, further preferably approximately 684.3 eV. This bonding energy is different from that of LiF (685 eV) and that of magnesium fluoride (686 eV). That is, the positive electrode active material 100 containing fluorine is preferably in the bonding state other than lithium fluoride or magnesium fluoride.

Furthermore, when the positive electrode active material 100 is analyzed by XPS, a peak indicating the bonding energy of magnesium with another element is preferably higher than or equal to 1302 eV and lower than 1304 eV, further preferably approximately 1303 eV. This bonding energy is different from that of magnesium fluoride (1305 eV) and is close to that of MgO. That is, the positive electrode active material 100 containing magnesium is preferably in the bonding state other than magnesium fluoride.

<<EDX>>

In the EDX measurement, the measurement with scanning a certain area, in which the area is evaluated two-dimensionally can be referred to as EDX surface analysis. In the EDX surface analysis, measurement in which data of a linear region is extracted to evaluate the atomic concentration distribution in the positive electrode active material particle can be referred to as linear analysis in some cases.

The concentration of magnesium, fluorine, titanium, or aluminum in the inner portion, the surface portion, and the vicinity of the crystal grain boundary can be quantitatively analyzed by the EDX surface analysis (e.g., element mapping). In addition, the peak of the concentration of magnesium, fluorine, titanium, or aluminum can be analyzed by the EDX linear analysis.

When the positive electrode active material 100 is subjected to the EDX linear analysis, a peak of the magnesium concentration in the surface portion is preferably observed in a region from the surface of the positive electrode active material 100 to a depth of 3 nm toward the center, further preferably to a depth of 1 nm, and still further preferably to a depth of 0.5 nm.

The distribution of fluorine in the positive electrode active material 100 preferably overlaps with the distribution of magnesium. Thus, in the EDX linear analysis, a peak of the fluorine concentration in the surface portion is preferably observed in a region from the surface of the positive electrode active material 100 to a depth of 3 nm toward the center, further preferably to a depth of 1 nm, and still further preferably to a depth of 0.5 nm.

In addition, in the EDX linear analysis, a peak of the concentration of at least one of titanium and aluminum in the surface portion of the positive electrode active material 100 is preferably observed in a region from the surface of the positive electrode active material 100 to a depth of 0.2 nm to 10 nm toward the center, further preferably to a depth of 0.5 nm to 3 nm.

When the positive electrode active material 100 is subjected to linear analysis or surface analysis, the atomic ratio of magnesium to cobalt (Mg/Co) in the vicinity of the crystal grain boundary is preferably greater than or equal to 0.020 and less than or equal to 0.50, further preferably greater than or equal to 0.025 and less than or equal to 0.30, and still further preferably greater than or equal to 0.030 and less than or equal to 0.20.

[Method for Forming Positive Electrode Active Material]

Next, an example of a method for forming the positive electrode active material 100 of one embodiment of the present invention is described.

<Step S11: Preparation of Starting Materials>

First, a lithium source and a cobalt source are prepared as starting materials. A magnesium source and a fluorine source are also preferably prepared as the starting materials.

As the lithium source, for example, lithium carbonate and lithium fluoride can be used. As the cobalt source, for example, cobalt oxide can be used. As the magnesium source, for example, magnesium oxide, magnesium fluoride, magnesium hydroxide, and magnesium carbonate can be used. As the fluorine source, for example, lithium fluoride and magnesium fluoride can be used. That is, lithium fluoride can be used as both the lithium source and the fluorine source.

When the atomic weight of cobalt is set to 1, the atomic weight of magnesium contained in the magnesium source is preferably greater than or equal to 0.001 and less than or equal to 0.1, further preferably greater than or equal to 0.005 and less than or equal to 0.02, and still further preferably approximately 0.01.

The amount of fluorine contained in the fluorine source is preferably 1.0 times to 4 times (atomic ratio), further preferably 1.5 times to 3 times (atomic ratio) the amount of magnesium contained in the magnesium source.

<Step S12: Mixing Starting Materials>

Next, the starting materials are mixed. For example, a ball mill and a bead mill can be used for mixing. When the ball mill is used, a zirconia ball is preferably used as media, for example.

<Step S13: First Heat Treatment>

Next, the materials mixed in Step S12 are heated. In this step, the heating is referred to as baking or first heat treatment in some cases. The heating is preferably performed at higher than or equal to 800° C. and lower than 1100° C., further preferably at higher than or equal to 900° C. and lower than or equal to 1000° C., and still further preferably at approximately 950° C. Excessively low temperature might result in insufficient decomposition and melting of the starting materials. In contrast, excessively high temperature might cause reduction of Co, evaporation of Li, and the like, leading to a defect in which Co has a valence of two.

The heating time is preferably 2 hours to 20 hours. The baking is preferably performed in an atmosphere such as dry air. For example, it is preferable that the heating be performed at 1000° C. for 10 hours, the temperature rising rate be 200° C./h, and the flow rate of a dry atmosphere be 10 L/min. After that, the heated materials are cooled to room temperature. The time of decreasing temperature from the retention temperature to room temperature is preferably 10 hours to 50 hours, for example.

The heating in Step S13 enables synthesis of lithium cobalt oxide. When the starting materials contain magnesium and fluorine, a particle of a composite oxide in which magnesium and fluorine are distributed in lithium cobalt oxide is obtained.

Particles of a composite oxide containing lithium, cobalt, fluorine, and magnesium that is synthesized in advance may be used as the starting materials. In that case, Step S12 and Step S13 can be omitted. For example, lithium cobalt oxide particles (C-20F, produced by Nippon Chemical Industrial CO., LTD.) can be used as one of the starting materials. The lithium cobalt oxide particles have a size of approximately 20 μm and contain fluorine, magnesium, calcium, sodium, silicon, sulfur, and phosphorus in a region that can be analyzed by XPS from the surface.

<Step S14: Coating with Material Containing at Least One of Titanium and Aluminum>

Next, the surfaces of the lithium cobalt oxide particles are preferably coated with a material containing at least one of titanium and aluminum. As the coating method, a liquid phase method such as a sol-gel method, a solid phase method, a sputtering method, an evaporation method, a chemical vapor deposition (CVD) method, a pulsed laser deposition (PLD) method, and the like can be used. In this embodiment, the case of using the sol-gel method that allows a uniform coverage under an atmospheric pressure is described.

First, titanium alkoxide, aluminum alkoxide, or a mixture thereof is dissolved in alcohol, and lithium cobalt oxide particles are mixed into the solution.

As titanium alkoxide, for example, titanium tetraisopropoxide (TTIP) can be used. As aluminum alkoxide, for example, aluminum isopropoxide can be used. As alcohol serving as a solvent, for example, isopropanol can be used.

The necessary amount of metal alkoxide depends on the particle size of lithium cobalt oxide. For example, when TTIP is used and the particle size (D50) of lithium cobalt oxide is approximately 20 μm, the amount of TTIP added to lithium cobalt oxide particles is preferably greater than or equal to 0.004 ml/g and less than or equal to 0.01 ml/g. When aluminum isopropoxide is used and the particle size of lithium cobalt oxide is approximately 20 μm, the amount of aluminum isopropoxide added to lithium cobalt oxide particles is preferably greater than or equal to 0.0279 g/g and less than or equal to 0.0697 g/g.

Next, a mixed solution of the alcohol solution of metal alkoxide and the lithium cobalt oxide particles is stirred under an atmosphere containing water vapor. The stirring can be performed with a magnetic stirrer, for example. The stirring time is not limited as long as water and metal alkoxide in the atmosphere cause hydrolysis and polycondensation reaction. For example, the stirring can be performed at 25° C. and a humidity of 90% RH (Relative Humidity) for 4 hours.

Reaction between water vapor and metal alkoxide in the atmosphere enables a sol-gel reaction to proceed more slowly as compared with the case where liquid water is added. Alternatively, reaction between metal alkoxide and water at room temperature enables a sol-gel reaction to proceed more slowly as compared with the case where heating is performed at a temperature higher than the boiling point of alcohol serving as a solvent, for example. A sol-gel reaction that proceeds slowly enables formation of a high-quality coating layer with a uniform thickness.

After the above process, precipitate is collected from the mixed solution. As the collection method, filtration, centrifugation, evaporation to dryness, and the like can be used. The precipitate can be washed with alcohol that is the solvent in which metal alkoxide is dissolved.

Then, the collected residue is dried. For example, vacuum drying or ventilation drying can be performed at 70° for 1 hour to 4 hours.

<Step S15: Second Heat Treatment>

Next, the lithium cobalt oxide particles that are formed in Step S14 and coated with the material containing titanium or aluminum are heated. This step is referred to as second heat treatment in some cases.

In the heating, the retention time at the retention temperature is preferably 1 hour to 50 hours, further preferably 2 hours to 20 hours. In the case where magnesium and fluorine are added, excessively short heating time might lead to insufficient segregation of magnesium and fluorine in the surface portion and the vicinity of the crystal grain boundary. In the case where coating with titanium or aluminum is performed, excessively long heating time might decrease the concentration of titanium or aluminum in the surface portion and the vicinity of the crystal grain boundary because diffusion of these metals proceeds too much.

The retention temperature is preferably higher than or equal to 500° C. and lower than or equal to 1200° C., further preferably higher than or equal to 700° C. and lower than or equal to 920° C., and still further preferably higher than or equal to 800° C. and lower than or equal to 900° C. At excessively low retention temperature, there is concern that segregation of magnesium does not occur, whereas at excessively high retention temperature, there is concern that Mg diffuses into Co sites, or a layered structure of $CoO_2$ cannot be maintained because $Co^{2+}$ such as CoO is stable instead of $Co^{3+}$ such as $LiCoO_2$, for example.

The second heat treatment is preferably performed in an oxygen-containing atmosphere. When the oxygen partial pressure is low, Co might be reduced unless the heating temperature is lowered.

In this embodiment, the retention temperature is 800° C. and kept for 2 hours, the temperature rising rate is 200° C./h, and the flow rate of oxygen is 10 L/min.

The cooling time after the heating is preferably long, in which case a crystal structure is easily stabilized. For example, the time of decreasing temperature from the retention temperature to room temperature is preferably 10 hours to 50 hours.

As described above, the heating is preferably performed a plurality of times, as the first heat treatment (Step S13) and the second heat treatment (Step S15). The temperature of the first heat treatment is higher than the melting point of $Co_3O_4$ (895° C.) and the melting point of $Li_2CO_3$ (723° C.) so that the starting materials sufficiently react with each other. The temperature of the second heat treatment is lower than that of the first heat treatment to distribute magnesium between the $CoO_2$ layers. Specifically, since the Ellingham diagram shows that $Co^{3+}$ is more stable than $Co^{2+}$ at 920° C. in the air, the temperature of the second heat treatment is preferably lower than or equal to 920° C.

<Step S16: Collecting>

Next, the cooled particles are collected. Moreover, the particles are preferably made to pass through a sieve. Through the above process, the positive electrode active material 100 of one embodiment of the present invention can be formed.

After Step S16, Step S14 to Step S16 may be repeated to perform coating by a sol-gel method a plurality of times. The number of repetitions of Step S14 to Step S16 may be once, or twice or more. In the case where cracks are generated in the lithium cobalt oxide particles, the repeated sol-gel treatment and heat treatment can decrease the number of cracks.

A plurality of sol-gel treatments may be performed with the same or different kinds of metal alkoxide. In the case of using different kinds of metal alkoxide, for example, it is possible to use titanium alkoxide in the first sol-gel treatment and aluminum alkoxide in the second sol-gel treatment.

Although this embodiment describes the material containing lithium, cobalt, and oxygen as the positive electrode active material 100, one embodiment of the present invention is not limited thereto. For example, a transition metal contained in the positive electrode active material 100 is not limited to cobalt, and at least one of nickel and manganese may be contained in very small quantity. In addition to the above transition metal, an extremely small amount of aluminum may be used as the starting materials.

One embodiment of the present invention is to reduce a change in the crystal structure between the sufficiently charged positive electrode active material and the sufficiently discharged positive electrode active material. Thus, one embodiment of the present invention does not necessarily have the pseudo-spinel crystal structure defined in this specification or contain an element such as magnesium, fluorine, titanium, or aluminum.

The positive electrode active material 100 may contain another element such as carbon, sulfur, silicon, sodium, calcium, or zirconium.

This embodiment can be implemented in appropriate combination with any of the other embodiments.

Embodiment 2

In this embodiment, examples of materials that can be used for a secondary battery containing the positive electrode active material 100 described in the above embodiment are described. In this embodiment, a secondary battery in which a positive electrode, a negative electrode, and an electrolyte solution are wrapped in an exterior body is described as an example.

[Positive Electrode]

The positive electrode includes a positive electrode active material layer and a positive electrode current collector.

<Positive Electrode Active Material Layer>

The positive electrode active material layer contains at least a positive electrode active material. The positive electrode active material layer may contain, in addition to the positive electrode active material, other materials such as a coating film of the active material surface, a conductive additive, and a binder.

As the positive electrode active material, the positive electrode active material 100 described in the above embodiment can be used. A secondary battery including the positive electrode active material 100 described in the above embodiment can have high capacity and excellent cycle performance.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, further preferably greater than or equal to 1 wt % and less than or equal to 5 wt %.

A network for electric conduction can be formed in the active material layer by the conductive additive. The conductive additive also allows the maintenance of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. Thus, a graphene compound is preferably used as the conductive additive, in which case the area where the active material and the conductive additive are in contact with each other can be increased. The graphene compound serving as the conductive additive is preferably formed with a spray dry apparatus as a coating film to cover the entire surface of the active material, in which case the electrical resistance can be reduced in some cases. Here, it is particularly preferable to use, for example, graphene, multilayer graphene, or RGO as a graphene compound. Note that RGO refers to a compound obtained by reducing graphene oxide (GO), for example.

In the case where an active material with a small particle size (e.g., 1 μm or less) is used, the specific surface area of the active material is large and thus more conductive paths for the active material particles are needed. Thus, the amount of conductive additive tends to increase and the supported amount of active material tends to decrease relatively. When the supported amount of active material decreases, the capacity of the secondary battery also decreases. In such a case, a graphene compound that can efficiently form a conductive path even with a small amount is particularly preferably used as the conductive additive because the supported amount of active material does not decrease.

A cross-sectional structure example of an active material layer 200 containing a graphene compound as a conductive additive is described below.

Figure 6A:
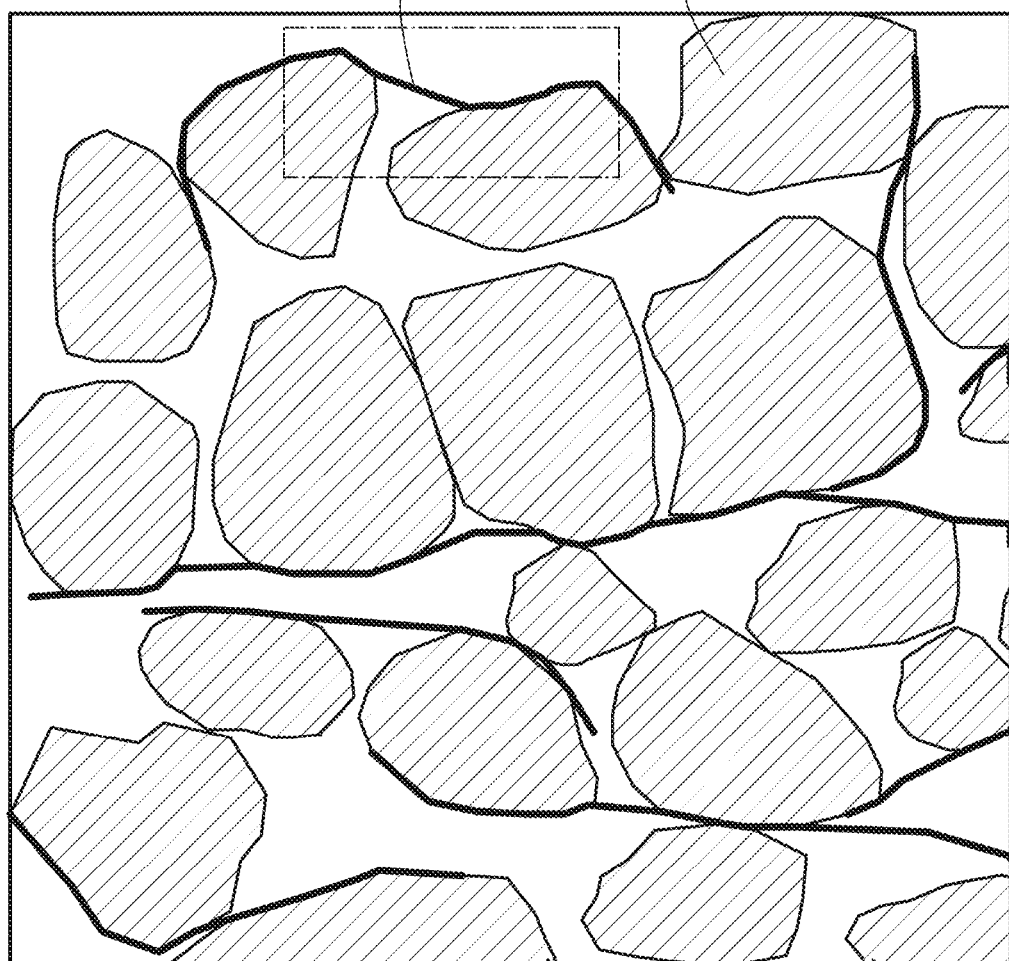
FIGS. 6A and 6B are cross-sectional views of an active material layer containing a graphene compound as a conductive additive.

FIG. 6A is a longitudinal cross-sectional view of the active material layer 200. The active material layer 200 includes particles of the positive electrode active material 100, a graphene compound 201 serving as a conductive additive, and a binder (not illustrated). Here, graphene or multilayer graphene may be used as the graphene compound 201, for example. The graphene compound 201 preferably has a sheet-like shape. The graphene compound 201 may have a sheet-like shape formed of a plurality of sheets of multilayer graphene and/or a plurality of sheets of graphene that partly overlap with each other.

Figure 6B:
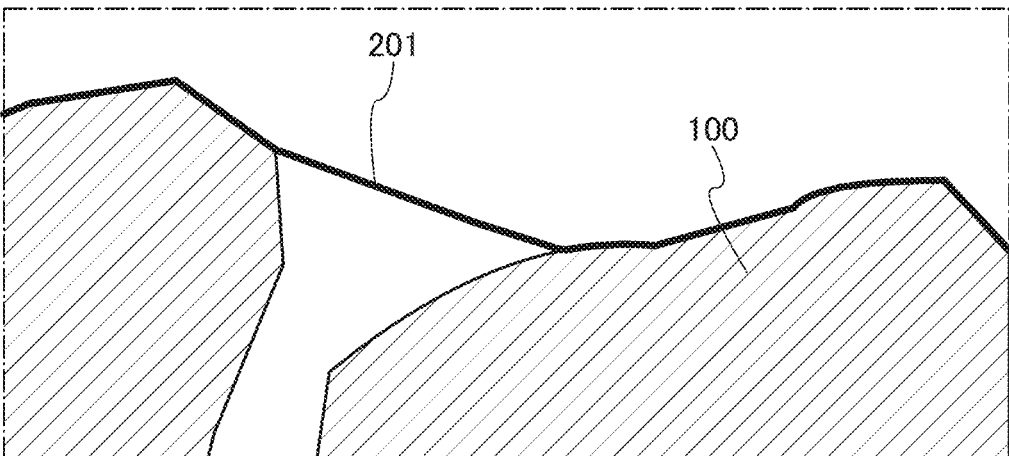

The longitudinal cross section of the active material layer 200 in FIG. 6B shows substantially uniform dispersion of the sheet-like graphene compounds 201 in the active material layer 200. The graphene compounds 201 are schematically shown by thick lines in FIG. 6B but are actually thin films each having a thickness corresponding to the thickness of a single layer or a multi-layer of carbon molecules. The plurality of graphene compounds 201 are formed to partly coat or adhere to the surfaces of the plurality of particles of the positive electrode active material 100, so that the graphene compounds 201 make surface contact with the particles of the positive electrode active material 100.

Here, the plurality of graphene compounds are bonded to each other to form a net-like graphene compound sheet (hereinafter, referred to as a graphene compound net or a graphene net). The graphene net covering the active material can function as a binder for bonding active materials. The amount of binder can thus be reduced, or the binder does not have to be used. This can increase the proportion of the active material in the electrode volume or weight. That is to say, the capacity of the secondary battery can be increased.

Here, it is preferable to perform reduction after a layer to be the active material layer 200 is formed in such a manner that graphene oxide is used as the graphene compound 201 and mixed with an active material. When graphene oxide with extremely high dispersibility in a polar solvent is used for the formation of the graphene compounds 201, the graphene compounds 201 can be substantially uniformly dispersed in the active material layer 200. The solvent is removed by volatilization from a dispersion medium in which graphene oxide is uniformly dispersed, and the graphene oxide is reduced; hence, the graphene compounds 201 remaining in the active material layer 200 partly overlap with each other and are dispersed such that surface contact is made, thereby forming a three-dimensional conduction path. Note that graphene oxide can be reduced either by heat treatment or with the use of a reducing agent, for example.

Unlike conductive additive particles that make point contact with an active material, such as acetylene black, the graphene compound 201 is capable of making low-resistance surface contact; accordingly, the electrical conduction between the particles of the positive electrode active material 100 and the graphene compounds 201 can be improved with a smaller amount of the graphene compound 201 than that of a normal conductive additive. This increases the proportion of the particles of the positive electrode active material 100 in the active material layer 200, resulting in increased discharge capacity of the secondary battery.

It is possible to form a graphene compound serving as a conductive additive as a coating film to cover the entire surface of the active material and to form a conductive path between the active materials using the graphene compound in advance with a spray dry apparatus.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

For the binder, for example, water-soluble polymers are preferably used. As the water-soluble polymers, for example, a polysaccharide can be used. As the polysaccharide, for example, a cellulose derivative such as carboxymethyl cellulose (CMC), methyl cellulose, ethyl cellulose, hydroxypropyl cellulose, diacetyl cellulose, and regenerated cellulose or starch can be used. It is further preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder, such as styrene-butadiene rubber, in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolyte solution. Here, the passivation film refers to a film without electric conductivity or a film with extremely low electric conductivity, and can suppress the decomposition of an electrolyte solution at a potential at which a battery reaction occurs in the case where the passivation film is formed on the active material surface, for example. It is preferred that the passivation film can conduct lithium ions while suppressing electric conduction.

<Positive Electrode Current Collector>

The positive electrode current collector can be formed using a material that has high conductivity, such as a metal like stainless steel, gold, platinum, aluminum, and titanium, or an alloy thereof. It is preferred that a material used for the positive electrode current collector not dissolve at the potential of the positive electrode. Alternatively, the positive electrode current collector can be formed using an aluminum alloy to which an element that improves heat resistance, such as silicon, titanium, neodymium, scandium, or molybdenum, is added. Still alternatively, a metal element that forms silicide by reacting with silicon may be used. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of greater than or equal to 5 μm and less than or equal to 30

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element that enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $Sn_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium and a compound containing the element, for example, may be referred to as an alloy-based material.

In this specification and the like, SiO refers, for example, to silicon monoxide. Note that SiO can alternatively be expressed as $SiO_x$. Here, x preferably has an approximate value of 1. For example, x is preferably 0.2 or more and 1.5 or less, further preferably 0.3 or more and 1.2 or less.

As the carbon-based material, graphite, graphitizing carbon (soft carbon), non-graphitizing carbon (hard carbon), carbon nanotube, graphene, carbon black, and the like may be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it is relatively easy to have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into graphite (when a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Alternatively, for the negative electrode active material, oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material; for example, a transition metal oxide that does not form an alloy with lithium, such as cobalt oxide (CoO), nickel oxide (NiO), and iron oxide (FeO), may be used. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material which is not alloyed with carrier ions such as lithium is preferably used for the negative electrode current collector.

[Electrolyte Solution]

The electrolyte solution contains a solvent and an electrolyte. As the solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more ionic liquids (room temperature molten salts) that are less likely to burn and volatize as the solvent of the electrolyte solution can prevent a secondary battery from exploding or catching fire even when the secondary battery internally shorts out or the internal temperature increases owing to overcharging or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a secondary battery is preferably highly purified and contains small numbers of dust particles and elements other than the constituent elements of the electrolyte solution (hereinafter, also simply referred to as impurities). Specifically, the weight ratio of impurities to the electrolyte solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of a material to be added in the whole solvent is, for example, higher than or equal to 0.1 wt % and lower than or equal to 5 wt %.

Alternatively, a polymer gelled electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

[Separator]

The secondary battery preferably includes a separator. As the separator, for example, paper; nonwoven fabric; glass fiber; ceramics; or synthetic fiber containing nylon (polyamide), vinylon (polyvinyl alcohol-based fiber), polyester, acrylic, polyolefin, or polyurethane can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

Deterioration of the separator in charging and discharging at high voltage can be suppressed and thus the reliability of the secondary battery can be improved because oxidation resistance is improved when the separator is coated with the ceramic-based material. In addition, when the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film that is in contact with the positive electrode may be coated with the mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

For an exterior body included in the secondary battery, a metal material such as aluminum or a resin material can be used, for example. An exterior body in the form of a film can also be used. As the film, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

[Charging and Discharging Methods]

The secondary battery can be charged and discharged in the following manner, for example.

<<CC Charge>>

Figure 7A:
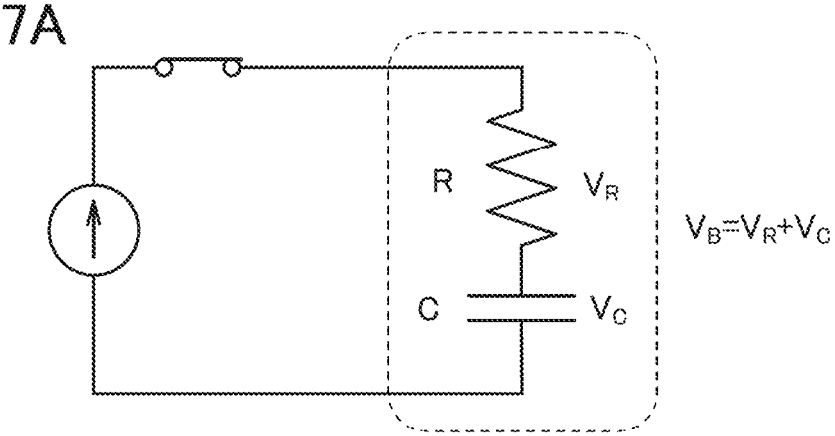
FIGS. 7A to 7C show a method for charging a secondary battery.

First, CC charge, which is one of charging methods, is described. CC charge is a charging method in which a constant current is made to flow to a secondary battery in the whole charging period and charge is terminated when the voltage reaches a predetermined voltage. The secondary battery is assumed to be an equivalent circuit with internal resistance R and secondary battery capacitance C as illustrated in FIG. 7A. In that case, a secondary battery voltage $V_B$ is the sum of a voltage $V_R$ applied to the internal resistance R and a voltage $V_C$ applied to the secondary battery capacitance C.

While the CC charge is performed, a switch is on as illustrated in FIG. 7A, so that a constant current I flows to the secondary battery. During the period, the current I is constant; thus, in accordance with the Ohm's law ($V_R=R\times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 7B:
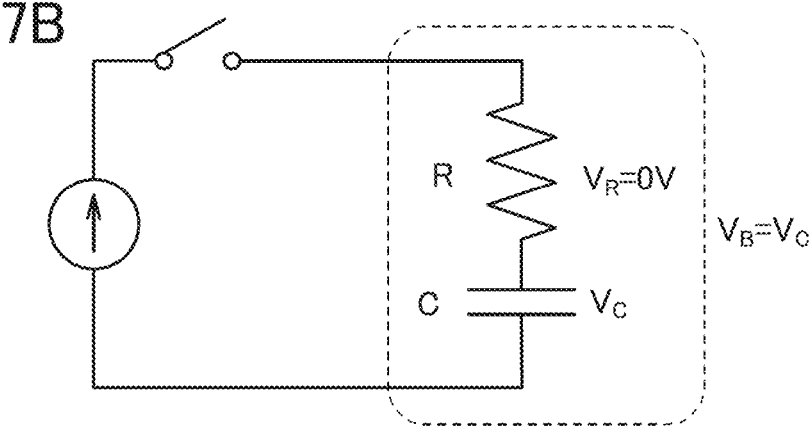

When the secondary battery voltage $V_B$ reaches a predetermined voltage, e.g., 4.3 V, the charge is terminated. On termination of the CC charge, the switch is turned off as illustrated in FIG. 7B, and the current I becomes 0. Thus, the voltage $V_R$ applied to the internal resistance R becomes 0 V. Consequently, the secondary battery voltage $V_B$ is decreased by the lost voltage drop in the internal resistance R.

Figure 7C:
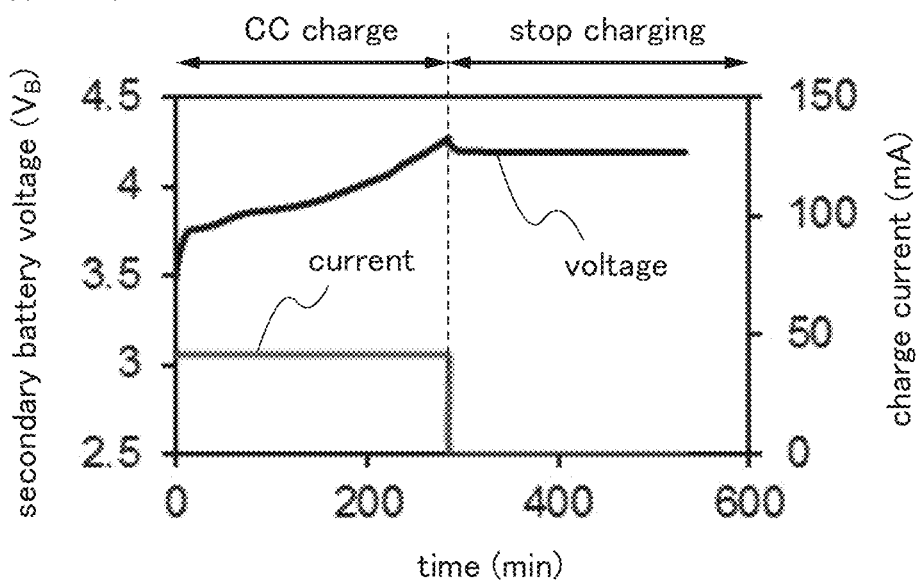

FIG. 7C shows an example of the secondary battery voltage $V_B$ and charging current during a period in which the CC charge is performed and after the CC charge is terminated. The secondary battery voltage $V_B$ increases while the CC charge is performed, and slightly decreases after the CC charge is terminated.

<<CCCV Charge>>

Next, CCCV charge, which is a charging method different from the above-described method, is described. CCCV charge is a charging method in which CC charge is performed until the voltage reaches a predetermined voltage and then constant voltage (CV) charge is performed until the amount of current flow becomes small, specifically, a termination current value.

Figure 8A:
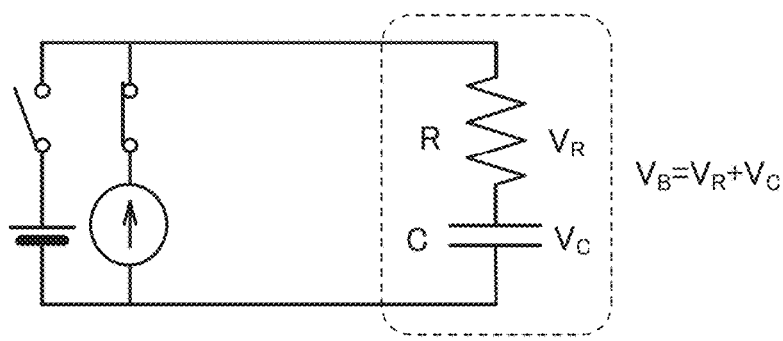
FIGS. 8A to 8D show a method for charging a secondary battery.

While the CC charge is performed, a switch of a constant current power source is on and a switch of a constant voltage power source is off as illustrated in FIG. 8A, so that the constant current I flows to the secondary battery. During the period, the current I is constant; thus, in accordance with the Ohm's law ($V_R=R\times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 8B:
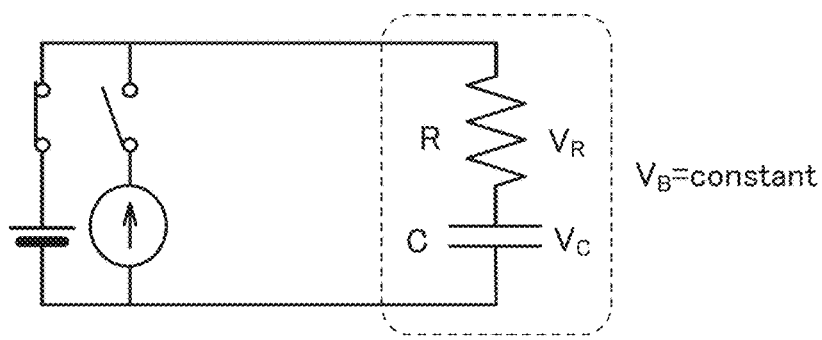

When the secondary battery voltage $V_B$ reaches a predetermined voltage, e.g., 4.3 V, switching is performed from the CC charge to the CV charge. While the CV charge is performed, the switch of the constant voltage power source is on and the switch of the constant current power source is off as illustrated in FIG. 8B; thus, the secondary battery voltage $V_B$ is constant. In contrast, the voltage $V_C$ applied to the secondary battery capacitance C increases over time. Since $V_B=V_R+V_C$ is satisfied, the voltage $V_R$ applied to the internal resistance R decreases over time. As the voltage $V_R$ applied to the internal resistance R decreases, the current I flowing to the secondary battery also decreases in accordance with the Ohm's law ($V_R=R\times I$).

Figure 8C:
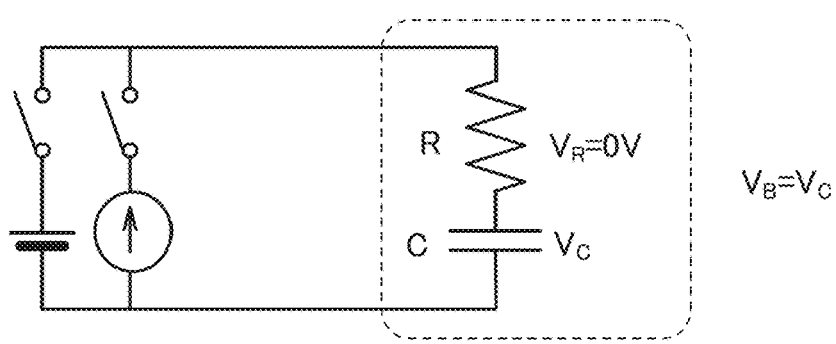

When the current I flowing to the secondary battery becomes a predetermined current, e.g., approximately 0.01 C, charge is terminated. On termination of the CCCV charge, all the switches are turned off as illustrated in FIG. 8C, so that the current I becomes 0. Thus, the voltage $V_R$ applied to the internal resistance R becomes 0 V. However, the voltage $V_R$ applied to the internal resistance R becomes sufficiently small by the CV charge; thus, even when a voltage drop no longer occurs in the internal resistance R, the secondary battery voltage $V_B$ hardly decreases.

Figure 8D:
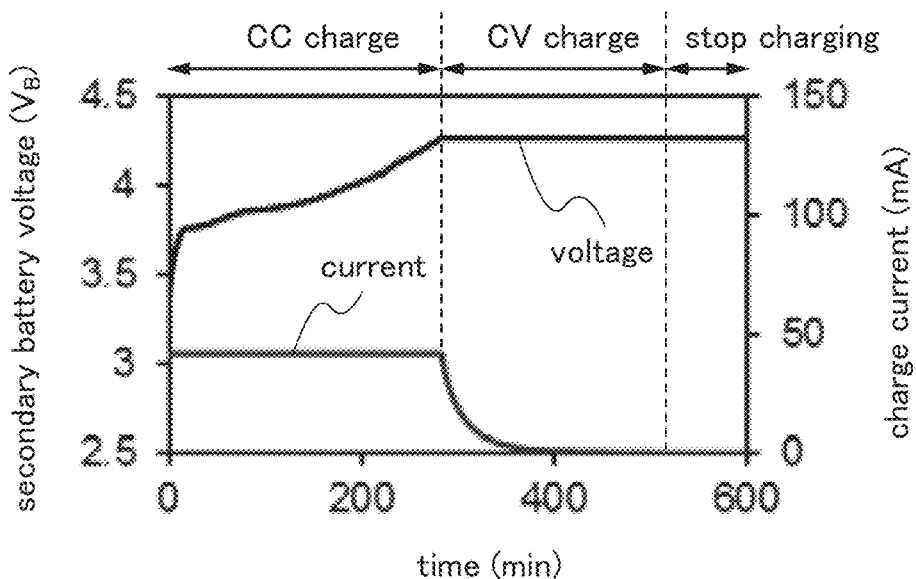

FIG. 8D shows an example of the secondary battery voltage $V_B$ and charging current while the CCCV charge is performed and after the CCCV charge is terminated. Even after the CCCV charge is terminated, the secondary battery voltage $V_B$ hardly decreases.

<<CC Discharge>>

Next, CC discharge, which is one of discharging methods, is described. CC discharge is a discharging method in which a constant current is made to flow from the secondary battery in the whole discharging period, and discharge is terminated when the secondary battery voltage $V_B$ reaches a predetermined voltage, e.g., 2.5 V.

Figure 9:
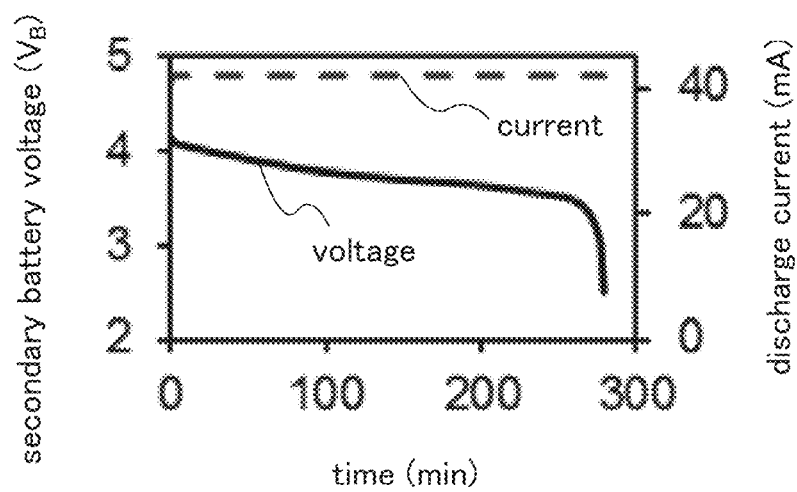
FIG. 9 shows a method for discharging a secondary battery.

FIG. 9 shows an example of the secondary battery voltage $V_B$ and discharging current while the CC discharge is performed. As discharge proceeds, the secondary battery voltage $V_B$ decreases.

Next, a discharge rate and a charge rate are described. The discharge rate refers to the relative ratio of discharging current to battery capacity and is expressed in a unit C. A current of approximately 1 C in a battery with a rated capacity X (Ah) is X A. The case where discharge is performed at a current of 2X A is rephrased as follows: discharge is performed at 2 C. The case where discharge is performed at a current of X/5 A is rephrased as follows: discharge is performed at 0.2 C. Similarly, the case where charge is performed at a current of 2X A is rephrased as follows: charge is performed at 2 C, and the case where charge is performed at a current of X/5 A is rephrased as follows: charge is performed at 0.2 C.

Embodiment 3

In this embodiment, examples of a shape of a secondary battery containing the positive electrode active material 100 described in the above embodiment are described. For the materials used for the secondary battery described in this embodiment, refer to the description of the above embodiment.

[Coin-Type Secondary Battery]

Figure 10A:
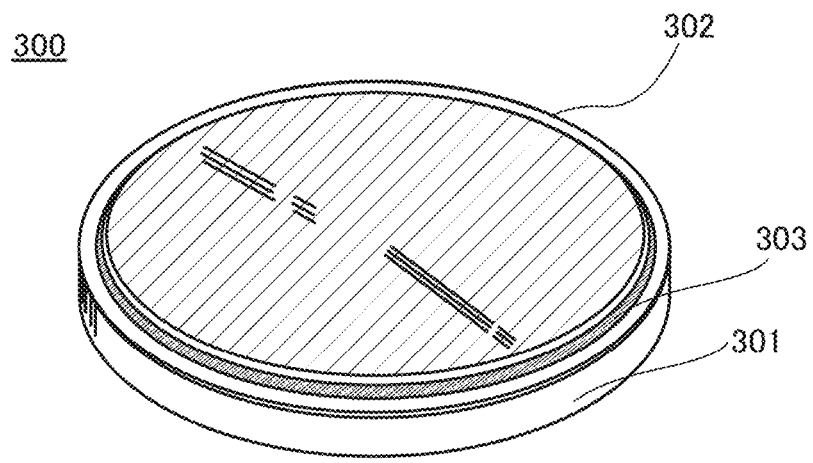
FIGS. 10A to 10C illustrate a coin-type secondary battery.
Figure 10B:
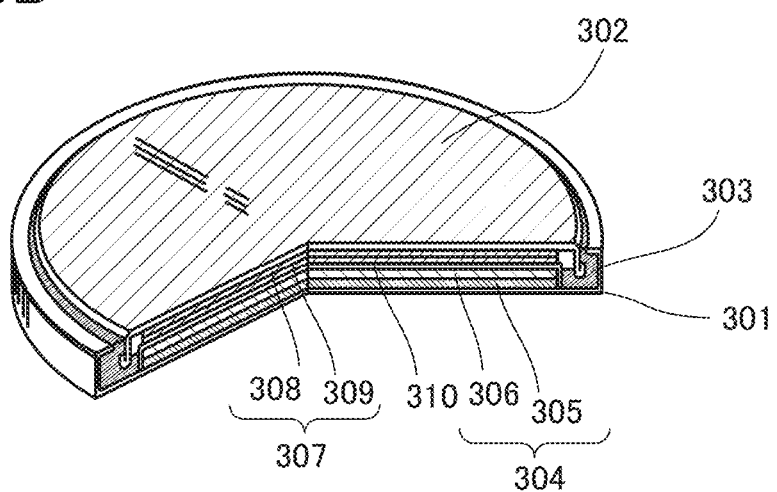

First, an example of a coin-type secondary battery is described. FIG. 10A is an external view of a coin-type (single-layer flat type) secondary battery, and FIG. 10B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and a separator 310 are immersed in the electrolyte solution. Then, as illustrated in FIG. 10B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In such a manner, the coin-type secondary battery 300 can be manufactured.

When the positive electrode active material described in the above embodiment is used in the positive electrode 304, the coin-type secondary battery 300 with high capacity and excellent cycle performance can be obtained.

Here, a current flow in charging a secondary battery is described with reference to FIG. 10C. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high reaction potential is called a positive electrode and an electrode with a low reaction potential is called a negative electrode. For this reason, in this specification, the positive electrode is referred to as a "positive electrode" or a "plus electrode" and the negative electrode is referred to as a "negative electrode" or a "minus electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive (plus) electrode or a negative (minus) electrode.

Figure 10C:
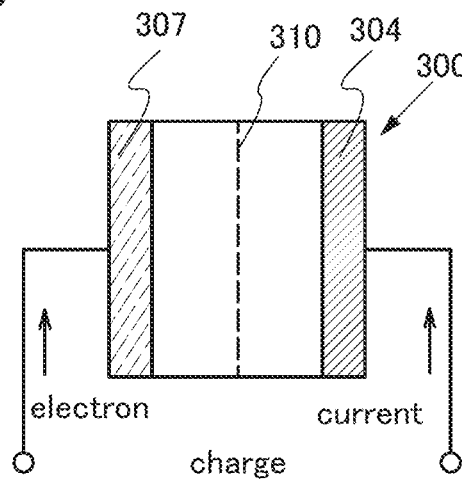

Two terminals in FIG. 10C are connected to a charger, and the secondary battery 300 is charged. As the charge of the secondary battery 300 proceeds, a potential difference between electrodes increases.

[Cylindrical Secondary Battery]

Figure 11A:
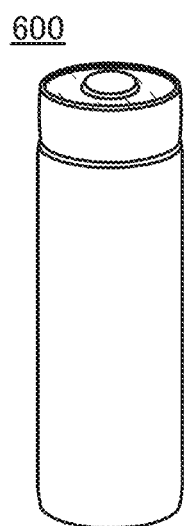
FIGS. 11A to 11D illustrate a cylindrical secondary battery.

Next, an example of a cylindrical secondary battery is described with reference to FIGS. 11A to 11D. A cylindrical secondary battery 600 includes, as illustrated in FIG. 11A, a positive electrode cap (battery lid) 601 on the top surface and a battery can (outer can) 602 on the side and bottom surfaces. The positive electrode cap and the battery can (outer can) 602 are insulated from each other by a gasket (insulating gasket) 610.

Figure 11B:
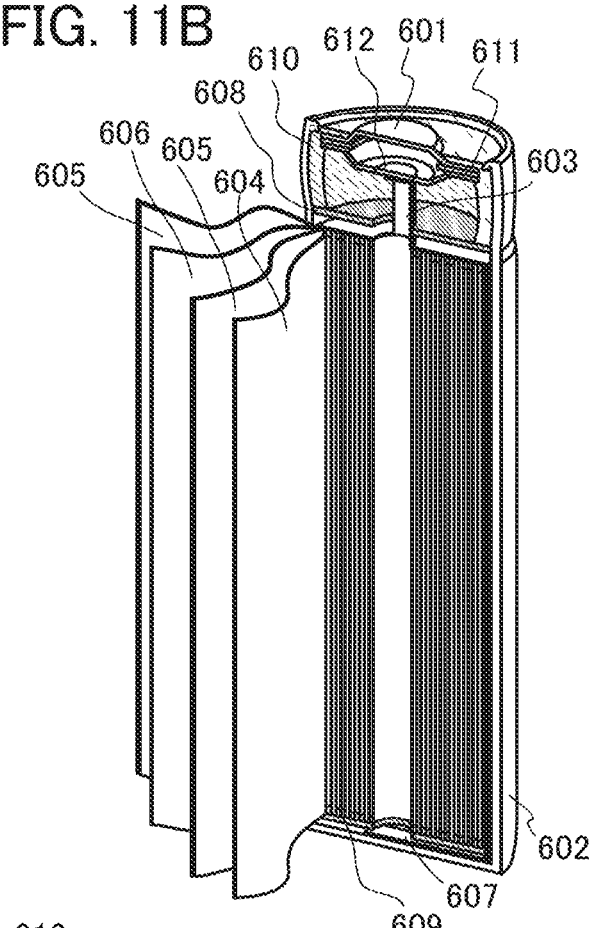

FIG. 11B is a schematic cross-sectional view of the cylindrical secondary battery. Inside the battery can 602 having a hollow cylindrical shape, a battery element in which a strip-like positive electrode 604 and a strip-like negative electrode 606 are wound with a strip-like separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since the positive electrode and the negative electrode of the cylindrical secondary battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramic can be used for the PTC element.

Figure 11C:
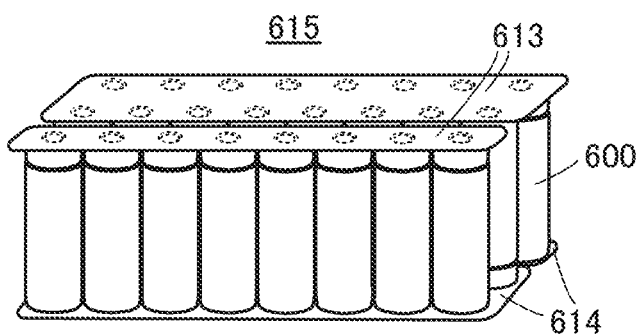

Alternatively, as illustrated in FIG. 11C, a plurality of secondary batteries 600 may be provided between a conductive plate 613 and a conductive plate 614 to form a module 615. The plurality of secondary batteries 600 may be connected in parallel, connected in series, or connected in series after being connected in parallel. With the module 615 including the plurality of secondary batteries 600, large electric power can be extracted.

Figure 11D:
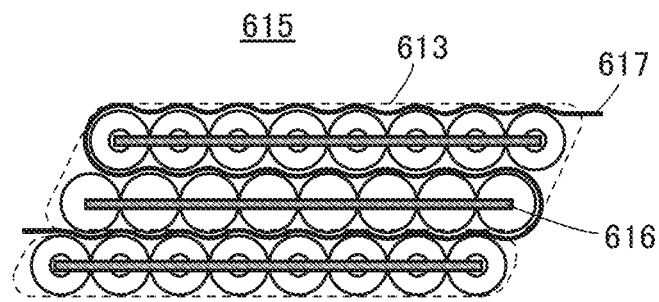

FIG. 11D is a top view of the module 615. The conductive plate 613 is shown by a dotted line for clarity of the drawing. As illustrated in FIG. 11D, the module 615 may include a wiring 616 electrically connecting the plurality of secondary batteries 600 with each other. It is possible to provide the conductive plate over the wiring 616 to overlap with each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

When the positive electrode active material described in the above embodiment is used in the positive electrode 604, the cylindrical secondary battery 600 with high capacity and excellent cycle performance can be obtained.

[Structure Examples of Secondary Battery]

Other structure examples of secondary batteries are described with reference to FIGS. 12A and 12B, FIGS. 13A-1, 13A-2, 13B-1, and 13B-2, FIGS. 14A and 14B, and FIG. 15.

Figure 12A:
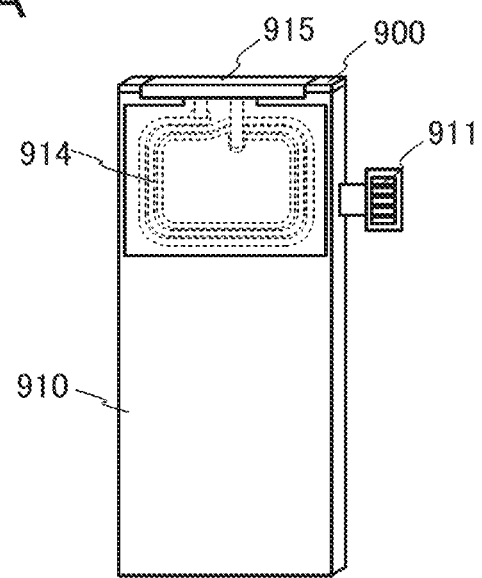
FIGS. 12A and 12B illustrate an example of a secondary battery.
Figure 12B:
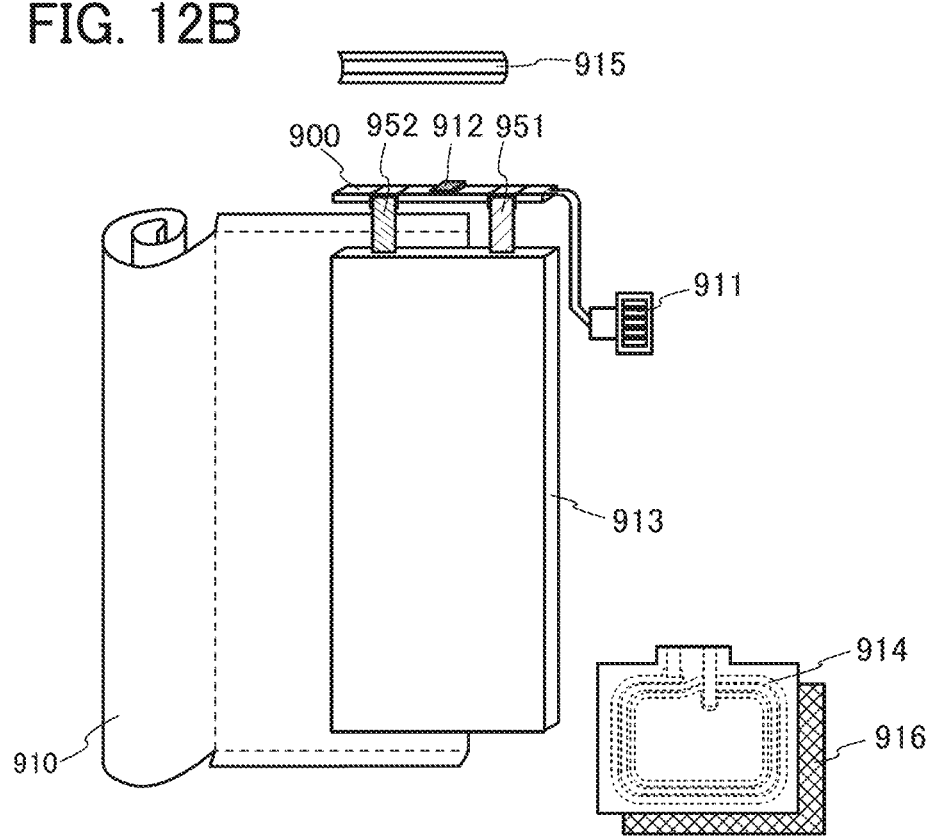

FIGS. 12A and 12B are external views of a secondary battery. A secondary battery 913 is connected to an antenna 914 and an antenna 915 with a circuit board 900 positioned therebetween. A label 910 is attached to the secondary battery 913. In addition, as illustrated in FIG. 12B, the secondary battery 913 is connected to a terminal 951 and a terminal 952.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. Note that the shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, a dielectric antenna, or the like may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

A layer 916 is provided between the secondary battery 913 and the antennas 914 and 915. The layer 916 has a function of blocking an electromagnetic field from the secondary battery 913, for example. As the layer 916, for example, a magnetic body can be used.

Note that the structure of the secondary battery is not limited to that illustrated in FIGS. 12A and 12B.

Figures 1, 13A:
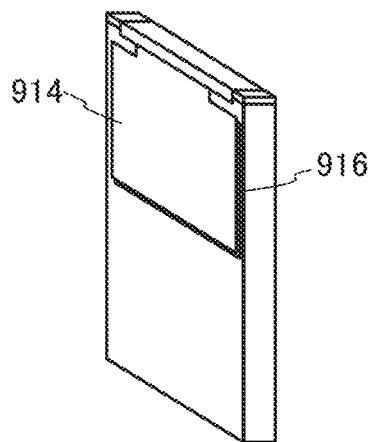
Figures 2, 13A:
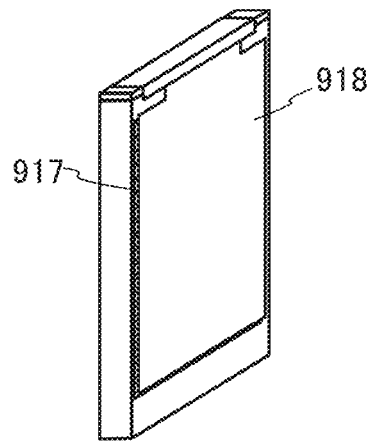

For example, as illustrated in FIGS. 13A-1 and 13A-2, two opposite surfaces of the secondary battery 913 in FIGS. 12A and 12B may be provided with respective antennas. FIG. 13A-1 is an external view illustrating one side of the opposite surfaces, and FIG. 13A-2 is an external view illustrating the other side of the opposite surfaces. For portions similar to those in FIGS. 12A and 12B, refer to description of the secondary battery illustrated in FIGS. 12A and 12B as appropriate.

As illustrated in FIG. 13A-1, the antenna 914 is provided on one of the opposite surfaces of the secondary battery 913 with the layer 916 located therebetween, and as illustrated in FIG. 13A-2, an antenna 918 is provided on the other of the opposite surfaces of the secondary battery 913 with a layer 917 located therebetween. The layer 917 has a function of blocking an electromagnetic field from the secondary battery 913, for example. As the layer 917, for example, a magnetic body can be used.

With the above structure, both of the antennas 914 and 918 can be increased in size. The antenna 918 has a function of communicating data with an external device, for example. An antenna with a shape that can be used for the antenna 914, for example, can be used as the antenna 918. As a system for communication using the antenna 918 between the secondary battery and another device, a response method that can be used between the secondary battery and another device, such as near field communication (NFC), can be employed.

Figures 1, 13B:
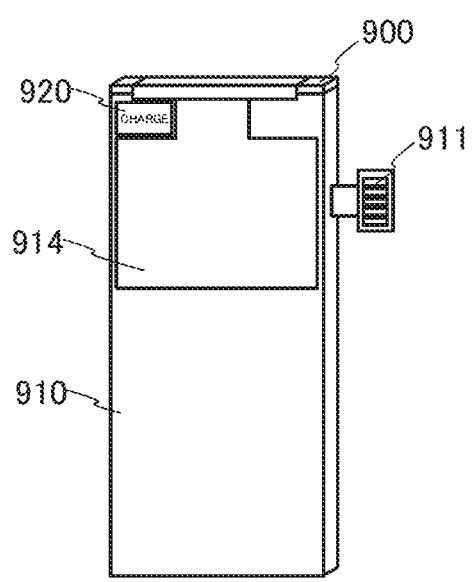
Figures 2, 13B:
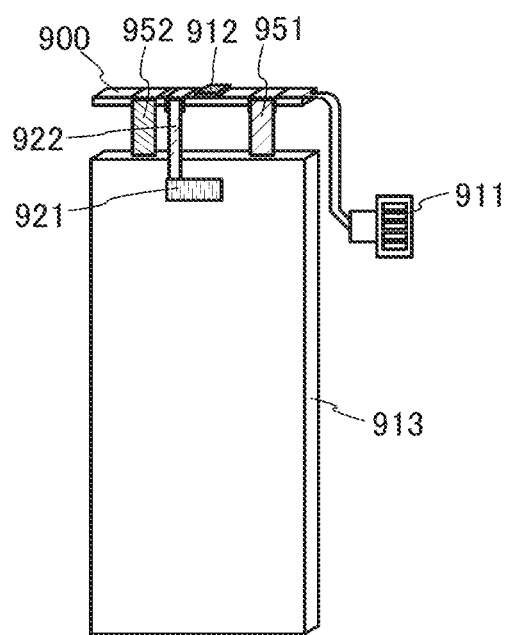

Alternatively, as illustrated in FIG. 13B-1, the secondary battery 913 in FIGS. 12A and 12B may be provided with a display device 920. The display device 920 is electrically connected to the terminal 911. Note that the label 910 is not necessarily provided in a portion where the display device 920 is provided. For portions similar to those in FIGS. 12A and 12B, refer to the description of the secondary battery illustrated in FIGS. 12A and 12B as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Alternatively, as illustrated in FIG. 13B-2, the secondary battery 913 illustrated in FIGS. 12A and 12B may be provided with a sensor 921. The sensor 921 is electrically connected to the terminal 911 via a terminal 922. For portions similar to those in FIGS. 12A and 12B, refer to the description of the secondary battery illustrated in FIGS. 12A and 12B as appropriate.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With the sensor 921, for example, data on an environment (e.g., temperature) where the secondary battery is placed can be acquired and stored in a memory inside the circuit 912.

Furthermore, structure examples of the secondary battery 913 are described with reference to FIGS. 14A and 14B and FIG. 15.

Figure 14A:
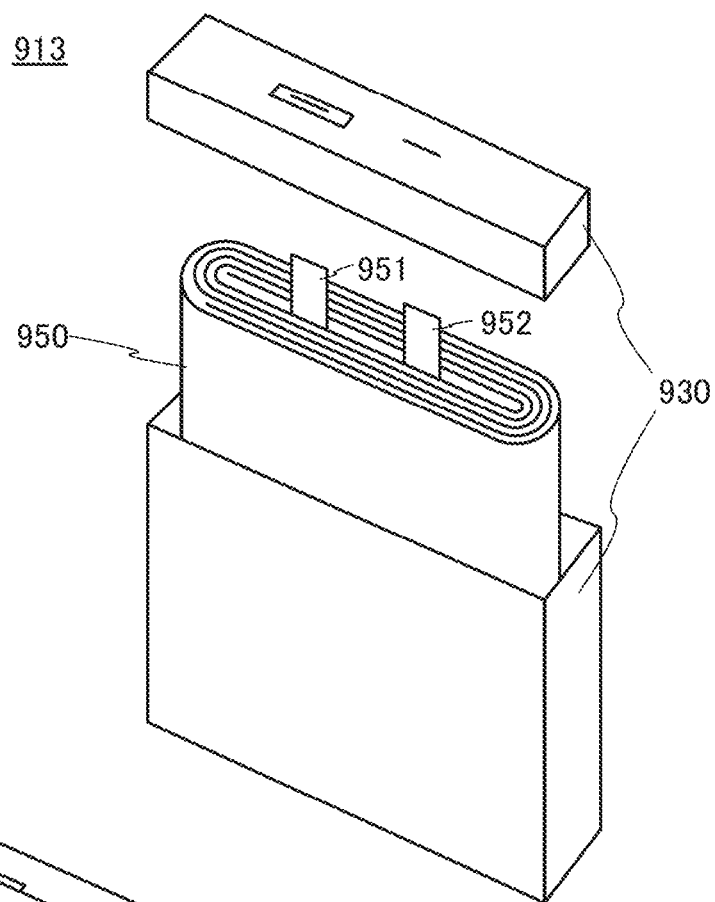
FIGS. 14A and 14B illustrate examples of secondary batteries.

The secondary battery 913 illustrated in FIG. 14A includes a wound body 950 provided with the terminals 951 and 952 inside a housing 930. The wound body 950 is soaked in an electrolyte solution inside the housing 930. The terminal 952 is in contact with the housing 930. An insulator or the like inhibits contact between the terminal 951 and the housing 930. Note that in FIG. 14A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 14B:
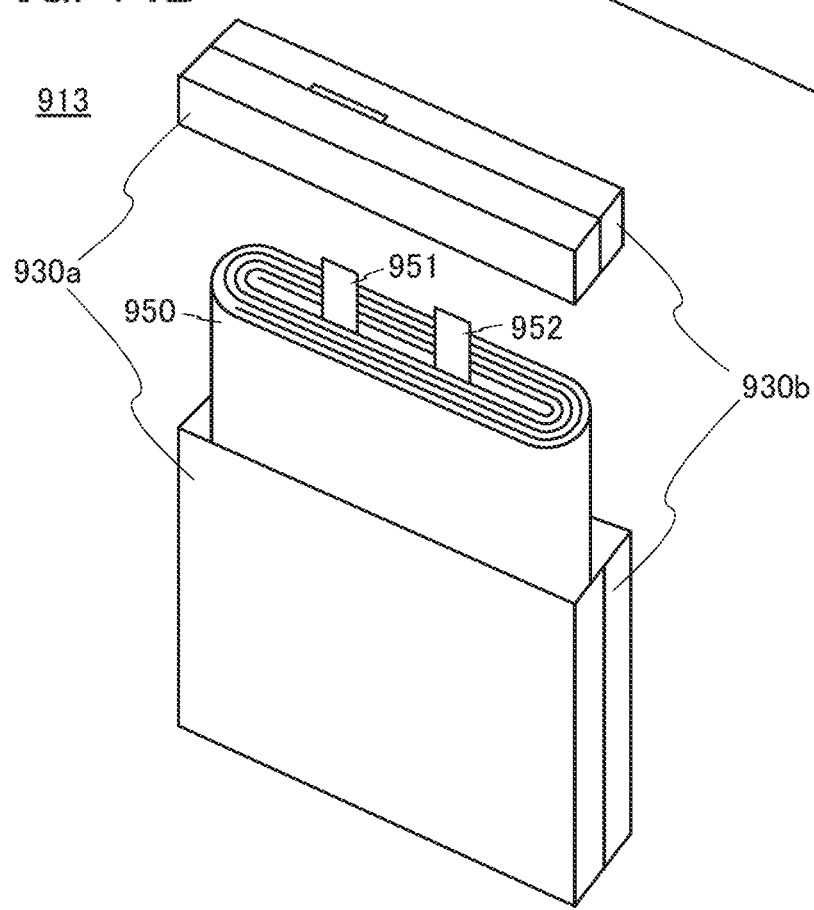

Note that as illustrated in FIG. 14B, the housing 930 in FIG. 14A may be formed using a plurality of materials. For example, in the secondary battery 913 in FIG. 14B, a housing 930a and a housing 930b are bonded to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930a, an antenna such as the antennas 914 and 915 may be provided inside the housing 930a. For the housing 930b, a metal material can be used, for example.

Figure 15:
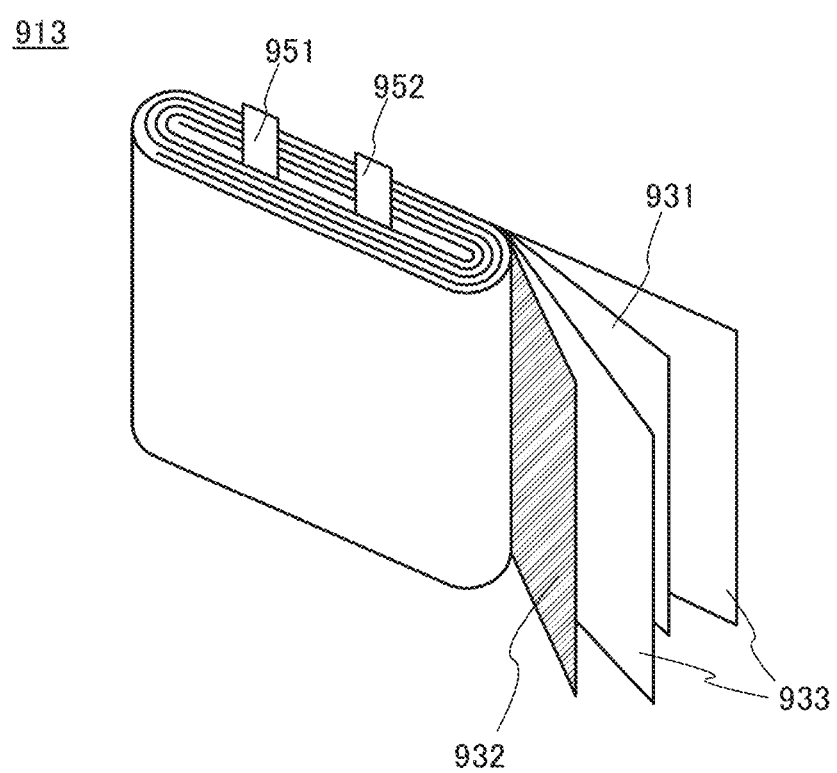
FIG. 15 illustrates an example of a secondary battery.

FIG. 15 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be stacked.

The negative electrode 931 is connected to the terminal 911 in FIGS. 12A and 12B via one of the terminals 951 and 952. The positive electrode 932 is connected to the terminal 911 in FIGS. 12A and 12B via the other of the terminals 951 and 952.

When the positive electrode active material described in the above embodiment is used in the positive electrode 932, the secondary battery 913 with high capacity and excellent cycle performance can be obtained.

[Laminated Secondary Battery]

Next, an example of a laminated secondary battery is described with reference to FIGS. 16A to 16C, FIGS. 17A and 17B, FIG. 18, FIG. 19, FIGS. 20A to 20C, FIGS. 21A, 21B1, 21B2, 21C, and 21D, and FIGS. 22A and 22B. When the laminated secondary battery has flexibility and is used in an electronic device at least part of which is flexible, the secondary battery can be bent as the electronic device is bent.

A laminated secondary battery 980 is described with reference to FIGS. 16A to 16C. The laminated secondary battery 980 includes a wound body 993 illustrated in FIG. 16A. The wound body 993 includes a negative electrode 994, a positive electrode 995, and separators 996. The wound body 993 is, like the wound body 950 illustrated in FIG. 15, obtained by winding a sheet of a stack in which the negative electrode 994 overlaps with the positive electrode 995 with the separator 996 provided therebetween.

Note that the number of stacks each including the negative electrode 994, the positive electrode 995, and the separator 996 may be determined as appropriate depending on required capacity and element volume. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 16A:
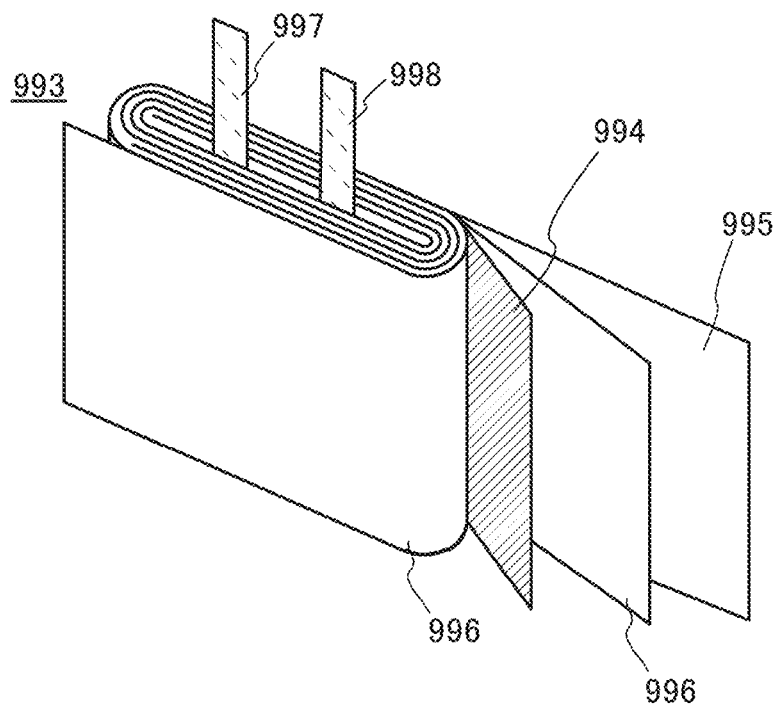
FIGS. 16A to 16C illustrate a laminated secondary battery.
Figure 16B:
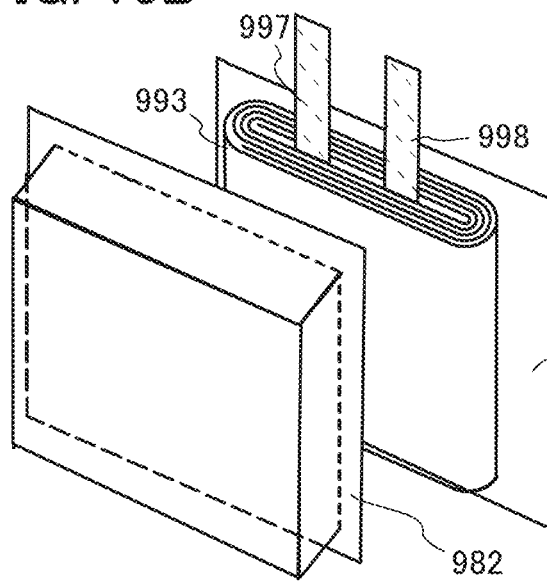
Figure 16C:
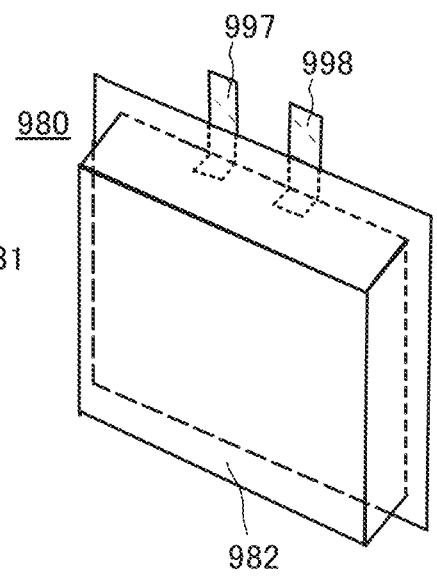

As illustrated in FIG. 16B, the wound body 993 is packed in a space formed by bonding a film 981 and a film 982 having a depressed portion that serve as exterior bodies by thermocompression bonding or the like, whereby the secondary battery 980 illustrated in FIG. 16C can be formed. The wound body 993 includes the lead electrode 997 and the lead electrode 998, and is soaked in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible secondary battery can be fabricated.

Although FIGS. 16B and 16C illustrate an example where a space is formed by two films, the wound body 993 may be placed in a space formed by bending one film.

When the positive electrode active material described in the above embodiment is used in the positive electrode 995, the secondary battery 980 with high capacity and excellent cycle performance can be obtained.

Figure 17A:
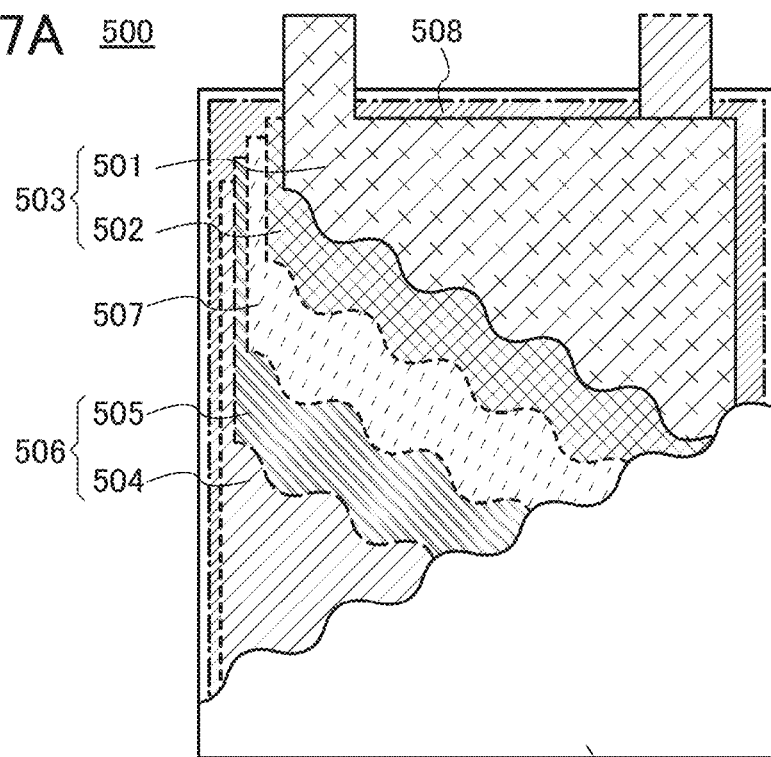
FIGS. 17A and 17B illustrate a laminated secondary battery.
Figure 17B:
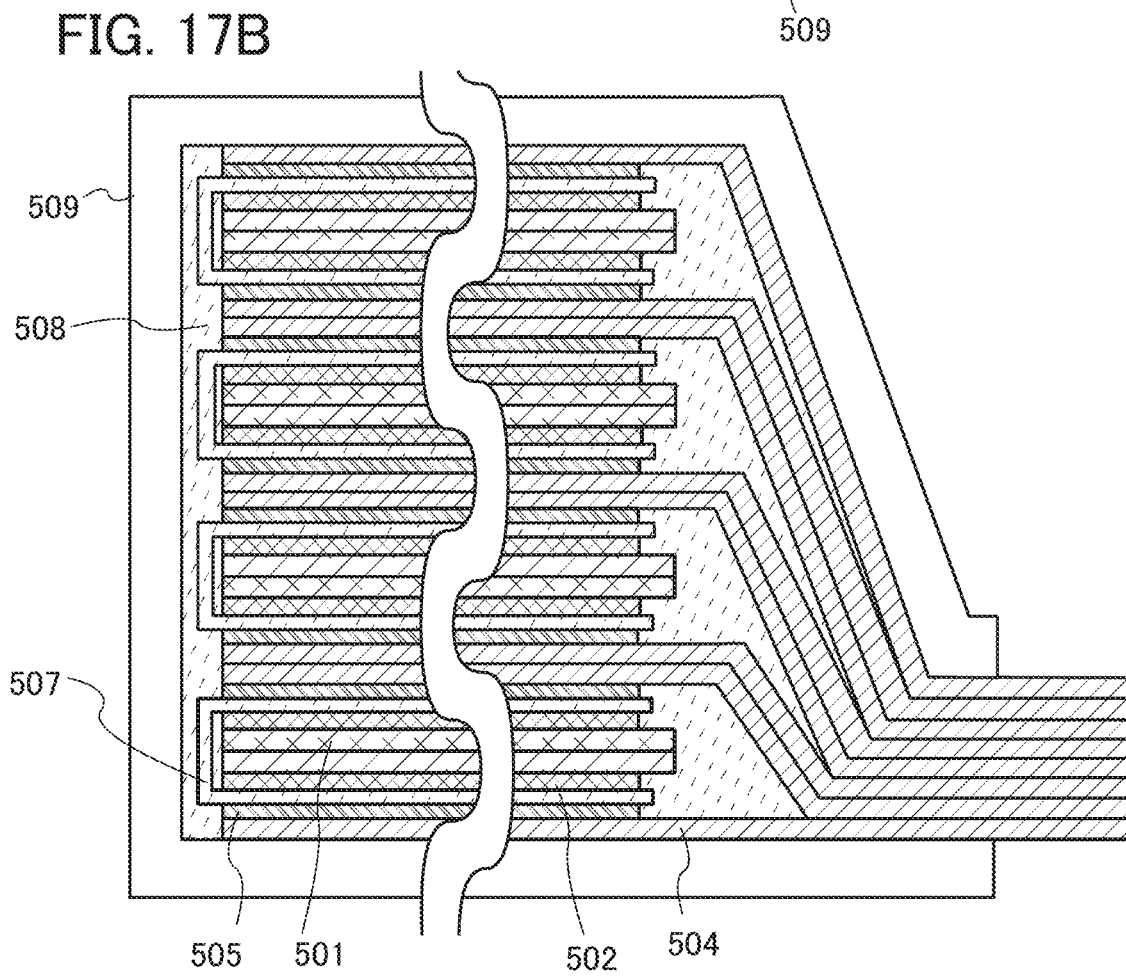

In FIGS. 16A to 16C, an example in which the secondary battery 980 includes a wound body in a space formed by films serving as exterior bodies is described; however, as illustrated in FIGS. 17A and 17B, a secondary battery may include a plurality of strip-shaped positive electrodes, a plurality of strip-shaped separators, and a plurality of strip-shaped negative electrodes in a space formed by films serving as exterior bodies, for example.

A laminated secondary battery 500 illustrated in FIG. 17A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The exterior body 509 is filled with the electrolyte solution 508. The electrolyte solution described in Embodiment 2 can be used as the electrolyte solution 508.

In the laminated secondary battery 500 illustrated in FIG. 17A, the positive electrode current collector 501 and the negative electrode current collector 504 also serve as terminals for electrical contact with the outside. For this reason, the positive electrode current collector 501 and the negative electrode current collector 504 may be arranged so that part of the positive electrode current collector 501 and part of the negative electrode current collector 504 are exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 of the laminated secondary battery 500, for example, a film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

FIG. 17B illustrates an example of a cross-sectional structure of the laminated secondary battery 500. Although FIG. 17A illustrates an example in which only two current collectors are included for simplicity, an actual battery includes a plurality of electrode layers as illustrated in FIG. 17B.

In FIG. 17B, the number of electrode layers is 16, for example. The laminated secondary battery 500 has flexibility even though including 16 electrode layers. FIG. 17B illustrates a structure including 8 layers of negative electrode current collectors 504 and 8 layers of positive electrode current collectors 501, i.e., 16 layers in total. Note that FIG. 17B illustrates a cross section of the lead portion of the negative electrode, and the 8 layers of the negative electrode current collectors 504 are bonded to each other by ultrasonic welding. It is needless to say that the number of electrode layers is not limited to 16, and may be more than 16 or less than 16. With a large number of electrode layers, the secondary battery can have high capacity. In contrast, with a small number of electrode layers, the secondary battery can have small thickness and high flexibility.

Figure 18:
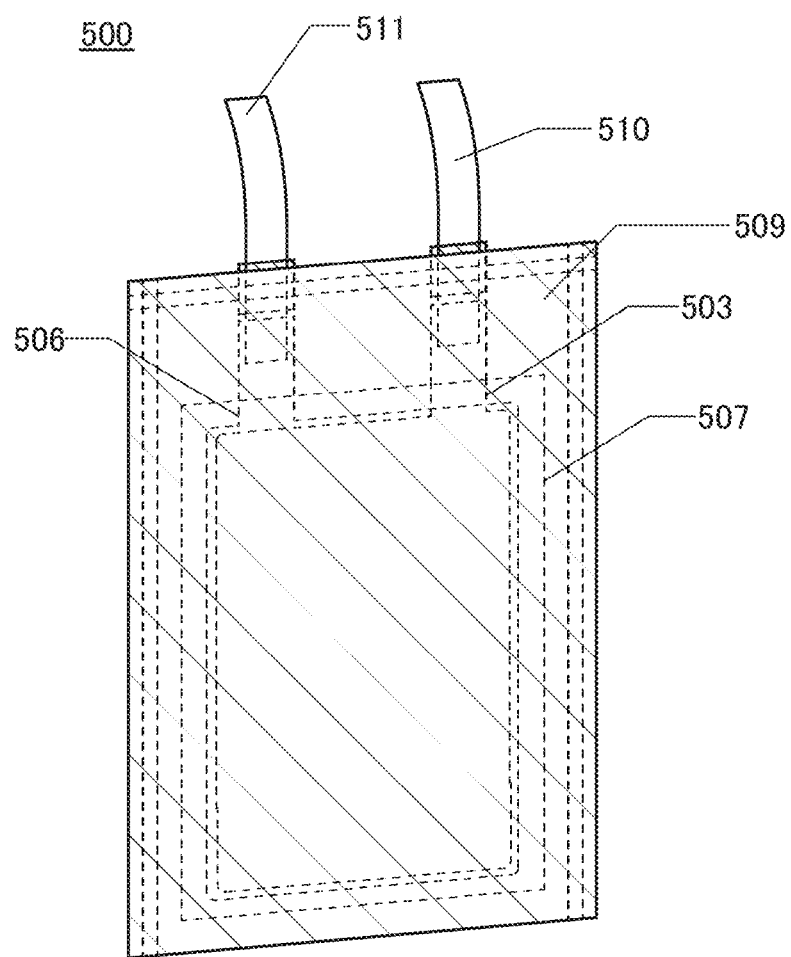
FIG. 18 is an external view of a secondary battery.
Figure 19:
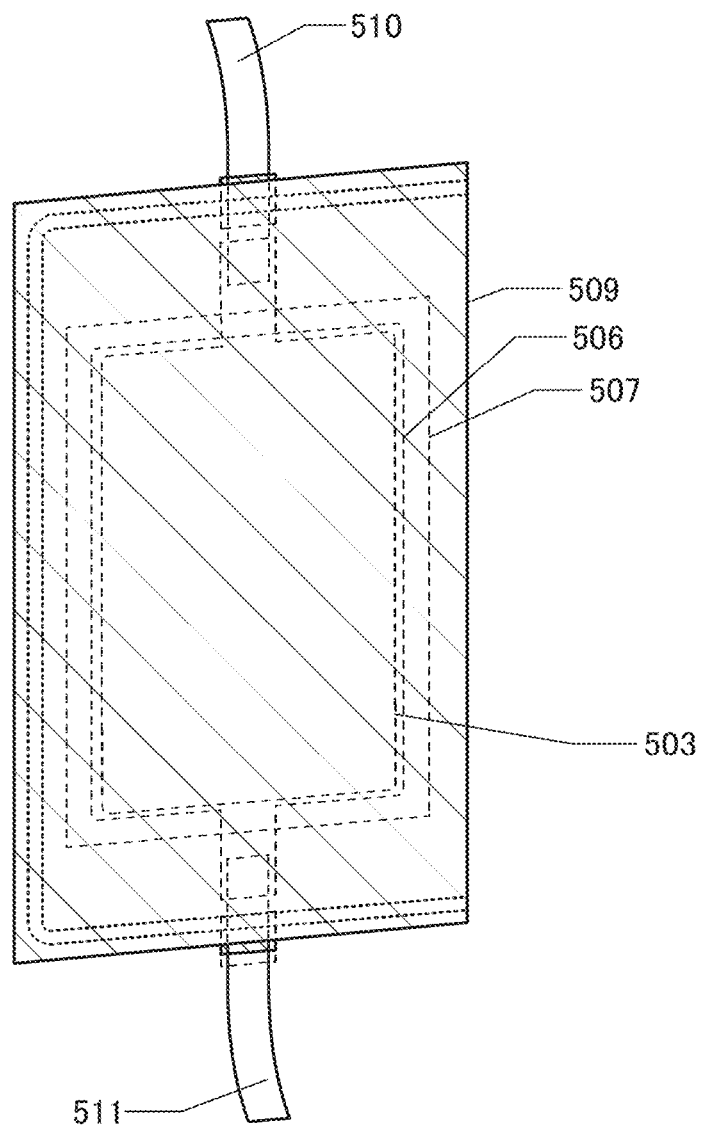
FIG. 19 is an external view of a secondary battery.

FIG. 18 and FIG. 19 each illustrate an example of the external view of the laminated secondary battery 500. In FIG. 18 and FIG. 19, the laminated secondary battery 500 includes the positive electrode 503, the negative electrode 506, the separator 507, the exterior body 509, a positive electrode lead electrode 510, and a negative electrode lead electrode 511.

Figure 20A:
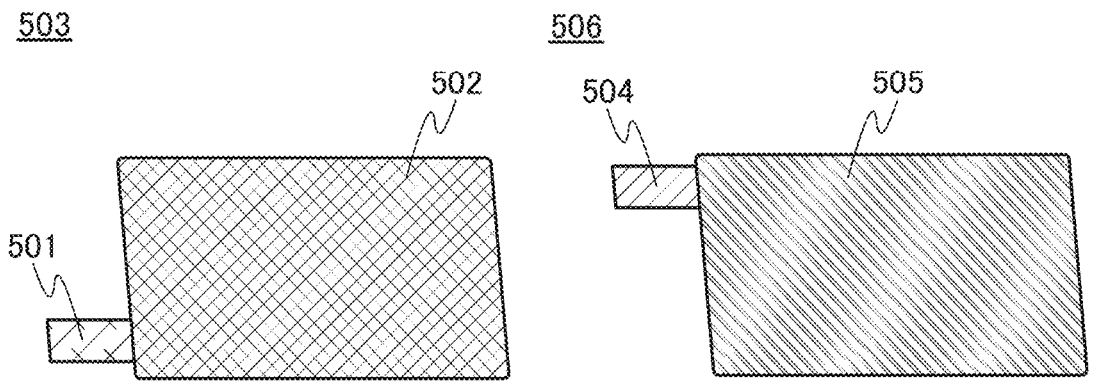
FIGS. 20A to 20C illustrate a manufacturing method of a secondary battery.

FIG. 20A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter, referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 20A.

[Method for Manufacturing Laminated Secondary Battery]

Figure 20B:
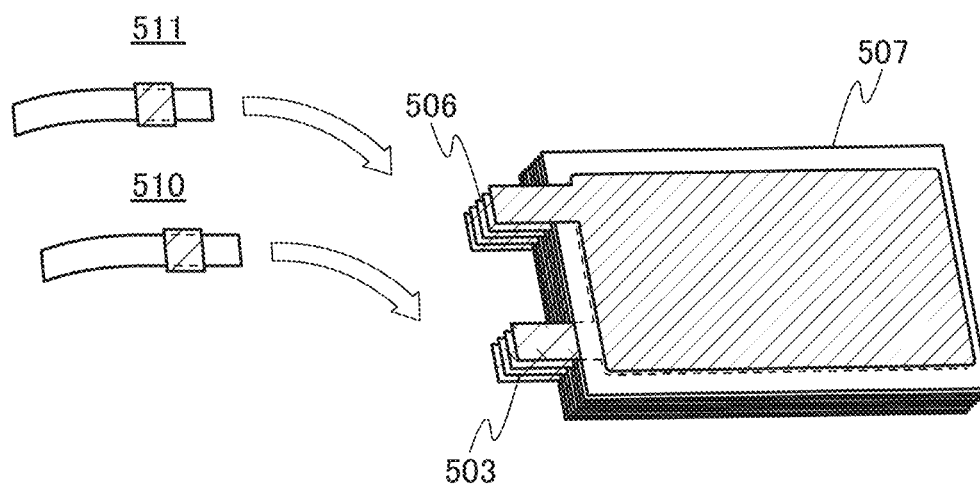

Here, an example of a method for manufacturing the laminated secondary battery whose external view is illustrated in FIG. 18 is described with reference to FIGS. 20B and 20C.

First, the negative electrode 506, the separator 507, and the positive electrode 503 are stacked. FIG. 20B illustrates a stack including the negative electrode 506, the separator 507, and the positive electrode 503. The secondary battery described here as an example includes 5 negative electrodes and 4 positive electrodes. Next, the tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, the tab regions of the negative electrodes 506 are bonded to each other, and the tab region of the negative electrode on the outermost surface and the negative electrode lead electrode 511 are bonded to each other.

After that, the negative electrode 506, the separator 507, and the positive electrode 503 are placed over the exterior body 509.

Figure 20C:
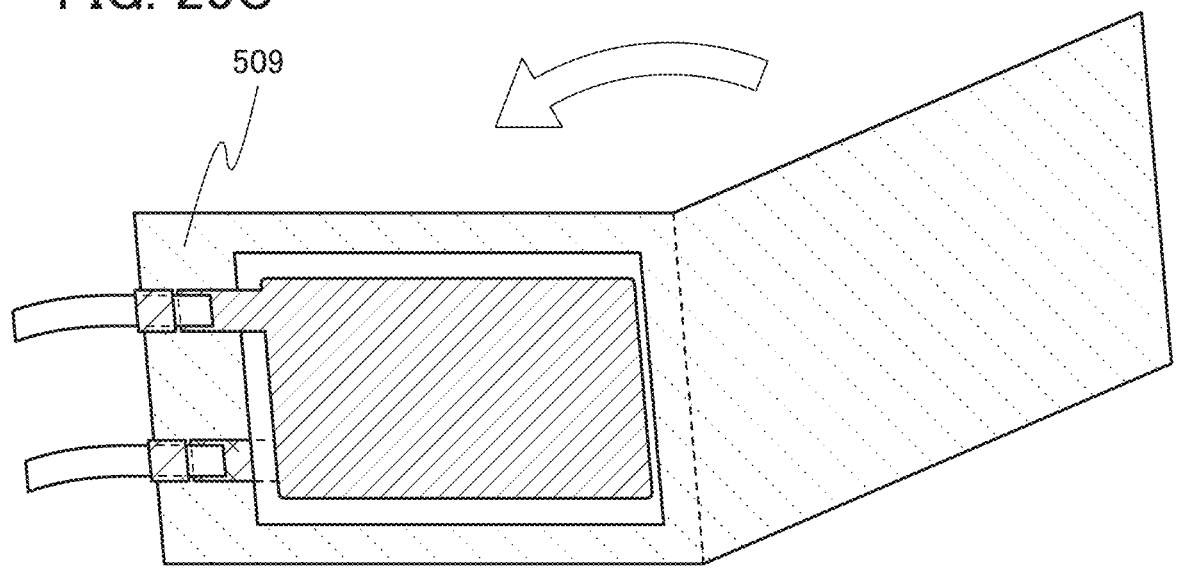

Subsequently, the exterior body 509 is folded along a dashed line as illustrated in FIG. 20C. Then, the outer edges of the exterior body 509 are bonded to each other. The bonding can be performed by thermocompression, for example. At this time, a part (or one side) of the exterior body 509 is left unbonded (to provide an inlet) so that the electrolyte solution 508 can be introduced later.

Next, the electrolyte solution 508 (not illustrated) is introduced into the exterior body 509 from the inlet of the exterior body 509. The electrolyte solution 508 is preferably introduced in a reduced pressure atmosphere or in an inert gas atmosphere. Lastly, the inlet is sealed by bonding. In the above manner, the laminated secondary battery 500 can be manufactured.

When the positive electrode active material described in the above embodiment is used in the positive electrode 503, the secondary battery 500 with high capacity and excellent cycle performance can be obtained.

[Bendable Secondary Battery]

Next, an example of a bendable secondary battery is described with reference to FIGS. 21A, 21B1, 21B2, 21C, and 21D and FIGS. 22A and 22B.

FIG. 21A is a schematic top view of a bendable secondary battery 250. FIGS. 21B1, 21B2, and 21C are schematic cross-sectional views taken along the cutting line C1-C2, the cutting line C3-C4, and the cutting line A1-A2, respectively, in FIG. 21A. The secondary battery 250 includes an exterior body 251 and a positive electrode 211a and a negative electrode 211b held in the exterior body 251. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

Figure 22A:
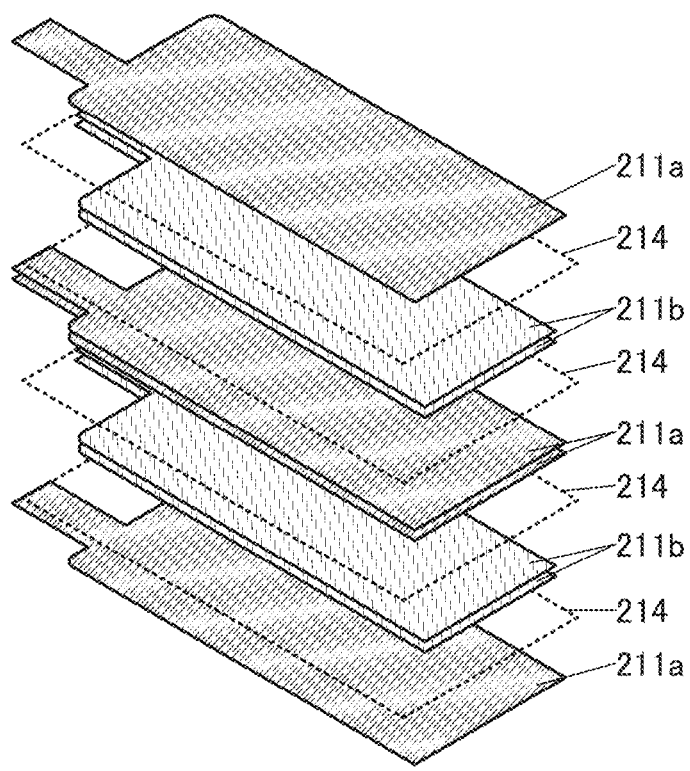
FIGS. 22A and 22B illustrate a bendable secondary battery.
Figure 22B:
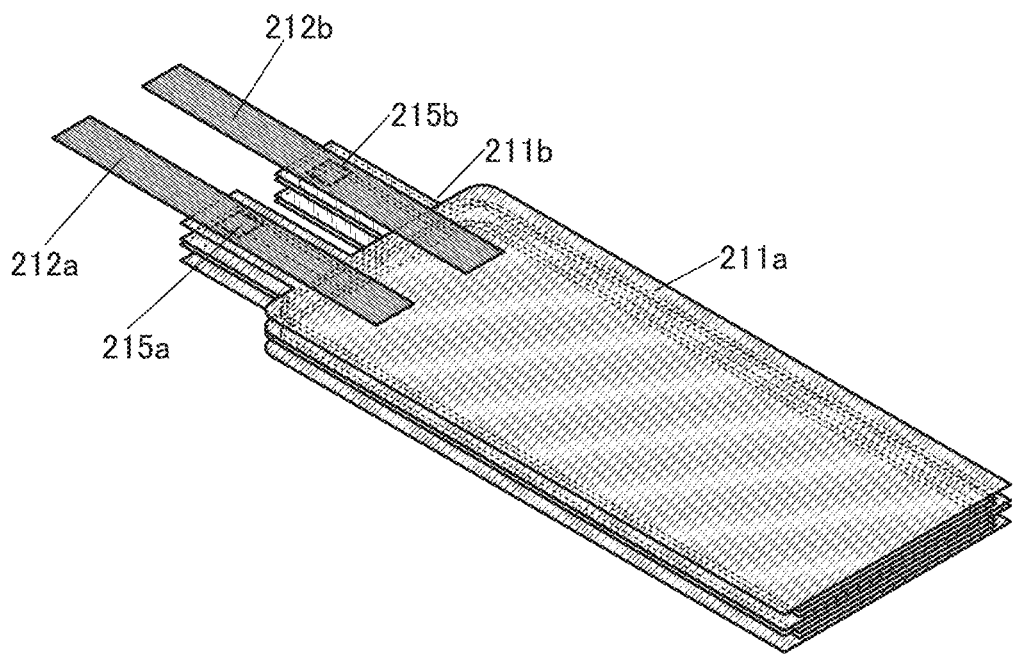

FIGS. 22A and 22B illustrate the positive electrode 211a and the negative electrode 211b included in the secondary battery 250. FIG. 22A is a perspective view illustrating the stacking order of the positive electrode 211a, the negative electrode 211b, and a separator 214. FIG. 22B is a perspective view illustrating the lead 212a and the lead 212b in addition to the positive electrode 211a and the negative electrode 211b.

As illustrated in FIG. 22A, the secondary battery 250 includes a plurality of strip-shaped positive electrodes 211a, a plurality of strip-shaped negative electrodes 211b, and a plurality of separators 214. The positive electrode 211a and the negative electrode 211b each include a projected tab portion and a portion other than the tab portion. A positive electrode active material layer is formed on one surface of the positive electrode 211a other than the tab portion, and a negative electrode active material layer is formed on one surface of the negative electrode 211b other than the tab portion.

The positive electrodes 211a and the negative electrodes 211b are stacked so that surfaces of the positive electrodes 211a on each of which the positive electrode active material layer is not formed are in contact with each other and that surfaces of the negative electrodes 211b on each of which the negative electrode active material layer is not formed are in contact with each other.

Furthermore, the separator 214 is provided between the surface of the positive electrode 211a on which the positive electrode active material layer is formed and the surface of the negative electrode 211b on which the negative electrode active material layer is formed. In FIG. 22A, the separator 214 is shown by a dotted line for easy viewing.

In addition, as illustrated in FIG. 22B, the plurality of positive electrodes 211a are electrically connected to the lead 212a in a bonding portion 215a. The plurality of negative electrodes 211b are electrically connected to the lead 212b in a bonding portion 215b.

Next, the exterior body 251 is described with reference to FIGS. 21B1, 21B2, 21C, and 21D.

The exterior body 251 has a film-like shape and is folded in half with the positive electrodes 211a and the negative electrodes 211b between facing portions of the exterior body 251. The exterior body 251 includes a folded portion 261, a pair of seal portions 262, and a seal portion 263. The pair of seal portions 262 is provided with the positive electrodes 211a and the negative electrodes 211b positioned therebetween and thus can also be referred to as side seals. The seal portion 263 includes portions overlapping with the lead 212a and the lead 212b and can also be referred to as a top seal.

Part of the exterior body 251 that overlaps with the positive electrodes 211a and the negative electrodes 211b preferably has a wave shape in which crest lines 271 and trough lines 272 are alternately arranged. The seal portions 262 and the seal portion 263 of the exterior body 251 are preferably flat.

FIG. 21B1 shows a cross section along the part overlapping with the crest line 271. FIG. 21B2 shows a cross section along the part overlapping with the trough line 272. FIGS. 21B1 and 21B2 correspond to cross sections of the secondary battery 250, the positive electrodes 211a, and the negative electrodes 211b in the width direction.

Here, the distance between end portions of the positive electrode 211a and the negative electrode 211b in the width direction and the seal portion 262, that is, the distance between the end portions of the positive electrode 211a and the negative electrode 211b and the seal portion 262 is referred to as a distance La. When the secondary battery 250 changes in shape, for example, is bent, the positive electrode 211a and the negative electrode 211b change in shape such that the positions thereof are shifted from each other in the length direction as described later. At the time, if the distance La is too short, the exterior body 251 and the positive electrode 211a and the negative electrode 211b are rubbed hard against each other, so that the exterior body 251 is damaged in some cases. In particular, when a metal film of the exterior body 251 is exposed, the metal film might be corroded by the electrolyte solution. Therefore, the distance La is preferably set as long as possible. However, if the distance La is too long, the volume of the secondary battery 250 is increased.

The distance La between the positive and negative electrodes 211a and 211b and the seal portion 262 is preferably increased as the total thickness of the stacked positive electrodes 211a and negative electrodes 211b is increased.

Specifically, when the total thickness of the stacked positive electrodes 211a, negative electrodes 211b, and separators 214 (not illustrated) is referred to as a thickness t, the distance La is preferably 0.8 times or more and 3.0 times or less, further preferably 0.9 times or more and 2.5 times or less, and still further preferably 1.0 times or more and 2.0 times or less as large as the thickness t. When the distance La is in the above range, a compact battery highly reliable for bending can be obtained.

Furthermore, when the distance between the pair of seal portions 262 is referred to as a distance Lb, it is preferred that the distance Lb be sufficiently longer than the widths of the positive electrode 211a and the negative electrode 211b (here, a width Wb of the negative electrode 211b). In that case, even when the positive electrode 211a and the negative electrode 211b come into contact with the exterior body 251 by change in the shape of the secondary battery 250, such as repeated bending, the position of part of the positive electrode 211a and the negative electrode 211b can be shifted in the width direction; thus, the positive and negative electrodes 211a and 211b and the exterior body 251 can be effectively prevented from being rubbed against each other.

For example, the difference between the distance La (i.e., the distance between the pair of seal portions 262) and the width Wb of the negative electrode 211b is preferably 1.6 times or more and 6.0 times or less, further preferably 1.8 times or more and 5.0 times or less, and still further preferably 2.0 times or more and 4.0 times or less as large as the thickness t of the positive electrode 211a and the negative electrode 211b.

In other words, the distance Lb, the width Wb, and the thickness t preferably satisfy the relationship of Formula 1 below.

$$\frac{Lb - Wb}{2t} \geq a \qquad \text{[Formula 1]}$$

In the formula, a is 0.8 or more and 3.0 or less, preferably 0.9 or more and 2.5 or less, further preferably 1.0 or more and 2.0 or less.

FIG. 21C illustrates a cross section including the lead 212a and corresponds to a cross section of the secondary battery 250, the positive electrode 211a, and the negative electrode 211b in the length direction. As illustrated in FIG. 21C, a space 273 is preferably provided between the end portions of the positive electrode 211a and the negative electrode 211b in the length direction and the exterior body 251 in the folded portion 261.

FIG. 21D is a schematic cross-sectional view of the secondary battery 250 in a state of being bent. FIG. 21D corresponds to a cross section along the cutting line B1-B2 in FIG. 21A.

When the secondary battery 250 is bent, a part of the exterior body 251 positioned on the outer side in bending is unbent and the other part positioned on the inner side changes its shape as it shrinks. More specifically, the part of the exterior body 251 positioned on the outer side in bending changes its shape such that the wave amplitude becomes smaller and the length of the wave period becomes larger. In contrast, the part of the exterior body 251 positioned on the inner side changes its shape such that the wave amplitude becomes larger and the length of the wave period becomes smaller. When the exterior body 251 changes its shape in this manner, stress applied to the exterior body 251 due to bending is relieved, so that a material itself of the exterior body 251 does not need to expand and contract. Thus, the secondary battery 250 can be bent with weak force without damage to the exterior body 251.

Furthermore, as illustrated in FIG. 21D, when the secondary battery 250 is bent, the positions of the positive electrode 211a and the negative electrode 211b are shifted relatively. At this time, ends of the stacked positive electrodes 211a and negative electrodes 211b on the seal portion 263 side are fixed by a fixing member 217. Thus, the plurality of positive electrodes 211a and the plurality of negative electrodes 211b are more shifted at a position closer to the folded portion 261. Therefore, stress applied to the positive electrode 211a and the negative electrode 211b is relieved, and the positive electrode 211a and the negative electrode 211b themselves do not need to expand and contract. Consequently, the secondary battery 250 can be bent without damage to the positive electrode 211a and the negative electrode 211b.

Furthermore, the space 273 is provided between the positive and negative electrodes 211a and 211b and the exterior body 251, whereby the relative positions of the positive electrode 211a and the negative electrode 211b can be shifted while the positive electrode 211a and the negative electrode 211b located on an inner side when the secondary battery 250 is bent do not come in contact with the exterior body 251.

In the secondary battery 250 illustrated in FIGS. 21A, 21B1, 21B2, 21C, and 21D and FIGS. 22A and 22B, the exterior body, the positive electrode 211a, and the negative electrode 211b are less likely to be damaged and the battery characteristics are less likely to deteriorate even when the secondary battery 250 is repeatedly bent and unbent. When the positive electrode active material described in the above embodiment are used in the positive electrode 211a included in the secondary battery 250, a battery with more excellent cycle performance can be obtained.

Embodiment 4

In this embodiment, examples of electronic devices each including the secondary battery of one embodiment of the present invention are described.

First, FIGS. 23A to 23G show examples of electronic devices including the bendable secondary battery described in Embodiment 3. Examples of electronic devices each including a bendable secondary battery include television sets (also referred to as televisions or television receivers), monitors of computers or the like, digital cameras and digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

FIG. 23A illustrates an example of a mobile phone. A mobile phone 7400 is provided with a display portion 7402 incorporated in a housing 7401, operation buttons 7403, an external connection port 7404, a speaker 7405, a microphone 7406, and the like. Note that the mobile phone 7400 includes a secondary battery 7407. When the secondary battery of one embodiment of the present invention is used as the secondary battery 7407, a lightweight mobile phone with a long lifetime can be provided.

FIG. 23B illustrates the mobile phone 7400 that is bent. When the whole mobile phone 7400 is bent by the external force, the secondary battery 7407 included in the mobile phone 7400 is also bent. FIG. 23C illustrates the bent secondary battery 7407. The secondary battery 7407 is a thin storage battery. The secondary battery 7407 is fixed in a state of being bent. Note that the secondary battery 7407 includes a lead electrode 7408 electrically connected to a current collector. The current collector is, for example, copper foil, and partly alloyed with gallium; thus, adhesion between the current collector and an active material layer in contact with the current collector is improved and the secondary battery 7407 can have high reliability even in a state of being bent.

FIG. 23D illustrates an example of a bangle display device. A portable display device 7100 includes a housing 7101, a display portion 7102, operation buttons 7103, and a secondary battery 7104. FIG. 23E illustrates the bent secondary battery 7104. When the display device is worn on a user's arm while the secondary battery 7104 is bent, the housing changes its shape and the curvature of part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is changed in the range of radius of curvature from 40 mm to 150 mm inclusive. When the radius of curvature at the main surface of the secondary battery 7104 is greater than or equal to 40 mm and less than or equal to 150 mm, the reliability can be kept high. When the secondary battery of one embodiment of the present invention is used as the secondary battery 7104, a lightweight portable display device with a long lifetime can be provided.

FIG. 23F illustrates an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input/output terminal 7206, and data can be directly transmitted to and received from another information terminal via a connector. In addition, charging via the input/output terminal 7206 is possible. Note that the charging operation may be performed by wireless power feeding without using the input/output terminal 7206.

The display portion 7202 of the portable information terminal 7200 includes the secondary battery of one embodiment of the present invention. When the secondary battery of one embodiment of the present invention is used, a lightweight portable information terminal with a long lifetime can be provided. For example, the secondary battery 7104 illustrated in FIG. 23E that is in the state of being curved can be provided in the housing 7201. Alternatively, the secondary battery 7104 illustrated in FIG. 23E can be provided in the band 7203 such that it can be curved.

The portable information terminal 7200 preferably includes a sensor. As the sensor, for example a human body sensor such as a fingerprint sensor, a pulse sensor, or a temperature sensor, a touch sensor, a pressure sensitive sensor, or an acceleration sensor is preferably mounted.

FIG. 23G illustrates an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication, which is a communication method based on an existing communication standard.

The display device 7300 includes an input/output terminal, and data can be directly transmitted to and received from another information terminal via a connector. In addition, charging via the input/output terminal is possible. Note that the charging operation may be performed by wireless power feeding without using the input/output terminal.

When the secondary battery of one embodiment of the present invention is used as the secondary battery included in the display device 7300, a lightweight display device with a long lifetime can be provided.

In addition, examples of electronic devices each including the secondary battery with excellent cycle performance described in the above embodiment are described with reference to FIG. 23H, FIGS. 24A to 24C, and FIG. 25.

When the secondary battery of one embodiment of the present invention is used as a secondary battery of a daily electronic device, a lightweight product with a long lifetime can be provided. Examples of the daily electronic device include an electric toothbrush, an electric shaver, and electric beauty equipment. As secondary batteries of these products, small and lightweight stick type secondary batteries with high capacity are desired in consideration of handling ease for users.

FIG. 23H is a perspective view of a device called a vaporizer (electronic cigarette). In FIG. 23H, an electronic cigarette 7500 includes an atomizer 7501 including a heating element, a secondary battery 7504 that supplies power to the atomizer, and a cartridge 7502 including a liquid supply bottle, a sensor, and the like. To improve safety, a protection circuit that prevents overcharge and overdischarge of the secondary battery 7504 may be electrically connected to the secondary battery 7504. The secondary battery 7504 in FIG. 23H includes an external terminal for connection to a charger. When the electronic cigarette 7500 is held by a user, the secondary battery 7504 becomes a tip portion; thus, it is preferred that the secondary battery 7504 have a short total length and be lightweight. With the secondary battery of one embodiment of the present invention, which has high capacity and excellent cycle performance, the small and lightweight electronic cigarette 7500 that can be used for a long time over a long period can be provided.

Figure 24A:
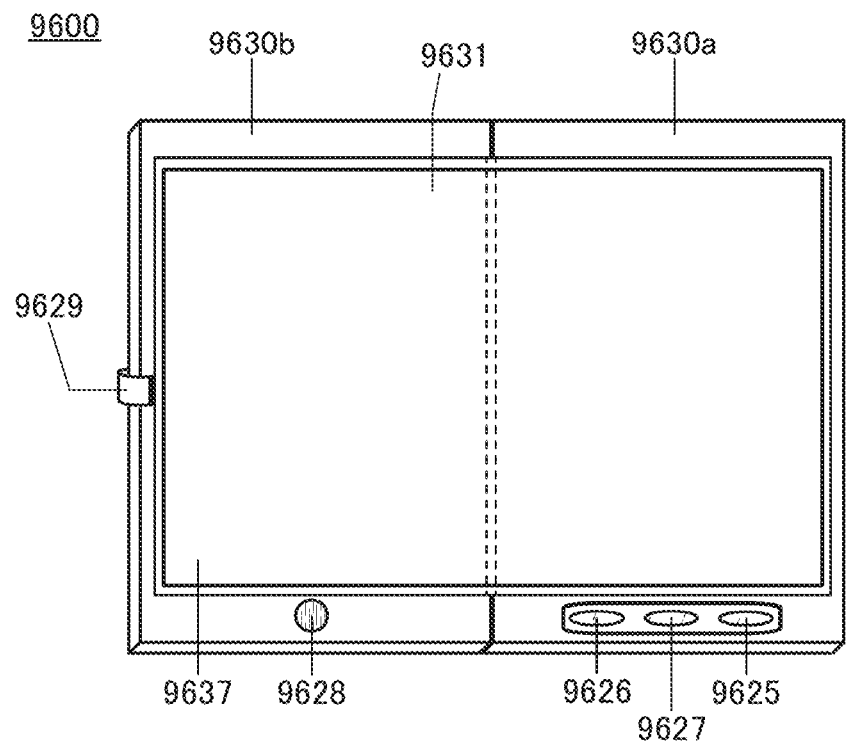
FIGS. 24A to 24C illustrate an example of an electronic device.
Figure 24B:
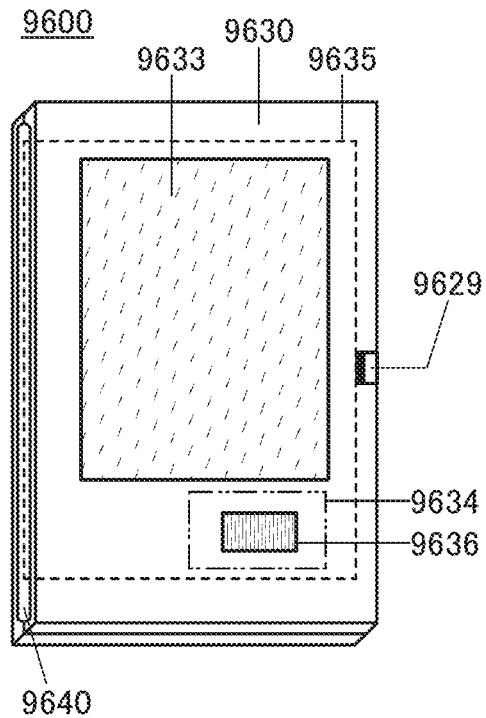

Next, FIGS. 24A and 24B illustrate an example of a tablet terminal that can be folded in half. A tablet terminal 9600 illustrated in FIGS. 24A and 24B includes a housing 9630a, a housing 9630b, a movable portion 9640 connecting the housings 9630a and 9630b to each other, a display portion 9631, a display mode changing switch 9626, a switch 9627, a switch 9625, a fastener 9629, and an operation switch 9628. A flexible panel is used for the display portion 9631, whereby a tablet terminal with a larger display portion can be provided. FIG. 24A illustrates the tablet terminal 9600 that is opened, and FIG. 24B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of or the entire display portion 9631 can be a touch panel region, and data can be input by touching text, an input form, an image including an icon, and the like displayed on the region. For example, it is possible that keyboard buttons are displayed on the entire display portion 9631 on the housing 9630a side, and data such as text or an image is displayed on the display portion 9631 on the housing 9630b side.

In addition, it is possible that a keyboard is displayed on the display portion 9631 on the housing 9630b side, and data such as text or an image is displayed on the display portion 9631 on the housing 9630a side. Furthermore, it is possible that a switching button for showing/hiding a keyboard on a touch panel is displayed on the display portion 9631 and the button is touched with a finger, a stylus, or the like to display keyboard buttons on the display portion 9631.

The switches 9625 to 9627 may function not only as an interface for operating the tablet terminal 9600 but also as an interface that can switch various functions. For example, at least one of the switches 9625 to 9627 may have a function of switching on/off of the tablet terminal 9600. For another example, at least one of the switches 9625 to 9627 may have a function of switching display between a portrait mode and a landscape mode and a function of switching display between monochrome display and color display. For another example, at least one of the switches 9625 to 9627 may have a function of adjusting the luminance of the display portion 9631. The luminance of the display portion 9631 can be optimized in accordance with the amount of external light in use that is measured with an optical sensor incorporated in the tablet terminal 9600. Note that another sensing device including a sensor for measuring inclination, such as a gyroscope sensor or an acceleration sensor, may be incorporated in the tablet terminal, in addition to the optical sensor.

The tablet terminal 9600 is folded in half in FIG. 24B. The tablet terminal 9600 includes a housing 9630, a solar cell 9633, and a charge and discharge control circuit 9634 including a DCDC converter 9636. The secondary battery of one embodiment of the present invention is used as the power storage unit 9635.

As described above, the tablet terminal 9600 can be folded in half such that the housings 9630a and 9630b overlap with each other when not in use. Thus, the display portion 9631 can be protected, which increases the durability of the tablet terminal 9600. With the power storage unit 9635 including the secondary battery of one embodiment of the present invention, which has high capacity and excellent cycle performance, the tablet terminal 9600 that can be used for a long time over a long period can be provided.

The tablet terminal 9600 illustrated in FIGS. 24A and 24B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal 9600, supplies electric power to a touch panel, a display portion, a video signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as a reduction in size.

Figure 24C:
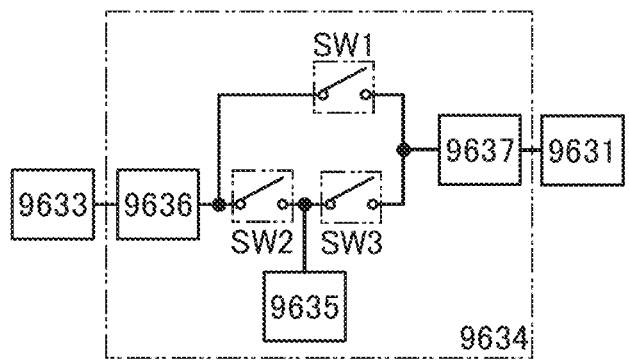

The structure and operation of the charge and discharge control circuit 9634 illustrated in FIG. 24B are described with reference to a block diagram in FIG. 24C. The solar cell 9633, the power storage unit 9635, the DCDC converter 9636, a converter 9637, switches SW1 to SW3, and the display portion 9631 are illustrated in FIG. 24C, and the power storage unit 9635, the DCDC converter 9636, the converter 9637, and the switches SW1 to SW3 correspond to the charge and discharge control circuit 9634 in FIG. 24B.

First, an operation example in which electric power is generated by the solar cell 9633 using external light is described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation unit; however, one embodiment of the present invention is not limited to this example. The power storage unit 9635 may be charged using another power generation unit such as a piezoelectric element or a thermoelectric conversion element (Peltier element). For example, the power storage unit 9635 may be charged with a non-contact power transmission module that transmits and receives power wirelessly (without contact), or with a combination of other charging units.

Figure 25:
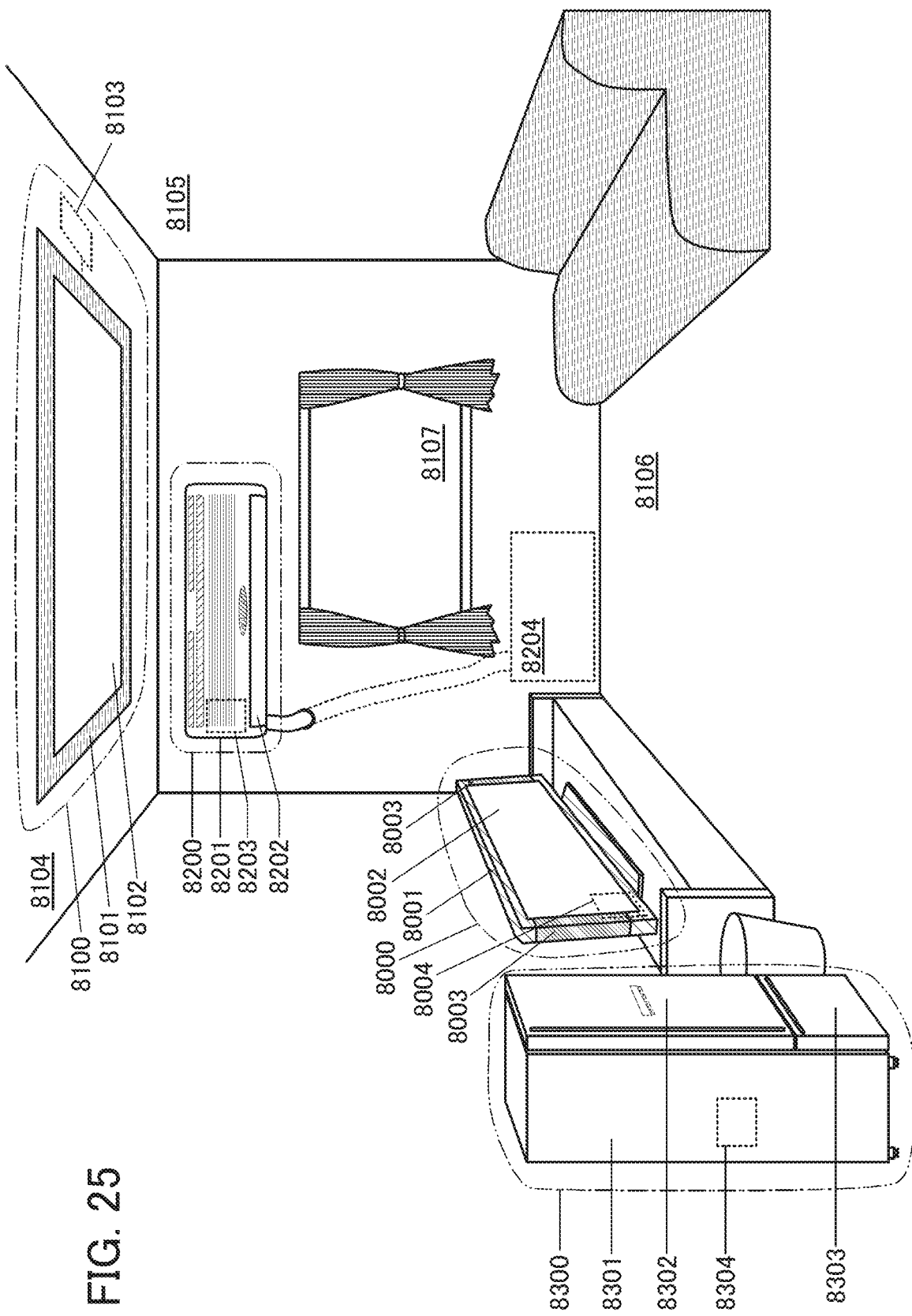
FIG. 25 illustrates examples of electronic devices.

FIG. 25 illustrates other examples of electronic devices. In FIG. 25, a display device 8000 is an example of an electronic device including a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply. Alternatively, the display device 8000 can use electric power stored in the secondary battery 8004. Thus, the display device 8000 can be operated with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 25, an installation lighting device 8100 is an example of an electronic device including a secondary battery 8103 of one embodiment of the present invention. Specifically, the lighting device 8100 includes a housing 8101, a light source 8102, the secondary battery 8103, and the like. Although FIG. 25 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103. Thus, the lighting device 8100 can be operated with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 25 as an example, the secondary battery of one embodiment of the present invention can be used in an installation lighting device provided in, for example, a wall 8105, a floor 8106, or a window 8107 other than the ceiling 8104. Alternatively, the secondary battery of one embodiment of the present invention can be used in a tabletop lighting device or the like.

As the light source 8102, an artificial light source that emits light artificially by using electric power can be used. Specifically, an incandescent lamp, a discharge lamp such as a fluorescent lamp, and light-emitting elements such as an LED and an organic EL element are given as examples of the artificial light source.

In FIG. 25, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 25 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203. Particularly in the case where the secondary batteries 8203 are provided in both the indoor unit 8200 and the outdoor unit 8204, the air conditioner can be operated with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 25 as an example, the secondary battery of one embodiment of the present invention can be used in an air conditioner in which the functions of an indoor unit and an outdoor unit are integrated in one housing.

In FIG. 25, an electric refrigerator-freezer 8300 is an example of an electronic device including a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 25. The electric refrigerator-freezer 8300 can receive electric power from a commercial power supply. Alternatively, the electric refrigerator-freezer 8300 can use electric power stored in the secondary battery 8304. Thus, the electric refrigerator-freezer 8300 can be operated with the use of the secondary battery 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the secondary battery of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion is referred to as a usage rate of electric power) is low, electric power can be stored in the secondary battery, whereby the usage rate of electric power can be reduced in a time period when the electronic devices are used. For example, in the case of the electric refrigerator-freezer 8300, electric power can be stored in the secondary battery 8304 in night time when the temperature is low and the refrigerator door 8302 and the freezer door 8303 are not often opened or closed. On the other hand, in daytime when the temperature is high and the refrigerator door 8302 and the freezer door 8303 are frequently opened and closed, the secondary battery 8304 is used as an auxiliary power supply; thus, the usage rate of electric power in daytime can be reduced.

According to one embodiment of the present invention, the secondary battery can have excellent cycle performance and improved reliability. Furthermore, according to one embodiment of the present invention, a secondary battery with high capacity can be obtained; thus, the secondary battery itself can be made more compact and lightweight as a result of improved characteristics of the secondary battery. Thus, the secondary battery of one embodiment of the present invention is used in the electronic device described in this embodiment, whereby a more lightweight electronic device with a longer lifetime can be obtained. This embodiment can be implemented in appropriate combination with any of the other embodiments.

Embodiment 5

In this embodiment, examples of vehicles each including the secondary battery of one embodiment of the present invention are described.

The use of secondary batteries in vehicles enables production of next-generation clean energy vehicles such as hybrid electric vehicles (HEVs), electric vehicles (EVs), and plug-in hybrid electric vehicles (PHEVs).

Figure 26A:
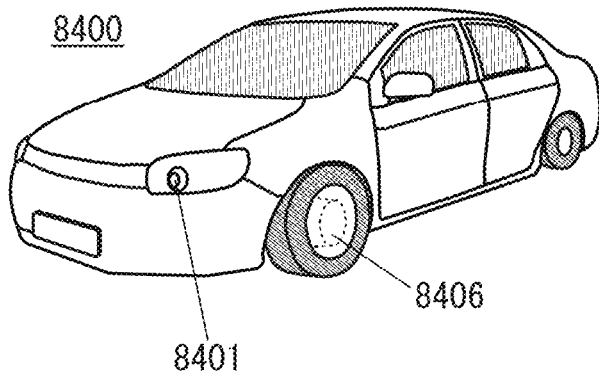
FIGS. 26A to 26C illustrate examples of electronic devices.
Figure 26B:
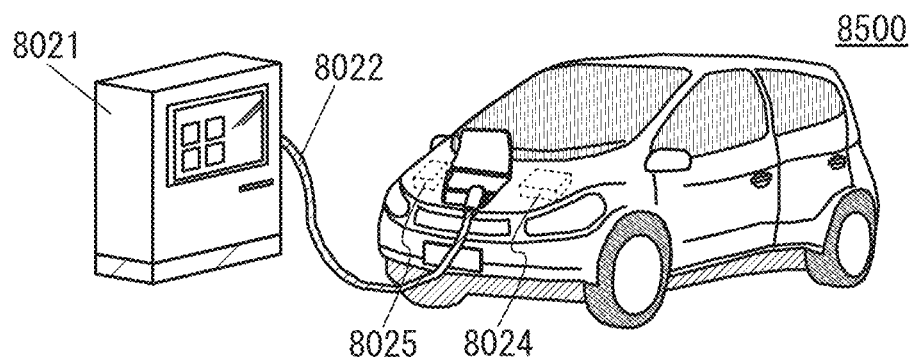

FIGS. 26A and 26B each illustrate an example of a vehicle including the secondary battery of one embodiment of the present invention. An automobile 8400 illustrated in FIG. 26A is an electric vehicle that runs on the power of an electric motor. Alternatively, the automobile 8400 is a hybrid electric vehicle capable of driving using either an electric motor or an engine as appropriate. The use of the secondary battery of one embodiment of the present invention allows fabrication of a high-mileage vehicle. The automobile 8400 includes the secondary battery. As the secondary battery, the modules of the secondary batteries illustrated in FIGS. 11C and 11D may be arranged to be used in a floor portion in the automobile. Alternatively, a battery pack in which a plurality of secondary batteries each of which is illustrated in FIGS. 16A to 16C are combined may be placed in the floor portion in the automobile. The secondary battery is used not only for driving an electric motor 8406, but also for supplying electric power to a light-emitting device such as a headlight 8401 or a room light (not illustrated).

The secondary battery can also supply electric power to a display device included in the automobile 8400, such as a speedometer or a tachometer. Furthermore, the secondary battery can supply electric power to a semiconductor device included in the automobile 8400, such as a navigation system.

FIG. 26B illustrates an automobile 8500 including the secondary battery. The automobile 8500 can be charged when the secondary battery is supplied with electric power through external charging equipment by a plug-in system, a contactless power feeding system, or the like. In FIG. 26B, secondary batteries 8024 and 8025 included in the automobile 8500 are charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the secondary batteries 8024 and 8025 included in the automobile 8500 can be charged by being supplied with electric power from outside. The charge can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charge can be performed not only when the vehicle is stopped but also when driven. In addition, the contactless power feeding system may be utilized to perform transmission and reception of electric power between vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

Figure 26C:
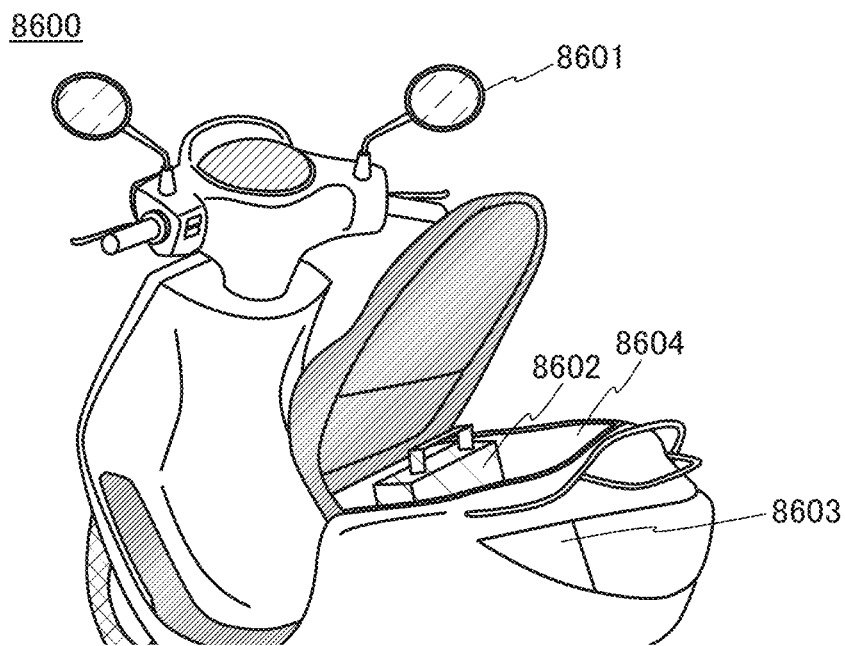

FIG. 26C shows an example of a motorcycle including the secondary battery of one embodiment of the present invention. A motor scooter 8600 illustrated in FIG. 26C includes a secondary battery 8602, side mirrors 8601, and indicators 8603. The secondary battery 8602 can supply electric power to the indicators 8603.

Furthermore, in the motor scooter 8600 illustrated in FIG. 26C, the secondary battery 8602 can be held in a storage unit under seat 8604. The secondary battery 8602 can be held in the storage unit under seat 8604 even with a small size. The secondary battery 8602 is detachable; thus, the secondary battery 8602 is carried indoors when charged, and is stored before the motor scooter is driven.

According to one embodiment of the present invention, the secondary battery can have improved cycle performance and the capacity of the secondary battery can be increased. Thus, the secondary battery itself can be made more compact and lightweight. The compact and lightweight secondary battery contributes to a reduction in the weight of a vehicle, and thus increases the mileage. Furthermore, the secondary battery included in the vehicle can be used as a power source for supplying electric power to products other than the vehicle. In such a case, the use of a commercial power supply can be avoided at peak time of electric power demand, for example. Avoiding the use of a commercial power supply at peak time of electric power demand can contribute to energy saving and a reduction in carbon dioxide emissions. Moreover, the secondary battery with excellent cycle performance can be used over a long period; thus, the use amount of rare metals such as cobalt can be reduced.

This embodiment can be implemented in appropriate combination with any of the other embodiments.

Example 1

This example describes XRD analysis results of the positive electrode active material 100 of one embodiment of the present invention and comparative lithium cobalt oxide.

[Formation of positive electrode active material]

<<Sample 01>>

A sample 01 of the positive electrode active material of one embodiment of the present invention was formed in the following manner: lithium cobalt oxide particles were formed using magnesium and fluorine as starting materials and then the particles were heated.

As described in Step S11 in Embodiment 1, as the starting materials of the sample 01, lithium carbonate was prepared as a lithium source, cobalt oxide was prepared as a cobalt source, magnesium oxide was prepared as a magnesium source, and lithium fluoride was prepared as a fluorine source. These elements were weighed to have an atomic ratio of $Li_{1.02}Co_{0.99}Mg_{0.01}O_{1.98}F_{0.02}$.

Next, as Step S12, the starting materials were mixed with a ball mill including a zirconia ball at 250 rpm for 2 hours.

Then, as Step S13, the mixed materials were put into an aluminum oxide crucible (hereinafter, referred to as an alumina crucible) and heated. With a muffle furnace, the heating was performed under the following conditions: the flow rate of a dry air atmosphere was 10 L/min; the retention temperature was 950° C. (the temperature rising rate was 200° C./h); and the retention time was 10 hours. The time of decreasing temperature from the retention temperature to room temperature was 10 hours to 15 hours.

The coating with titanium and aluminum was not performed because Step S14 was omitted.

Next, as Step S15, the lithium cobalt oxide particles containing magnesium and fluorine that were synthesized in Step S13 were put into the alumina crucible and heated. With a muffle furnace, the heating was performed under the following conditions: the flow rate of an oxygen atmosphere was 10 L/min; the retention temperature was 900° C. (the temperature rising rate was 200° C./h); and the retention time was 2 hours. The time of decreasing temperature from the retention temperature to room temperature was 10 hours to 15 hours.

After that, crushing treatment was performed. In the crushing treatment, the particles were made to pass through a sieve having an aperture width of 53 μm.

Lastly, the particles were collected to obtain the positive electrode active material of the sample 01. Note that in the positive electrode active material formed under the above conditions, the concentrations of magnesium and fluorine in the surface portion were higher than the concentrations of magnesium and fluorine in the inner portion.

<<Sample 02>>

A sample 02 of the positive electrode active material of one embodiment of the present invention was formed by heating lithium cobalt oxide particles containing magnesium and fluorine.

Lithium cobalt oxide particles (C-20F, produced by Nippon Chemical Industrial CO., LTD.) were used as the starting materials of the sample 02. Thus, in the manufacturing process of the sample 02, Step S12 and Step S13 described in Embodiment 1 were omitted. Note that the lithium cobalt oxide particles have a particle size (D50) of approximately 20 μm and contain fluorine, magnesium, calcium, sodium, silicon, sulfur, and phosphorus in a region that can be analyzed by XPS. The coating with titanium and aluminum was not performed because Step S14 was omitted.

Next, as Step S15, the lithium cobalt oxide particles were put into the alumina crucible and heated. With a muffle furnace, the heating was performed under the following conditions: the flow rate of a dry air atmosphere was 5 L/min; the retention temperature was 800° C. (the temperature rising rate was 200° C./h); and the retention time was 2 hours. The time of decreasing temperature from the retention temperature to room temperature was 10 hours to 15 hours. After that, the particles were made to pass through a sieve and collected in a manner similar to that of the sample 01. Note that also in the positive electrode active material formed under the above conditions, the concentrations of magnesium and fluorine in the surface portion were higher than the concentrations of magnesium and fluorine in the inner portion.

<<Sample 03>>

As a sample 03 of the positive electrode active material of one embodiment of the present invention, a positive electrode active material was formed by coating lithium cobalt oxide particles containing magnesium and fluorine with titanium by a sol-gel method.

Lithium cobalt oxide particles (C-20F, produced by Nippon Chemical Industrial CO., LTD.) were also used as the starting materials of the sample 03. Thus, Step S12 and Step S13 were omitted.

Next, as Step S14, the lithium cobalt oxide particles were coated with a titanium-containing material. Specifically, TTIP was dissolved in isopropanol to obtain an isopropanol solution of TTIP, and then the lithium cobalt oxide particles were mixed into the solution. The amount of TTIP mixed with lithium cobalt oxide containing magnesium and fluorine was 0.004 ml/g.

This mixed solution was stirred without a lid on a magnetic stirrer for 72 hours at 25° C. and a humidity of 90% RH. Through the process, water in an atmosphere and TTIP caused hydrolysis and polycondensation reaction, and a titanium-containing layer was formed on the surfaces of the lithium cobalt oxide particles containing magnesium and fluorine.

After the above process, the mixed solution was subjected to centrifugation to collect precipitate. The centrifugation was performed at 3000 rpm for a minute, and the precipitate was washed with isopropanol.

The collected precipitate was dried at 70° C. for 3 hours in a circulation drying furnace.

Next, as Step S15, the lithium cobalt oxide particles coated with the titanium-containing material were put into the alumina crucible and heated. With a muffle furnace, the heating was performed under the following conditions: the flow rate of an oxygen atmosphere was 10 L/min; the retention temperature was 800° C. (the temperature rising rate was 200° C./h); and the retention time was 2 hours. The time of decreasing temperature from the retention temperature to room temperature was 10 hours to 15 hours. After that, the particles were made to pass through a sieve and collected in a manner similar to that of the sample 01. In the positive electrode active material formed under the above conditions, the concentrations of titanium, magnesium, and fluorine in the surface portion were higher than the concentrations of titanium, magnesium, and fluorine in the inner portion. The peak of the titanium concentration was observed in a region deeper than the peak of the magnesium concentration.

<<Sample 04>>

As a sample 04 of the positive electrode active material of one embodiment of the present invention, a positive electrode active material was formed by coating lithium cobalt oxide particles containing magnesium and fluorine with aluminum by a sol-gel method.

Lithium cobalt oxide particles (C-20F, produced by Nippon Chemical Industrial CO., LTD.) were also used as the starting materials of the sample 04. Thus, Step S12 and Step S13 were omitted.

Next, as Step S14, the lithium cobalt oxide particles were coated with an aluminum-containing material. Specifically, aluminum isopropoxide was dissolved in isopropanol to obtain an isopropanol solution of aluminum isopropoxide, and then the lithium cobalt oxide particles were mixed into the solution. The amount of aluminum isopropoxide mixed with lithium cobalt oxide containing magnesium and fluorine was 0.0279 g/g.

This mixed solution was stirred without a lid on a magnetic stirrer for 8 hours, at 25° C., at a humidity of 90% RH. Through the process, water in an atmosphere and aluminum isopropoxide caused hydrolysis and polycondensation reaction, and an aluminum-containing layer was formed on the surfaces of the lithium cobalt oxide particles containing magnesium and fluorine.

After the above process, the mixed solution was filtered to collect the residue. Kiriyama filter paper (No. 4) was used as a filter for the filtration, and isopropanol was used for washing.

The collected residue was dried at 70° C. for 1 hour in a vacuum bell jar.

Next, as Step S15, the lithium cobalt oxide particles coated with the aluminum-containing material were put into the alumina crucible and heated. With a muffle furnace, the heating was performed under the following conditions: the flow rate of an oxygen atmosphere was 10 L/min; the retention temperature was 800° C. (the temperature rising rate was 200° C./h); and the retention time was 2 hours. The time of decreasing temperature from the retention temperature to room temperature was 10 hours to 15 hours. After that, the particles were made to pass through a sieve and collected in a manner similar to that of the sample 01. In the positive electrode active material formed under the above conditions, the concentrations of aluminum, magnesium, and fluorine in the surface portion were higher than the concentrations of aluminum, magnesium, and fluorine in the inner portion. The peak of the aluminum concentration was observed in a region deeper than the peak of the magnesium concentration.

<<Sample 05>>

As a comparative sample 05, lithium cobalt oxide particles (C-20F, produced by Nippon Chemical Industrial CO., LTD.) containing magnesium and fluorine were used without being subjected to sol-gel treatment or heating.

<<Sample 06>>

As a comparative sample 06, lithium cobalt oxide particles not containing magnesium or fluorine were coated with aluminum by a sol-gel method.

Lithium cobalt oxide particles (C-5H, produced by Nippon Chemical Industrial CO., LTD.) were used as the starting materials of the sample 06. Thus, Step S12 and Step S13 were omitted. Note that the lithium cobalt oxide particles have a particle size (D50) of approximately 5 μm. In the lithium cobalt oxide particles, magnesium is not detected by XPS and the like.

Next, as Step S14, the lithium cobalt oxide particles were coated with an aluminum-containing material. Specifically, aluminum isopropoxide was dissolved in isopropanol to obtain an isopropanol solution of aluminum isopropoxide, and then the lithium cobalt oxide particles were mixed into the solution. The amount of aluminum isopropoxide mixed with lithium cobalt oxide containing magnesium and fluorine was 0.0917 g/g.

Then, the mixed solution was stirred, the residue was collected, and the collected residue was dried in a manner similar to that of the sample 04.

Next, as Step S15, the lithium cobalt oxide particles coated with the aluminum-containing material were heated, cooled, and collected. The sample 06 was formed in a manner similar to that of the sample 04 except that the heating temperature was 500° C.

Table 1 shows the formation conditions of the samples 01 to 06.

TABLE 1

| | Starting materials | First heating | Coating material | Second heating |
|---|---|---|---|---|
| Sample 01 | $Li_2CO_3$, $Co_2O_3$, MgO, LiF | 950° C., 10 hours | none | 900° C., 2 hours, $O_2$ |
| Sample 02 | $LiCoO_2$ containing Mg and F | not performed | none | 800° C., 2 hours, dry air |
| Sample 03 | $LiCoO_2$ containing Mg and F | not performed | Ti | 800° C., 2 hours, $O_2$ |
| Sample 04 | $LiCoO_2$ containing Mg and F | not performed | Al | 800° C., 2 hours, $O_2$ |
| Sample 05 (Comparative example) | $LiCoO_2$ containing Mg and F | not performed | none | not performed |
| Sample 06 (Comparative example) | $LiCoO_2$ | not performed | Al | 500° C., 2 hours, $O_2$ |

[Fabrication of Secondary Battery]

CR2032 coin-type secondary batteries (20 mm in diameter, 3.2 mm in height) were fabricated using the positive electrode active materials of the samples 01 to 06 formed in the above manner.

A positive electrode formed by coating a current collector with slurry in which the positive electrode active material (LCO) formed in the above manner, acetylene black (AB), and polyvinylidene fluoride (PVDF) were mixed at a weight ratio of 95:3:2 was used.

A lithium metal was used as a counter electrode.

As an electrolyte contained in an electrolyte solution, 1 mol/L lithium hexafluorophosphate ($LiPF_6$) was used, and as the electrolyte solution, a solution in which ethylene carbonate (EC) and diethyl carbonate (DEC) at a volume ratio of 3:7 and vinylene carbonate ($V_C$) at a 2 wt % were mixed was used.

As a separator, 25-μm-thick polypropylene was used.

A positive electrode can and a negative electrode can were formed of stainless steel (SUS).

[XRD Results Obtained after First Charge]

CCCV charge was performed at predetermined voltage on the secondary batteries fabricated using the positive electrode active materials of the samples 01 to 06. Specifically, constant current charge was performed at 0.5 C until voltage reached predetermined voltage, and then constant voltage charge was performed until a current value reached 0.01 C. The charged secondary batteries were disassembled in a glove box containing an argon atmosphere to take out the positive electrodes, and the positive electrodes were washed with dimethyl carbonate (DMC) to remove the electrolyte solution. Then, analysis was performed by powder XRD with the CuKα1 line. Note that the analysis was performed with a full automatic multipurpose X-ray diffractometer D8 ADVANCE produced by Bruker AXS. The XRD apparatus was set for powder samples, and the heights of the samples were set in accordance with the measurement surface required by the apparatus. The samples were set to be flat without any curve.

Figure 27:
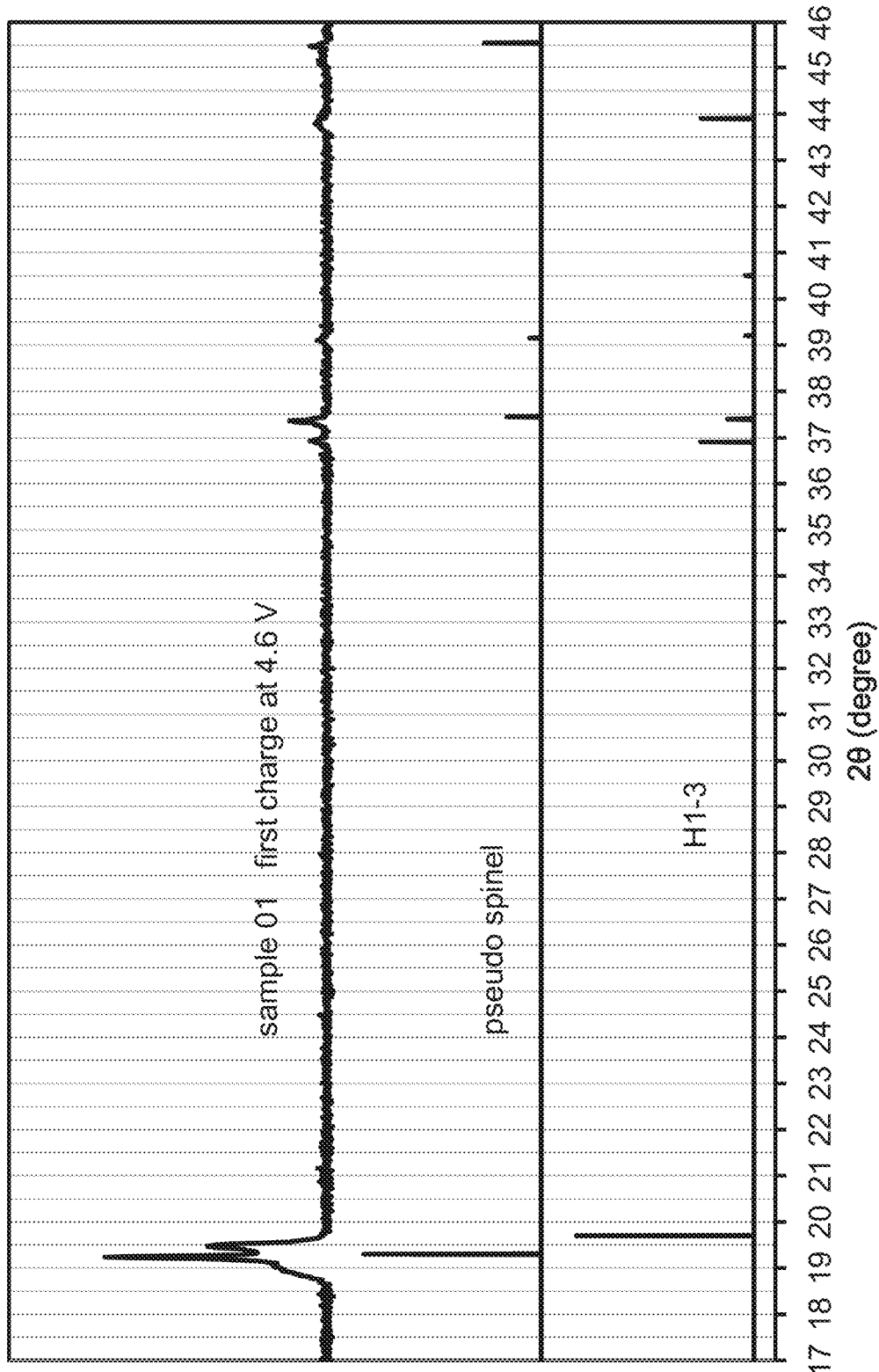
FIG. 27 shows XRD patterns of a positive electrode active material of one embodiment of the present invention in Example 1.

FIG. 27 shows an XRD pattern of the positive electrode of the secondary battery that was fabricated using the positive electrode active material of the sample 01 and charged at 4.6 V. For comparison, FIG. 27 also shows the patterns of the pseudo-spinel crystal structure and the H1-3 crystal structure that are shown in FIG. 3. In the sample 01 charged at 4.6 V, the pseudo-spinel crystal structure and the H1-3 crystal structure were mixed. The Rietveld analysis indicated that the pseudo-spinel crystal structure accounted for 66 wt % of the sample 01.

Figure 28:
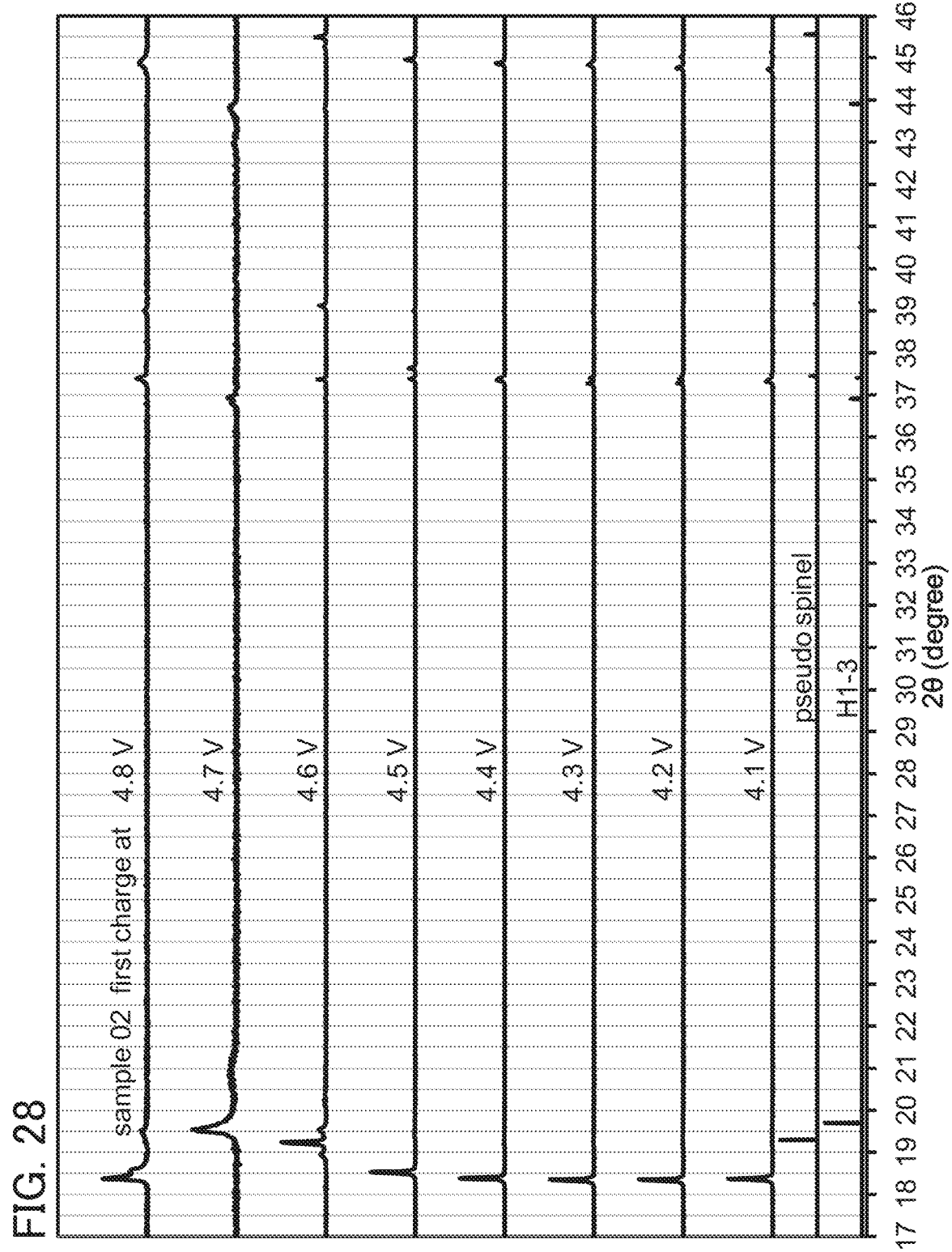
FIG. 28 shows XRD patterns of a positive electrode active material of one embodiment of the present invention in Example 1.

FIG. 28 shows XRD patterns of the positive electrode of the secondary battery that was fabricated using the positive electrode active material of the sample 02 and charged at 4.1 V, 4.2 V, 4.3 V, 4.4 V, 4.5 V, 4.6 V, 4.7 V, and 4.8 V. The sample 02 charged at 4.6 V was found to have the pseudo-spinel crystal structure. The sample 02 charged at 4.7 V or higher had a crystal structure different from the pseudo-spinel crystal structure and a peak with an increased width, inferring that crystallinity was reduced.

Figure 29:
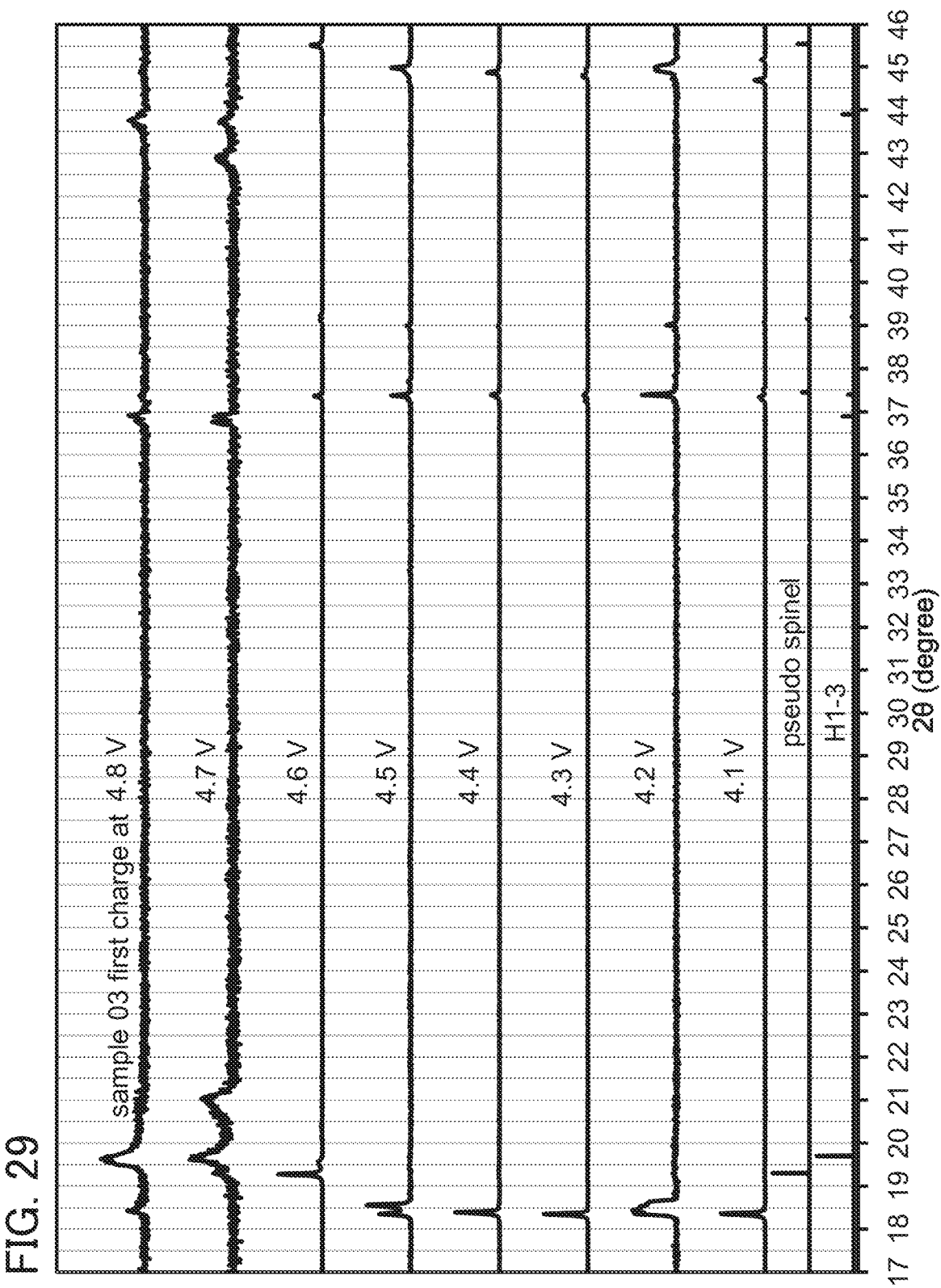
FIG. 29 shows XRD patterns of a positive electrode active material of one embodiment of the present invention in Example 1.

FIG. 29 shows XRD patterns of the positive electrode of the secondary battery that was fabricated using the positive electrode active material of the sample 03 and charged at 4.1 V, 4.2 V, 4.3 V, 4.4 V, 4.5 V, 4.6 V, 4.7 V, and 4.8 V. The sample 03 charged at 4.6 V was also found to have the pseudo-spinel crystal structure. The sample 03 charged at 4.6 V had a clearer pattern than the sample 02 charged at 4.6 V, inferring that the sample 03 had a smaller proportion of crystal structures except the pseudo-spinel crystal structure than the sample 02. The sample 03 charged at 4.7 V or higher had a crystal structure different from the pseudo-spinel crystal structure and a peak with an increased width, inferring that crystallinity was reduced.

Figure 30:
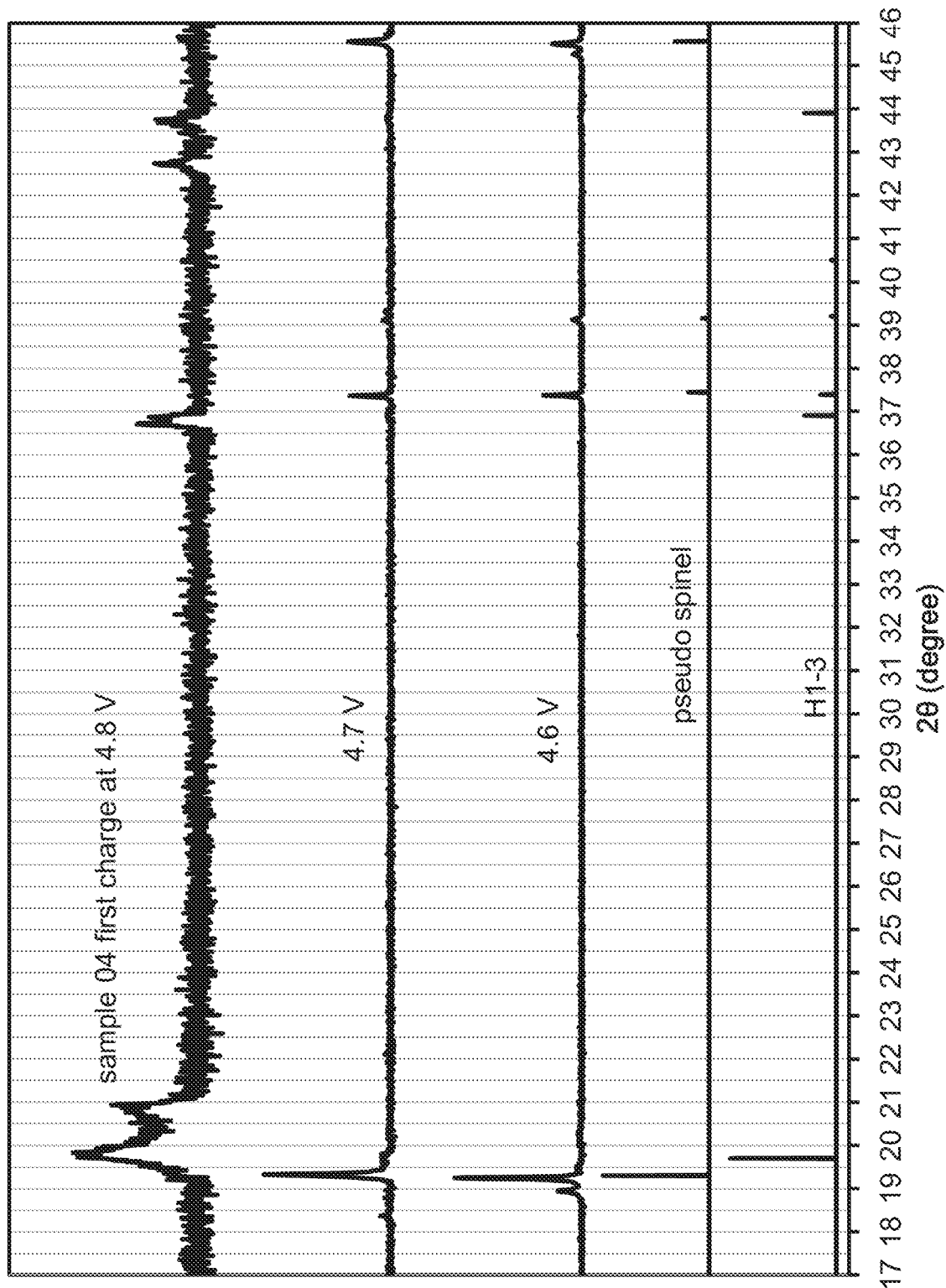
FIG. 30 shows XRD patterns of a positive electrode active material of one embodiment of the present invention in Example 1.

FIG. 30 shows XRD patterns of the positive electrode of the secondary battery that was fabricated using the positive electrode active material of the sample 04 and charged at 4.6 V, 4.7 V, and 4.8 V. The sample 04 charged at 4.6 V and 4.7 V was found to have the pseudo-spinel crystal structure. The sample 04 charged at 4.8 V had a crystal structure different from the pseudo-spinel crystal structure and a peak with an increased width, inferring that crystallinity was reduced.

Figure 31:
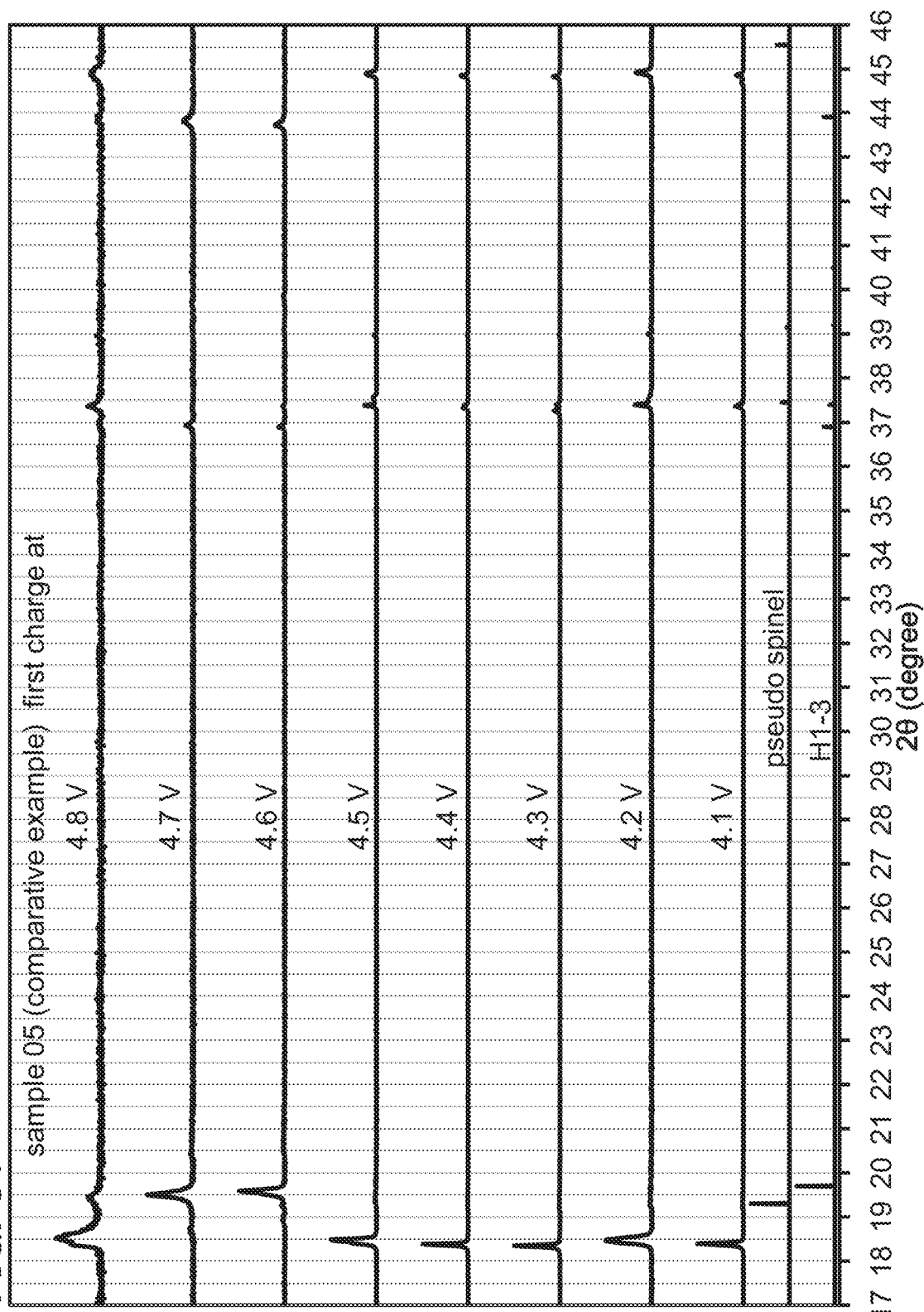
FIG. 31 shows XRD patterns of a comparative positive electrode active material in Example 1.

FIG. 31 shows XRD patterns of the positive electrode of the secondary battery that was fabricated using the positive electrode active material of the comparative sample 05 and charged at 4.1 V, 4.2 V, 4.3 V, 4.4 V, 4.5 V, 4.6 V, 4.7 V, and 4.8 V. The comparative sample 05 charged at 4.6 V or higher and 4.7 V or lower was found to have the H1-3 crystal structure instead of the pseudo-spinel crystal structure (the peak at 2θ of from 43.5° to 46° is particularly unique). It was also found that a change in the crystal structure to the H1-3 crystal structure occurred between 4.5 V and 4.6 V. The sample 05 charged at 4.8 V had a crystal structure different from the pseudo-spinel crystal structure and the H1-3 crystal structure and a peak with an increased width, inferring that crystallinity was reduced.

Figure 32:
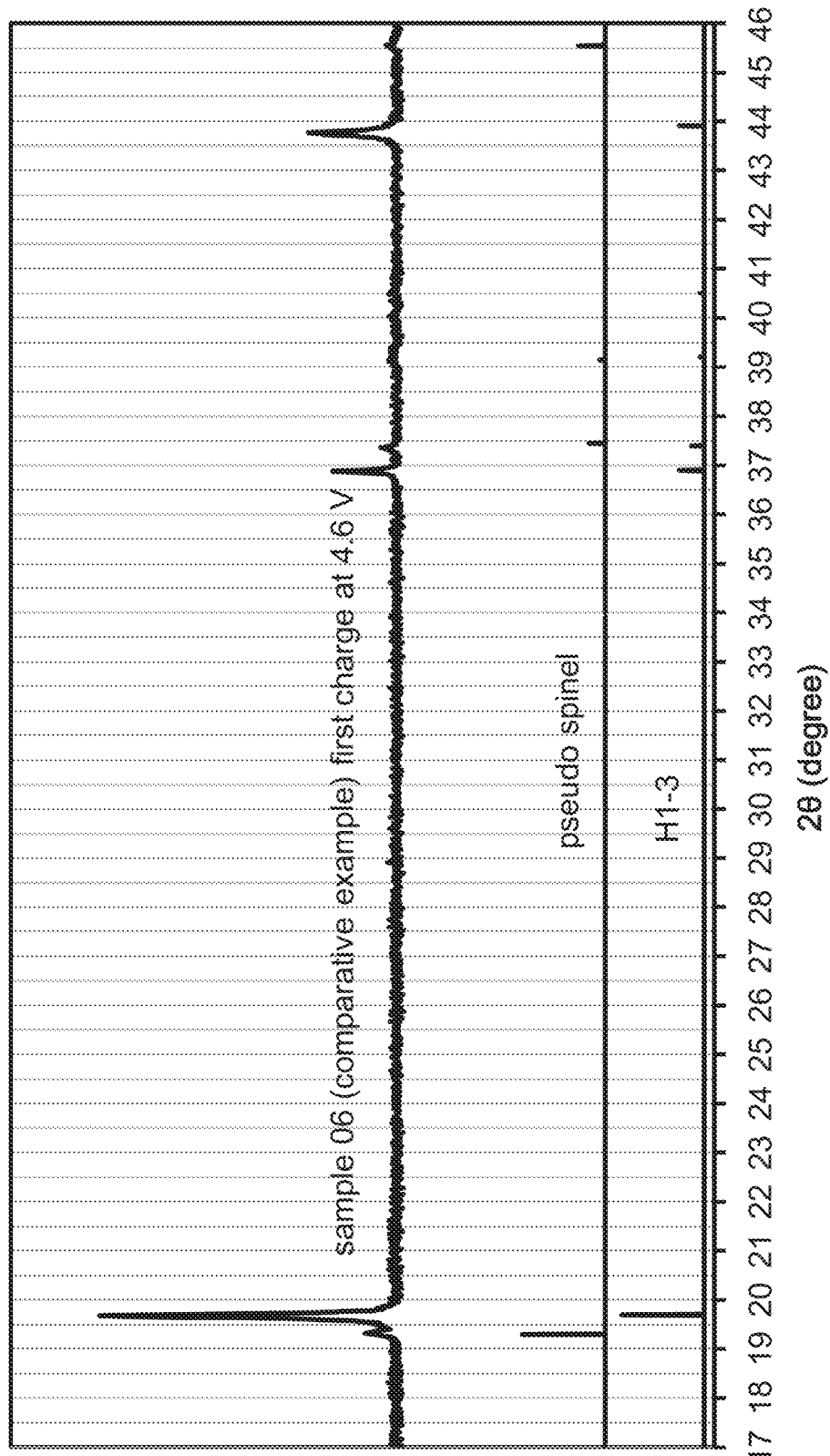
FIG. 32 shows XRD patterns of a comparative positive electrode active material in Example 1.

FIG. 32 shows an XRD pattern of the positive electrode of the secondary battery that was fabricated using the positive electrode active material of the comparative sample 06 and charged at 4.6 V. The sample 06 charged at 4.6 V was found to have the H1-3 crystal structure.

[XRD Results Obtained after Charge Performed a Plurality of Times]

Next, the sample 02, the sample 03, and the comparative sample 05 each of which was charged at 4.6 V a plurality of times were analyzed by XRD. Specifically, the samples subjected to CCCV charge at 4.6 V were referred to as samples charged once. The samples subjected to the CCCV charge at 4.6 V, constant current (CC) discharge until the discharge voltage reached 2.5 V, and the CCCV charge at 4.6 V again were referred to as samples charged twice. Some of the samples were charged nine times.

Figure 33:
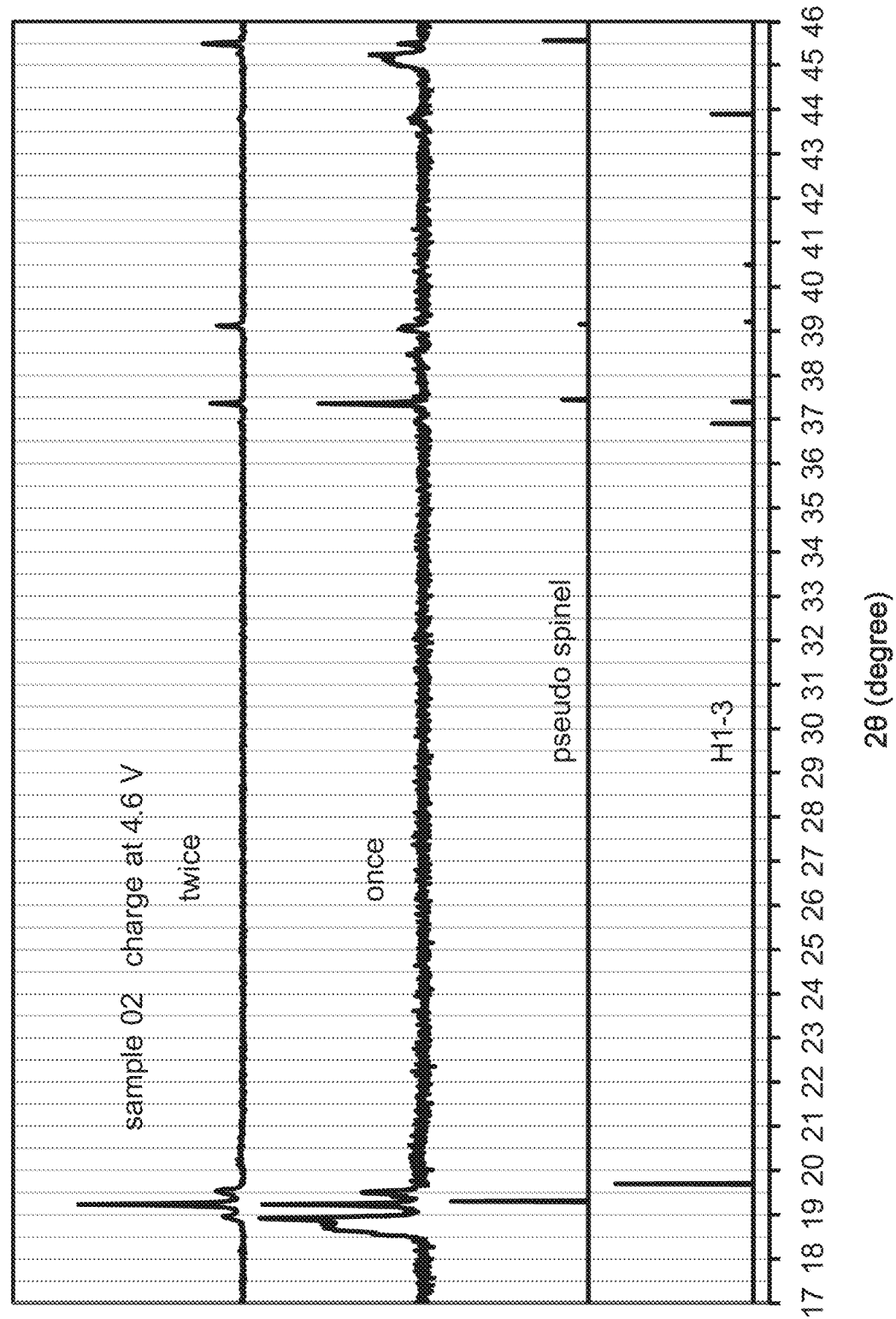
FIG. 33 shows XRD patterns of a positive electrode active material of one embodiment of the present invention in Example 1.

FIG. 33 shows XRD patterns of the positive electrode of the secondary battery that was fabricated using the positive electrode active material of the sample 02 and charged at 4.6 V once and twice. After the first charge, the sample 02 had the H1-3 crystal structure and another crystal structure as well as the pseudo-spinel crystal structure, inferring that crystallinity was reduced. However, after the second charge, the proportion of structures except the pseudo-spinel crystal structure was decreased, and the crystallinity obtained after the second charge was higher than that obtained after the first charge.

Figure 34:
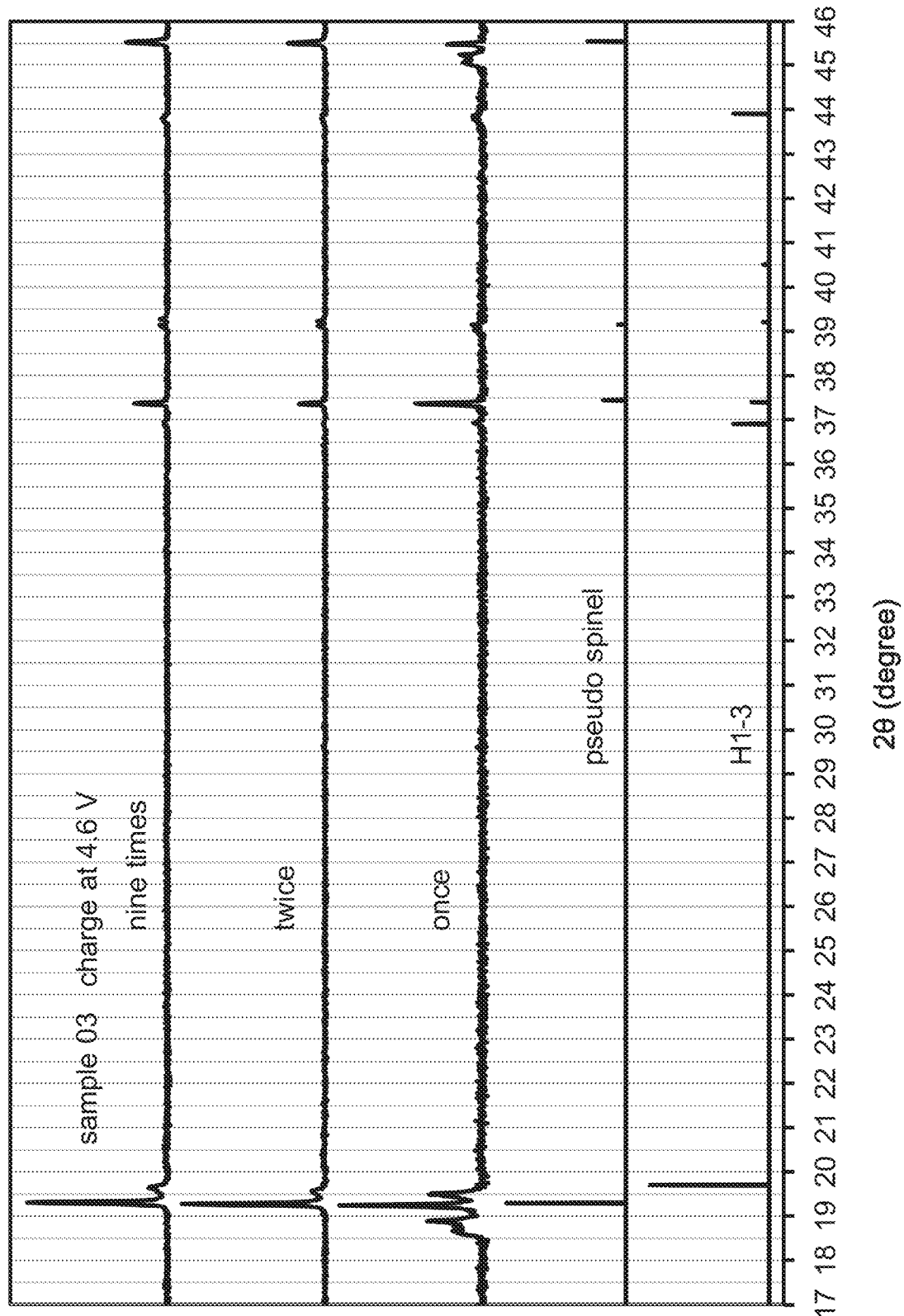
FIG. 34 shows XRD patterns of a positive electrode active material of one embodiment of the present invention in Example 1.

FIG. 34 shows XRD patterns of the positive electrode of the secondary battery that was fabricated using the positive electrode active material of the sample 03 and charged at 4.6 V once, twice, and nine times. After the first charge, the sample 03 also had the H1-3 crystal structure and another crystal structure as well as the pseudo-spinel crystal structure, inferring that crystallinity was reduced. However, after the second or later charge, the proportion of structures except the pseudo-spinel crystal structure was decreased, and the pseudo-spinel crystal structure maintained high crystallinity.

Figure 35:
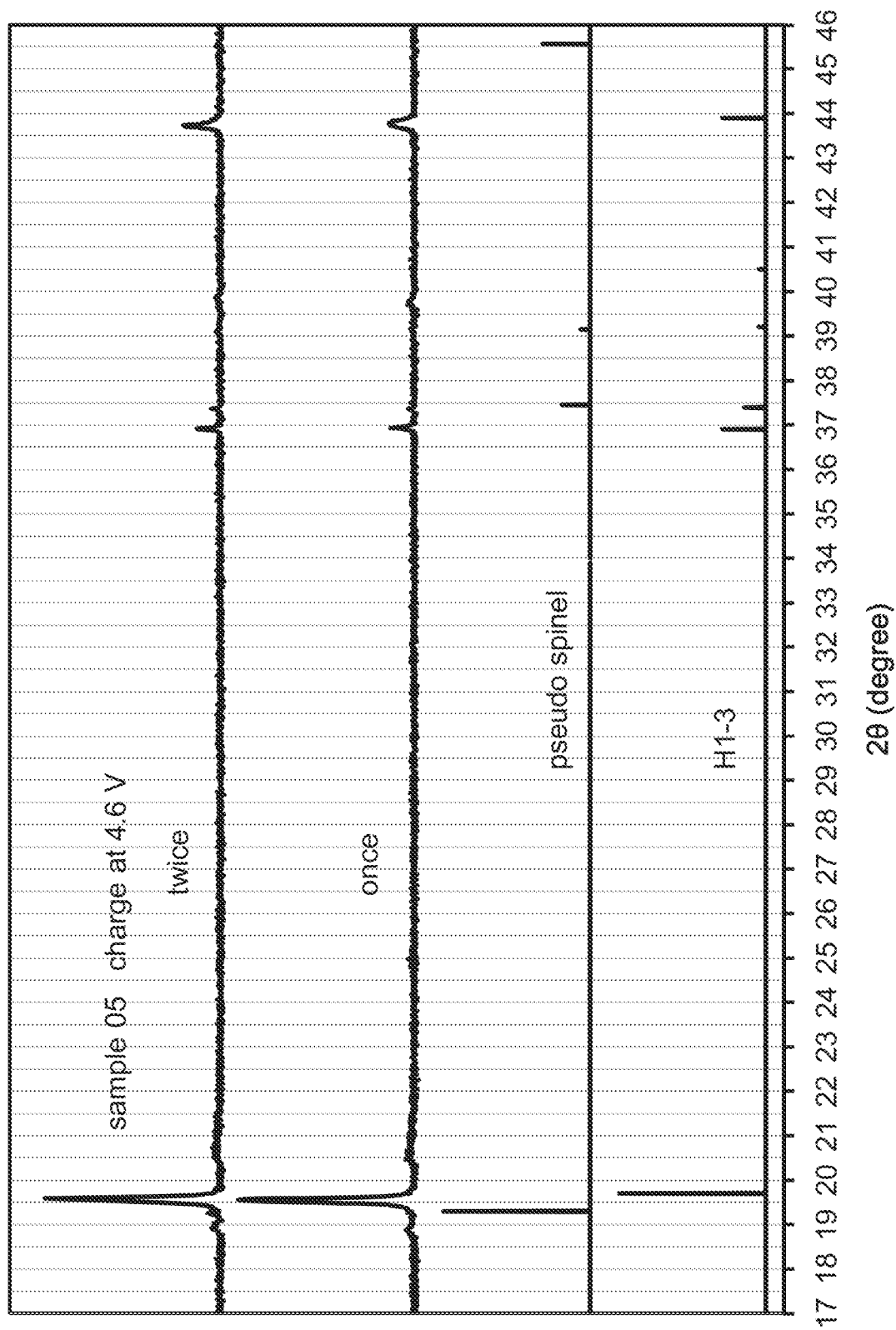
FIG. 35 shows XRD patterns of a comparative positive electrode active material in Example 1.

FIG. 35 shows XRD patterns of the positive electrode of the secondary battery that was fabricated using the positive electrode active material of the comparative sample 05 and charged at 4.6 V once and twice. The sample 05 had the H1-3 crystal structure after the first charge and the second charge. This characteristic is obvious from the peak at 2θ of from 43.5° to 46°.

[XRD Results Obtained after Discharge Performed a Plurality of Times]

Next, the sample 02, the sample 03, and the comparative sample 05 each of which was discharged 10 times were analyzed by XRD. Specifically, after charge and discharge in which the CCCV charge (at 4.6 V) was performed and then the CC discharge (at 2.5 V) was performed were repeated 10 times, the discharged secondary batteries were each disassembled to take out the positive electrode, and the positive electrode was analyzed by XRD.

Figure 36:
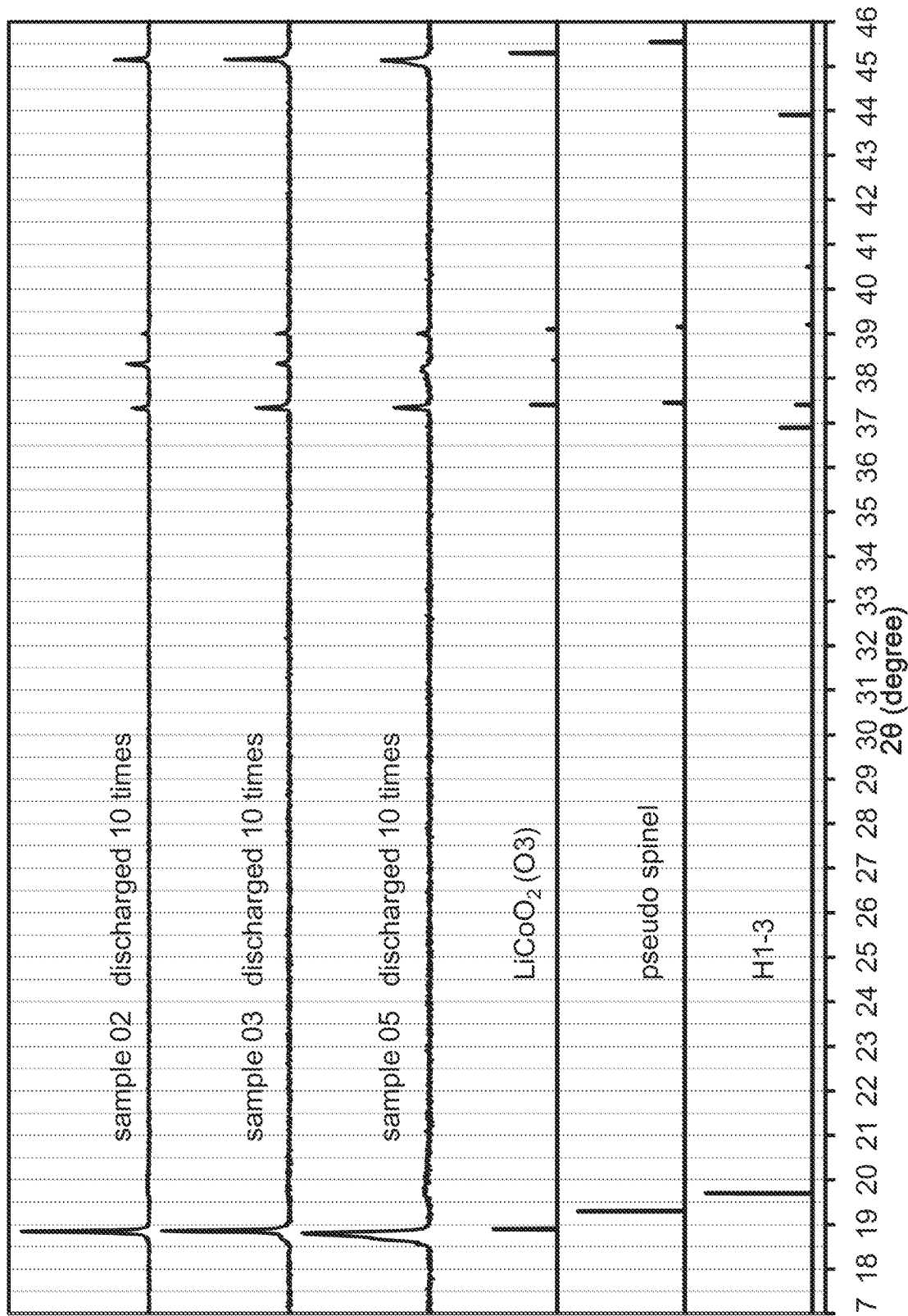
FIG. 36 shows XRD patterns of positive electrode active materials of embodiments of the present invention and a comparative positive electrode active material in Example 1.

FIG. 36 shows XRD patterns of the positive electrodes of the sample 02, the sample 03, and the comparative sample 05 each of which was discharged 10 times. For comparison, FIG. 36 also shows the patterns of $LiCoO_2$ (O3), the pseudo-spinel crystal structure, and the H1-3 crystal structure that are shown in FIG. 3. The sample 02, the sample 03, and the sample 05 each had the $LiCoO_2$ (O3) structure. In the sample 05, the width of the diffraction peak attributed to a plane perpendicular to the c-axis, such as the (003) plane or (006) plane of $LiCoO_2$ (O3), was increased and the crystallinity was reduced. In contrast, in each of the sample 02 and the sample 03, a difference in the positions of the $CoO_2$ layers was not caused and thus high crystallinity was maintained, inferring that the sample 02 and the sample 03 were less likely to deteriorate after the charge and discharge performed 10 times.

[Change in Volume]

Next, the lattice constant and the crystal structure of the sample 03 were estimated from the XRD pattern at each charge depth. Then, the volume per unit cell of each crystal structure was calculated and compared with the volume obtained before charge. For easy comparison with the other crystal structures, the c-axis of the H1-3 crystal structure was half that of the unit cell.

Table 2 shows the lattice constant and crystal structure of the sample 03 estimated from the XRD pattern at each charge depth.

spinel crystal structure, the H1-3 crystal structure, and the O1 crystal structure are represented by symbols different from each other.

Figure 37:
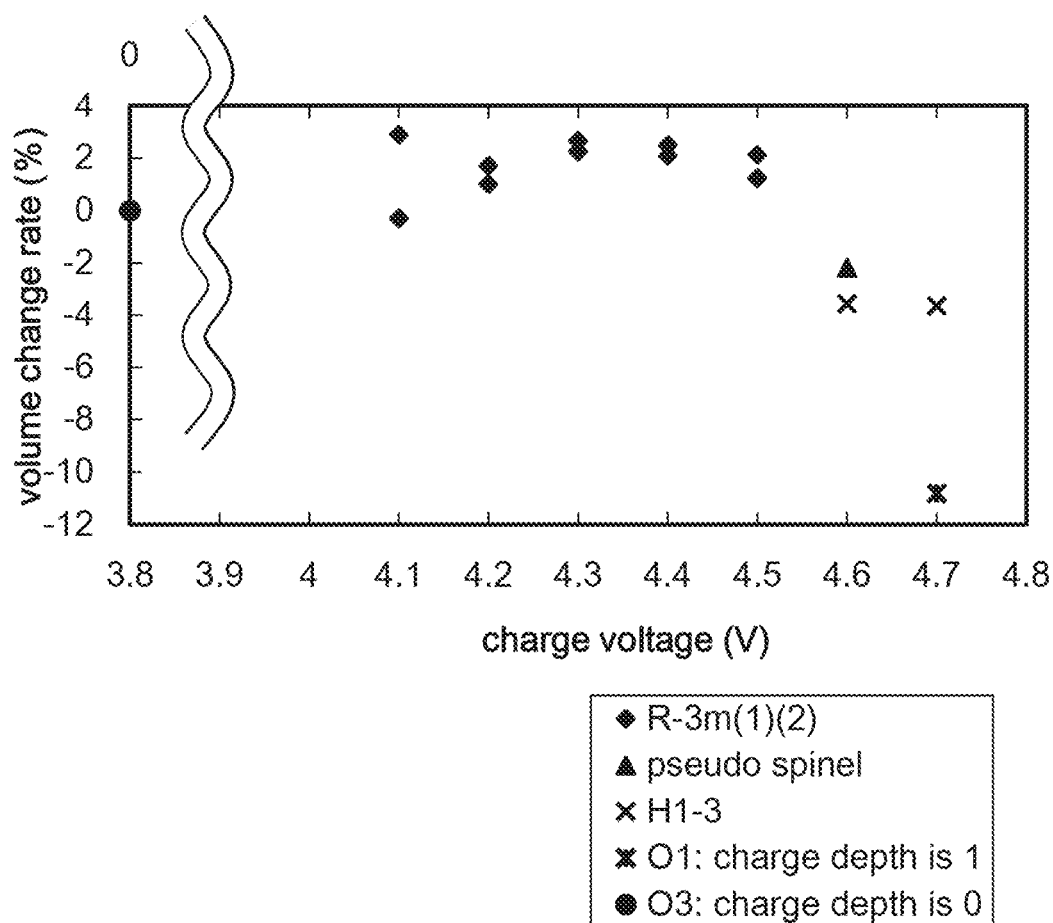
FIG. 37 is a graph showing a volume change rate of a positive electrode active material of one embodiment of the present invention in Example 1.

As shown in Table 2 and FIG. 37, a change in volume per unit cell is smaller in the pseudo-spinel crystal structure than in the H1-3 crystal structure. Since the proportion of the pseudo-spinel crystal structure in the sample 03 charged at 4.6 V was more than or equal to 77 wt %, changes in the crystal structure and volume were reduced.

[Cycle Performance]

Next, the cycle performance of each of the secondary batteries fabricated using the sample 01, the sample 03, and the sample 05 was measured.

Note that the lots of the sample 01 and the sample 03 each of which was subjected to the cycle performance measurement differed from those of the samples analyzed by XRD; thus, the formation conditions of the samples were slightly different from each other. Therefore, asterisks are shown in the graphs but the characteristics of the positive electrode active materials were not largely different from each other. Specifically, the first heat treatment was performed on the sample 01 at 1000° C. The sample 03 was formed under the following conditions: the amount of TTIP used in the sol-gel

TABLE 2

| Charge Voltage (V) | Charge Capacity (mAh/g) | Proportion (wt %) | a-axis (Å) | c-axis (Å) | Unit cell Volume (Å$^3$) | Volume change rate (%) | Crystal structure |
| --- | --- | --- | --- | --- | --- | --- | --- |
| 0 | 0 | 100.0 | 2.82 | 14.05 | 96.50 | 0.00 | R-3m |
| 4.1 | 124.2 | 41.1 | 2.81 | 14.09 | 96.21 | −0.30 | R-3m(1) |
|  |  | 58.9 | 2.82 | 14.40 | 99.29 | 2.89 | R-3m(2) |
| 4.2 | 137.3 | 52.2 | 2.81 | 14.26 | 97.47 | 1.00 | R-3m(1) |
|  |  | 47.8 | 2.81 | 14.37 | 98.14 | 1.70 | R-3m(2) |
| 4.3 | 153.8 | 69.8 | 2.81 | 14.44 | 98.66 | 2.24 | R-3m(1) |
|  |  | 30.1 | 2.81 | 14.45 | 99.06 | 2.65 | R-3m(2) |
| 4.4 | 168.4 | 94.0 | 2.81 | 14.41 | 98.51 | 2.08 | R-3m(1) |
|  |  | 6.0 | 2.82 | 14.41 | 98.90 | 2.48 | R-3m(2) |
| 4.5 | 186.9 | 30.9 | 2.81 | 14.42 | 98.54 | 2.11 | R-3m(1) |
|  |  | 69.1 | 2.81 | 14.28 | 97.69 | 1.23 | R-3m(2) |
| 4.6 | 216.4 | 77.2 | 2.82 | 13.75 | 94.39 | −2.19 | pseudo spinel |
|  |  | 22.8 | 2.81 | 13.57 | 93.05 | −3.58 | H1-3 |
| 4.7 | 254.7 | 52.0 | 2.82 | 13.48 | 92.98 | −3.66 | H1-3 |
|  |  | 48.0 | 2.80 | 12.65 | 86.06 | −10.82 | O1 |

When charged at 4.1 V or higher and 4.5 V or lower, the sample 03 was presumed to have two-phase crystal structures belonging to the space group R-3m. This was probably because the charge depths differed in the particle or between the particles of each positive electrode active material. In Table 2, the two-phase crystal structures are represented by R-3m(1) and R-3m(2).

When charged at 4.6 V, the sample 03 was presumed to have the pseudo-spinel crystal structure and the H1-3 crystal structure. The Rietveld analysis indicated that the pseudo-spinel crystal structure accounted for more than or equal to 77 wt % of the sample 03.

When charged at 4.7 V, the sample 03 was presumed to have the H1-3 crystal structure and the O1 crystal structure.

The rate of change in volume from the O3 crystal structure to the pseudo-spinel crystal structure was 2.5% or less, more specifically, 2.2% or less, whereas the rate of change in volume from the O3 crystal structure to the H1-3 crystal structure was 3.5% or more.

FIG. 37 is a graph showing the volume change rate in Table 2. The upper horizontal axis of the graph represents that the charge depth of O3 is 0. In FIG. 37, the crystal structures assumed to be R-3m(1) and R-3m(2), the pseudo-treatment was 0.01 ml/g and the second heat treatment was performed in a dry air atmosphere.

The coin cell was formed in the above manner except that a positive electrode active material (LCO), acetylene black (AB), and polyvinylidene fluoride (PVDF) were mixed at a weight ratio of 95:2.5:2.5.

The cycle tests were performed at 25° C. The CCCV charge was performed at 0.5 C, 4.6 V, and a termination current of 0.01 C. The CC discharge was performed at 0.5 C and 2.5 V. Here, 1 C was set to 137 mA/g, which was a current value per unit mass of the positive electrode active material.

Figure 38A:
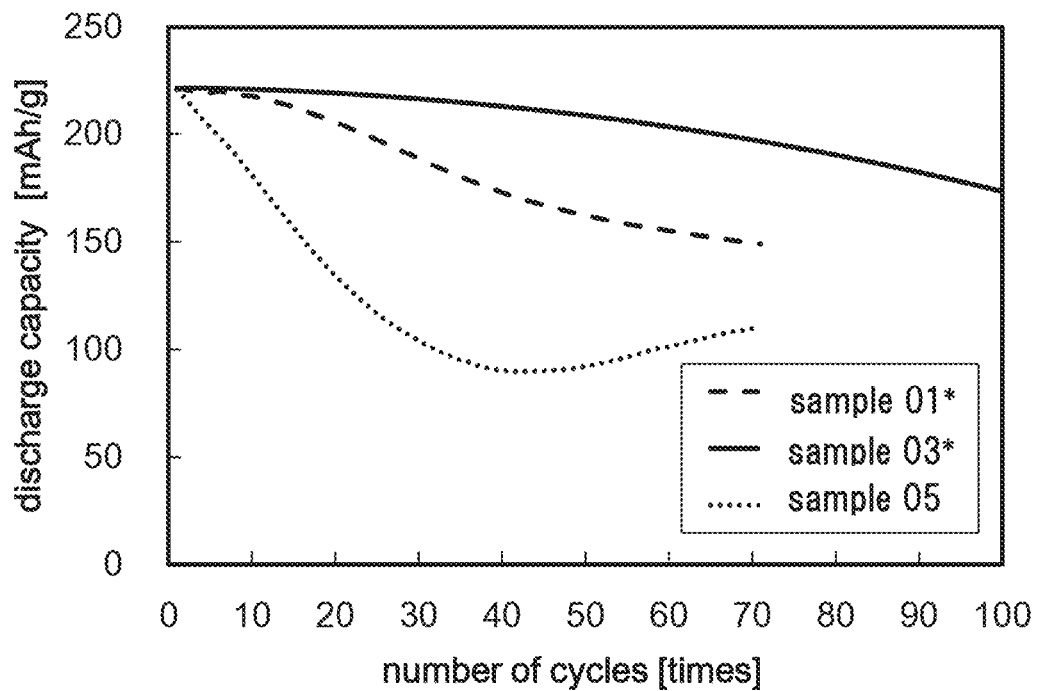
FIGS. 38A and 38B show cycle performance of secondary batteries of embodiments of the present invention and a comparative secondary battery in Example 1.
Figure 38B:
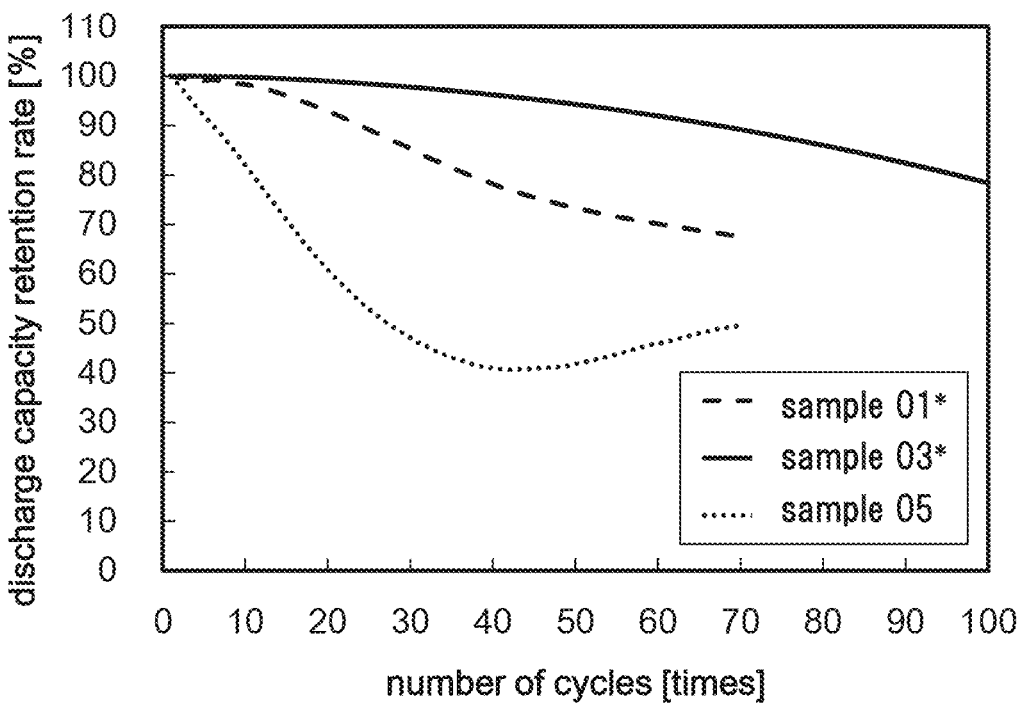

FIG. 38A shows discharge capacities of the sample 01, the sample 03, and the sample 05. FIG. 38B shows discharge capacity retention rates of the sample 01, the sample 03, and the sample 05. The discharge capacity retention rate of the comparative sample 05 was decreased to 40.9% at the 40th cycle. In contrast, the initial capacity of the positive electrode active material of one embodiment of the present invention was as high as that of the comparative example, and the sample 01 and the sample 03 each had excellent cycle performance: the discharge capacity retention rate of the sample 03 was 78.4% at the 100th cycle, and the discharge capacity retention rate of the sample 01 was 67.5% at the 70th cycle.

The above results revealed that the positive electrode active material of one embodiment of the present invention had excellent cycle performance even when charged and discharged at a high voltage of 4.6 V.

As described above, it was found that in the samples 01 to 04 each of which was the positive electrode active material of one embodiment of the present invention and charged at 4.6 V, the proportion of the pseudo-spinel crystal structure was more than or equal to 60%. The pseudo-spinel crystal structure had small differences in the crystal structure and volume between the charged state and the discharged state as compared with the H1-3 crystal structure; thus, the pseudo-spinel crystal structure was less likely to deteriorate even when charge and discharge were repeated. Thus, a positive electrode active material having the pseudo-spinel crystal structure when charged with high voltage had excellent cycle performance even when charged and discharged with high voltage.

In contrast, it was found that the comparative samples 05 and 06 charged at 4.6 V had no or extremely small proportion of the pseudo-spinel crystal structure and mainly had the H1-3 crystal structure. Differences in the crystal structure and volume between the H1-3 crystal structure and the O3 crystal structure were large; thus, the H1-3 crystal structure was likely to deteriorate. Therefore, the samples 05 and 06 were materials that could not withstand charge with high voltage, and actually, the discharge capacities of the samples 05 and 06 were greatly decreased.

Although containing magnesium and fluorine like the sample 01, the comparative sample 05 mainly had the H1-3 crystal structure when charged at 4.6 V, and thus the cycle performance of the sample 05 was low. As described above, the positive electrode active material of one embodiment of the present invention had a feature of a small change in the crystal structure caused by the charge and discharge. This feature could not be determined only by elements contained in the positive electrode active material.

Example 2

This example describes ESR analysis results of the positive electrode active material 100 of one embodiment of the present invention and comparative lithium cobalt oxide.
[Formation of Positive Electrode Active Material]
<<Sample 11A and Sample 11B>>
A positive electrode active material in which magnesium and fluorine were used as starting materials and the first heat treatment was performed was used as a sample 11A, and a positive electrode active material in which the second heat treatment was performed on the sample 11A was used as a sample 11B.

As Step S11 and Step S12, lithium carbonate, cobalt oxide, magnesium oxide, and lithium fluoride were weighed to have an atomic ratio of $Li_{1.02}Co_{0.99}Mg_{0.01}O_{1.98}F_{0.02}$ and then mixed. Then, the first heat treatment in Step S13 was performed under the following conditions: an aluminum oxide crucible was used; the flow rate of a dry air atmosphere was 10 L/min; the retention temperature was 1000° C. (the temperature rising rate was 200° C./h); and the retention time was 10 hours. The time of decreasing temperature from the retention temperature to room temperature was 10 hours to 15 hours. A lithium cobalt oxide particle containing magnesium and fluorine that was synthesized by the first heat treatment was used as the sample 11A.

Next, the lithium cobalt oxide particle containing magnesium and fluorine that was used as the sample 11A was put into an alumina crucible to be subjected to the second heat treatment in Step S15. The second heat treatment was performed under the following conditions: the flow rate of a dry air atmosphere was 10 L/min; the retention temperature was 800° C. (the temperature rising rate was 200° C./h); and the retention time was 2 hours. The time of decreasing temperature from the retention temperature to room temperature was 10 hours to 15 hours. The particle formed in the above manner was used as the sample 11B.
<<Sample 12B>>
A positive electrode active material formed by the first heat treatment and the second heat treatment without the addition of magnesium and fluorine was used as a comparative sample 12B.

Figure 39:
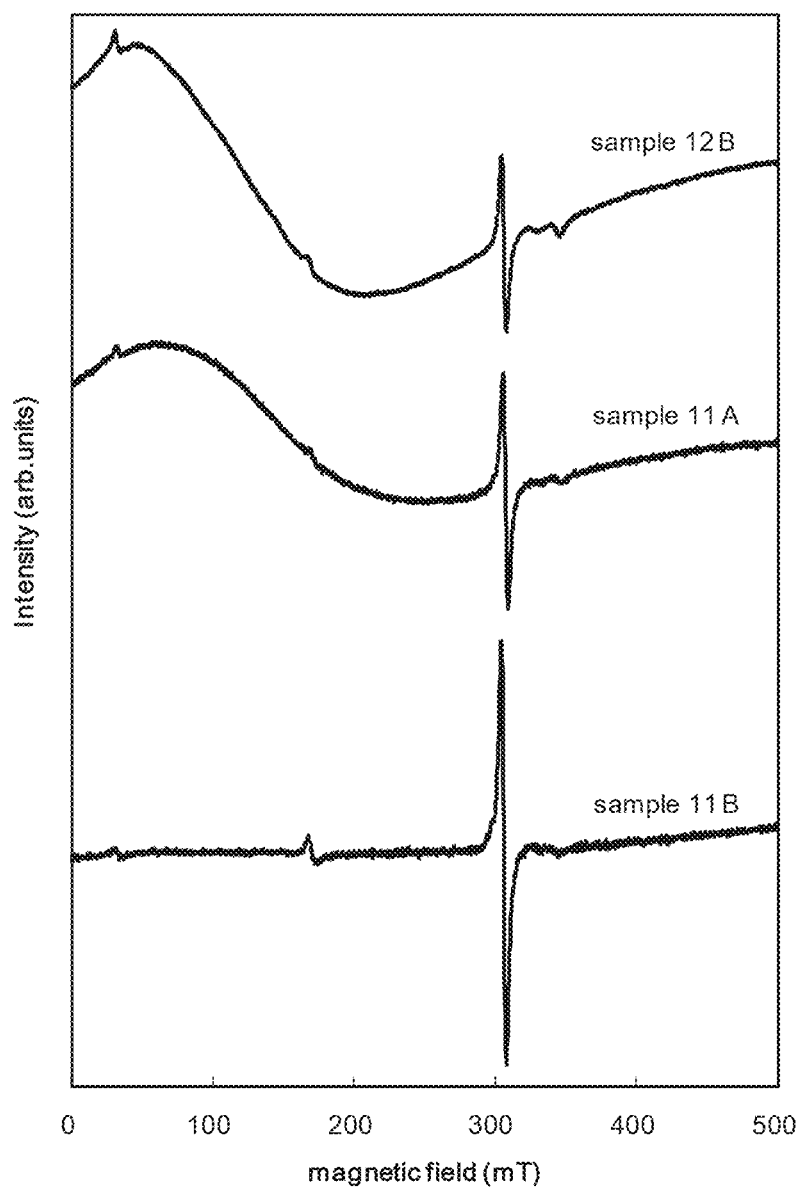
FIG. 39 shows ESR signals of positive electrode active materials of embodiments of the present invention and a comparative positive electrode active material in Example 2.

The sample 12B was formed in a manner similar to that of the sample 11B except that lithium carbonate and cobalt oxide were weighed to have an atomic ratio of $Li_1Co_1O_2$.
[ESR]
FIG. 39 and FIGS. 40A to 40C show ESR analysis results of the sample 11A, the sample 11B, and the sample 12B. FIG. 39 shows signals obtained by measurement at room temperature. FIGS. 40A to 40C are graphs showing the results of measurement at low temperatures (10 K) that are enlarged for comparison between sharp signals at around 320 mT.

As shown in FIG. 39, wide width signals approximately from 120 mT to 150 mT were observed in the sample 12B and the sample 11A, whereas the signal was lower than or equal to the lower detection limit in the sample 11B. The signal corresponds to Co in the tetracoordinated oxygen site (the site A in FIG. 5A).

Thus, the sample 12B not containing magnesium or fluorine and the sample 11A in which magnesium and fluorine were contained and the second heat treatment was not performed had $Co_3O_4$ having the spinel crystal structure, whereas in the sample 11B in which magnesium and fluorine were contained and the second heat treatment was performed, $Co_3O_4$ having the spinel crystal structure was lower than or equal to the lower detection limit.

As shown in FIGS. 40A to 40C, sharp peaks at around 320 mT were observed in all the samples. A signal including the sharp peak corresponds to Co in the hexacoordinated oxygen site (the site B in FIG. 5A).

A shoulder peak at around 312 mT was observed in each of the sample 11A in FIG. 40B and the sample 11B in FIG. 40C but not observed in the sample 12B in FIG. 40A. This peak indicates that Mg exists near Co. As described above, it can be determined using ESR that a positive electrode active material contains Mg.

Example 3

In this example, calculation reveals the kind of element that makes it easier to obtain the pseudo-spinel crystal structure at high-voltage charge in forming a solid solution.

As described with reference to FIG. 2, the H1-3 crystal structure has the structure in which the $CoO_2$ structure such as P-3m1 (O1) and the $LiCoO_2$ structure such as R-3m (O3) are alternately stacked.

Thus, when the proportion of the structure belonging to P-3m1 is increased to approximately half, the H1-3 crystal structure is probably likely to be obtained. In contrast, when the proportion of the structure belonging to R-3m is 50% or more, the pseudo-spinel crystal structure of R-3m is probably likely to be obtained. Hence, high-voltage charged positive electrode active materials were reproduced using the crystal structure models of P-3m1 and R-3m to calculate the stabilization energy in the case of containing Mg, Al, or Ti.

As the crystal structure models in the high-voltage charged state, R-3m (O3) in FIG. 2 from which all Li was extracted and P-3m1 (O1) were used. Then, the case where Mg, Al, or Ti was inserted into the most stable position between the $CoO_2$ layers and the case where Mg, Al, or Ti was substituted at the Co site were calculated.

FIG. 41A1 shows the crystal structure model of P-3m1 containing Mg, Al, or Ti between the $CoO_2$ layers, and FIG. 41A2 shows the crystal structure model of R-3m containing Mg, Al, or Ti between the $CoO_2$ layers. FIG. 41B1 shows the crystal structure model of P-3m1 containing Mg, Al, or Ti in the Co site, and FIG. 41B2 shows the crystal structure model of R-3m containing Mg, Al, or Ti in the Co site. Table 3 shows the calculation conditions.

TABLE 3

| Software | Vienna Ab initio simulation package | |
|---|---|---|
| Functional | Local Density Approximation | |
| Pseudopotential | Projector augmented wave method | |
| Cutoff energy (eV) | 520 | |
| Crystal structure (Space group) | R-3 m or P-3 m1 | |
| Number of atoms | Insertion between $CoO_2$ layers | Inserted atom (Li, Mg, Ti, or Al): 1 atom, Co: 12 atoms, O: 24 atoms |
| | Substitution for Co | Substituting atom (Mg, Ti, or Al): 1 atom, Co: 12 atoms, O: 24 atoms |
| k-points | 3 × 3 × 1 | |
| Calculation target | Atomic position is optimized | |

When Mg was inserted between the $CoO_2$ layers, the energy difference ΔE (eV) between the structure of the space group P-3m1 and the structure of the space group R-3m was calculated using the following formula. The energy of a single atom was used as the energy of the inserted and substituted element.

$$\Delta E = \{E_{total,R-3m}(Mg_1Co_{12}O_{24})\} - \{E_{total,P-3m1}(Mg_1Co_{12}O_{24})\} \quad \text{[Formula 2]}$$

$E_{total, R-3m}$ ($Mg_1Co_{12}O_{24}$): Energy of a model in which one Mg atom is inserted between $CoO_2$ layers in a crystal structure of a space group R-3m (a structure b in FIG. 41A2).

$E_{total, P-3m1}$ ($Mg_1Co_{12}O_{24}$): Energy of a model in which one Mg atom is inserted between $CoO_2$ layers in a crystal structure of a space group P-3m1 (a structure a in FIG. 41A1).

Similarly, when Mg was substituted at the Co site, the energy difference was calculated using the following formula.

$$\Delta E = \{E_{total,R-3m}(Mg_1Co_{11}O_{24})\} - \{E_{total,P-3m1}(Mg_1Co_{11}O_{24})\} \quad \text{[Formula 3]}$$

$E_{total, R-3m}$ ($Mg_1Co_{11}O_{24}$): Energy of a model in which one Mg atom is substituted for Co in a crystal structure of a space group R-3m (a structure b in FIG. 41B2)).

$E_{total, P-3m1}$ ($Mg_1Co_{11}O_{24}$): Energy of a model in which one Mg atom is substituted for Co in a crystal structure of a space group P-3m1 (a structure a in FIG. 41B1).

Figure 42A:
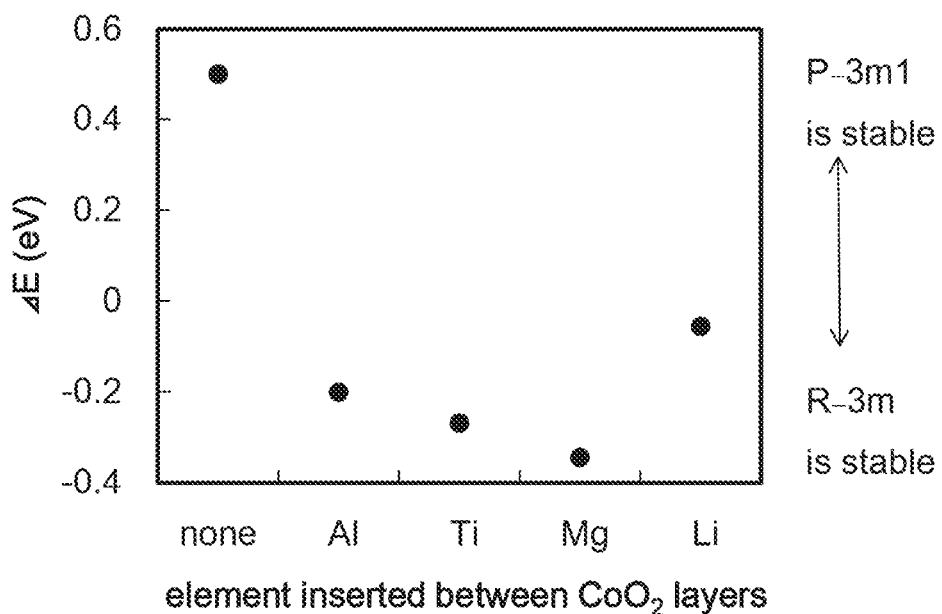
FIGS. 42A and 42B are graphs showing calculation results in Example 3.
Figure 42B:
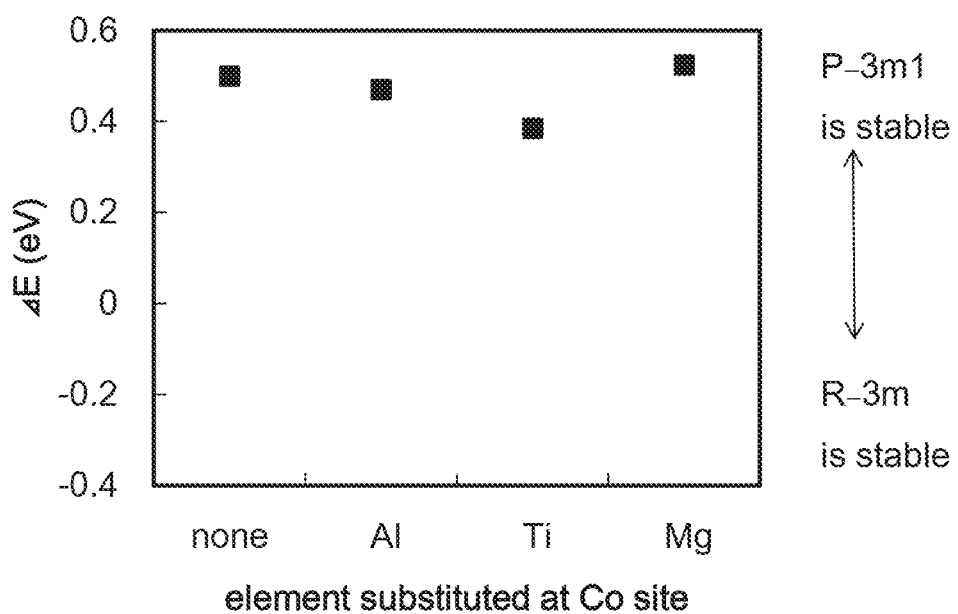

FIGS. 42A and 42B show the calculation results. The calculation of other elements was conducted in the above manner. For comparison, FIGS. 42A and 42B also show the calculation results of the case where no element was inserted or substituted and the case where Li was inserted between the $CoO_2$ layers.

FIG. 42A is a graph showing the stabilization energy ΔE of the case where Al, Ti, Mg, or Li was inserted between the $CoO_2$ layers. The energy ΔE of each element was negative, which means that the structure of the space group R-3m is more stable than that of P-3m1. In addition, the energy ΔE of each element was lower than that of Li. That is, a positive electrode active material containing any of the elements between the $CoO_2$ layers is likely to have the R-3m structure even when charged with high voltage, as compared with simple $LiCoO_2$. Among Al, Ti, and Mg, Mg was most effective.

FIG. 42B is a graph showing the stabilization energy ΔE of the case where Al, Ti, or Mg was substituted at the Co site. The energy ΔE of each element was positive, which means that the P-3m1 structure is more stable than the space group R-3m. The energies ΔE of Al and Ti measured when Al and Ti were substituted at the Co sites were lower than those of Al and Ti measured when Al and Ti were not substituted at the Co sites (i.e., when Co existed), whereas the energy ΔE of Mg measured when Mg was substituted at the Co site was higher than that of Mg measured when Mg was not substituted at the Co site.

Thus, Mg between the $CoO_2$ layers is highly effective in maintaining the R-3m structure, whereas Mg in the Co site does not have such an effect.

Figure 43:
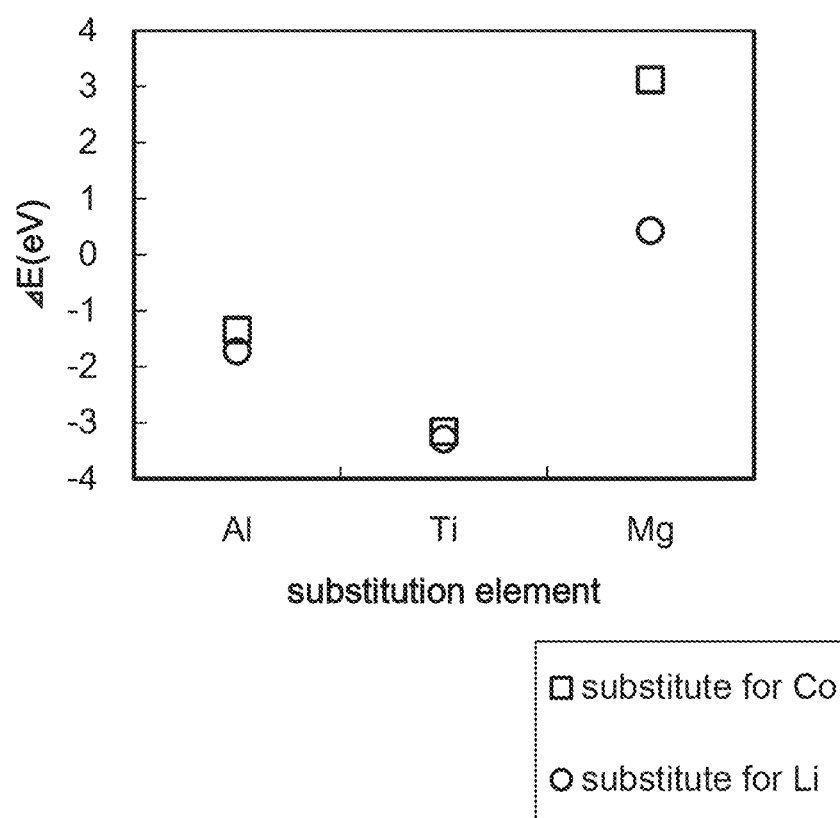
FIG. 43 is a graph showing calculation results in Example 3.

Next, calculation was conducted to compare the stability of Al, Ti, or Mg substituted at the Li site with that of Al, Ti, or Mg substituted at the Co site in the R-3m (O3) crystal structure into which all lithium ions were inserted (in the discharged state). The calculation method was similar to that in FIGS. 42A and 42B. FIG. 43 shows the calculation results.

The energies ΔE of Al and Ti substituted at the Li sites and the Co sites were comparably negative. The energy ΔE of Ti was lower than that of Al. The results indicate that Al and Ti tend to form a solid solution in $LiCoO_2$ and Ti forms a solid solution in $LiCoO_2$ more easily.

With regard to Mg, Mg substituted at the Li site was very stable as compared with Mg substituted at the Co site. Thus, Mg is more likely to enter the Li site than the Co site. The energies ΔE of Mg substituted at the Li site and Mg substituted at the Co site were both positive, which means that Mg is slightly unlikely to form a solid solution in $LiCoO_2$. This tendency can describe a phenomenon in which part of Mg is segregated in the surface portion, the vicinity of the crystal grain boundary, and the like.

The above results indicate that when Mg exists between the $CoO_2$ layers (in the Li site), the R-3m structure is easily maintained even in the high-voltage charged state where a large amount of Li is extracted and the pseudo-spinel crystal structure is likely to be obtained. Thus, it is important to surely place, in the Li site (not in the Co site), Mg that easily enters the Li site in $LiCoO_2$ in the manufacturing process including the second heat treatment.

REFERENCE NUMERALS

100: positive electrode active material, 200: active material layer, 201: graphene compound, 211a: positive electrode, 211b: negative electrode, 212a: lead, 212b: lead, 214: separator, 215a: bonding portion, 215b: bonding portion, 217: fixing member, 250: secondary battery, 251: exterior body, 261: folded portion, 262: seal portion, 263: seal portion, 271: crest line, 272: trough line, 273: space, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 613: conductive plate, 614: conductive plate, 615: module, 616: wiring, 617: temperature control device, 900: circuit board, 910: label, 911: terminal, 912: circuit, 913: secondary battery, 914: antenna, 915: antenna, 916: layer, 917: layer, 918: antenna, 920: display device, 921: sensor, 922: terminal, 930: housing, 930a: housing, 930b: housing, 931: negative electrode, 932: positive electrode, 933: separator, 950: wound body, 951: terminal, 952: terminal, 980: secondary battery, 981: film, 982: film, 993: wound body, 994: negative electrode, 995: positive electrode, 996: separator, 997: lead electrode, 998: lead electrode, 7100: portable display device, 7101: housing, 7102: display portion, 7103: operation button, 7104: secondary battery, 7200: portable information terminal, 7201: housing, 7202: display portion, 7203: band, 7204: buckle, 7205: operation button, 7206: input/output terminal, 7207: icon, 7300: display device, 7304: display portion, 7400: mobile phone, 7401: housing, 7402: display portion, 7403: operation button, 7404: external connection port, 7405: speaker, 7406: microphone, 7407: secondary battery, 7408: lead electrode, 7500: electronic cigarette, 7501: atomizer, 7502: cartridge, 7504: secondary battery, 8000: display device, 8001: housing, 8002: display portion, 8003: speaker portion, 8004: secondary battery, 8021: charging apparatus, 8022: cable, 8024: secondary battery, 8025: secondary battery, 8100: lighting device, 8101: housing, 8102: light source, 8103: secondary battery, 8104: ceiling, 8105: wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator door, 8303: freezer door, 8304: secondary battery, 8400: automobile, 8401: headlight, 8406: electric motor, 8500: automobile, 8600: motor scooter, 8601: side mirror, 8602: secondary battery, 8603: indicator, 8604: storage unit under seat, 9600: tablet terminal, 9625: switch, 9626: switch, 9627: switch, 9628: operation switch, 9629: fastener, 9630: housing, 9630a: housing, 9630b: housing, 9631: display portion, 9633: solar cell, 9634: charge and discharge control circuit, 9635: power storage unit, 9636: DCDC converter, 9637: converter, and 9640: movable portion.

This application is based on Japanese Patent Application Serial No. 2017-099871 filed with Japan Patent Office on May 19, 2017, the entire contents of which are hereby incorporated by reference.

The invention claimed is:

1. A method for manufacturing a lithium-ion secondary battery comprising a positive electrode, a negative electrode, and an electrolyte, the positive electrode comprising a positive electrode active material, the positive electrode active material comprising a positive electrode active material particle, the method comprising the steps of:
    mixing a lithium source, a cobalt source, a magnesium source, and a fluorine source to form a mixture;
    performing a first heating on the mixture to form a composite oxide; and
    performing a second heating on the composite oxide so that magnesium of the magnesium source is segregated at a surface portion of the positive electrode active material particle,
    wherein a temperature of the second heating is lower than a temperature of the first heating, and
    wherein the mixture comprises a magnesium compound and a compound comprising lithium and fluorine.

2. The method according to claim 1, wherein the magnesium compound comprises magnesium oxide.

3. The method according to claim 1, wherein the magnesium compound comprises magnesium fluoride.

4. The method according to claim 1, wherein the temperature of the first heating is higher than or equal to 800° C. and lower than 1100° C.

5. The method according to claim 1,
    wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line in a charged state, and
    wherein the positive electrode active material has a property that the positive electrode active material comprises an O3 crystal structure in a discharged state.

6. The method according to claim 1,
    wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line when a charged depth is 0.8 or greater, and
    wherein the positive electrode active material has a property that the positive electrode active material comprises an O3 crystal structure when a charge depth is 0.06 or less.

7. The method according to claim 1,
    wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKal line when charged with a lithium metal counter electrode at 25° C. and at 4.6 V.

8. The method according to claim 1, wherein the magnesium source is for reducing a difference in the positions of $CoO_2$ layers.

9. The method according to claim 1,
    wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line when charged with a lithium metal counter electrode, wherein the charging is performed at 25° C. by CCCV charge, wherein the CCCV charge is performed at a current value of 0.5C and a voltage of 4.6V with a termination current of 0.01C, and wherein 1C is set to 137 mA/g.

10. The method according to claim 9, wherein, for the charging, 1 mol/L lithium hexafluorophosphate is used as an electrolyte, a mixture of ethylene carbonate and diethyl carbonate at a volume ratio of 3:7 and vinylene carbonate at 2 wt % is used as an electrolyte solution, and 25-μm-thick polypropylene is used as a separator.

11. The method according to claim 1, wherein the surface portion of the positive electrode active material particle is a region from a surface of the positive electrode active material particle to a depth of 10 nm.

12. The method according to claim 1, wherein lithium carbonate is used as the lithium source, cobalt oxide is used as the cobalt source, lithium fluoride is used as the lithium source and the fluorine source, and magnesium oxide is used as the magnesium source.

13. The method according to claim 1, wherein lithium carbonate is used as the lithium source, cobalt oxide is used as the cobalt source, lithium fluoride is used as the lithium source and the fluorine source, and magnesium fluoride is used as the magnesium source and the fluorine source.

14. The method according to claim 1, wherein fluorine of the fluorine source is segregated at the surface portion of the positive electrode active material particle by the second heating on the composite oxide.

15. The method according to claim 1, wherein the compound comprising lithium and fluorine comprises lithium fluoride.

16. The method according to claim 1, wherein the second heating is performed in an oxygen-containing atmosphere in which a flow rate of oxygen is 10 L/min.

17. A method for manufacturing a lithium-ion secondary battery comprising a positive electrode, a negative electrode, and an electrolyte, the positive electrode comprising a positive electrode active material, the positive electrode active material comprising a positive electrode active material particle, the method comprising the steps of:

mixing a lithium source, a cobalt source, a magnesium source, and a fluorine source to form a mixture;

performing a first heating on the mixture to form a composite oxide; and performing a second heating on the composite oxide at a temperature higher than or equal to 700° C. and lower than or equal to 920° C. so that magnesium of the magnesium source is segregated at a surface portion of the positive electrode active material particle, wherein the temperature of the second heating is lower than a temperature of the first heating, and wherein the mixture comprises a magnesium compound and a compound comprising lithium and fluorine.

18. The method according to claim 17, wherein the magnesium compound comprises magnesium oxide.

19. The method according to claim 17, wherein the magnesium compound comprises magnesium fluoride.

20. The method according to claim 17, wherein the temperature of the first heating is higher than or equal to 800° C. and lower than 1100° C.

21. The method according to claim 17, wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line in a charged state, and wherein the positive electrode active material has a property that the positive electrode active material comprises an O3 crystal structure in a discharged state.

22. The method according to claim 17, wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line when a charged depth is 0.8 or greater, and wherein the positive electrode active material has a property that the positive electrode active material comprises an O3 crystal structure when a charge depth is 0.06 or less.

23. The method according to claim 17, wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line when charged with a lithium metal counter electrode at 25° C. and at 4.6 V.

24. The method according to claim 17, wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKal line when charged with a lithium metal counter electrode, wherein the charging is performed at 25° C. by CCCV charge, wherein the CCCV charge is performed at a current value of 0.5C and a voltage of 4.6V with a termination current of 0.01C, and wherein 1C is set to 137 mA/g.

25. The method according to claim 24, wherein, for the charging, 1 mol/L lithium hexafluorophosphate is used as an electrolyte, a mixture of ethylene carbonate and diethyl carbonate at a volume ratio of 3:7 and vinylene carbonate at 2 wt % is used as an electrolyte solution, and 25-μm-thick polypropylene is used as a separator.

26. The method according to claim 17, wherein the surface portion of the positive electrode active material particle is a region from a surface of the positive electrode active material particle to a depth of 10 nm.

27. The method according to claim 17, wherein lithium carbonate is used as the lithium source, cobalt oxide is used as the cobalt source, lithium fluoride is used as the lithium source and the fluorine source, and magnesium oxide is used as the magnesium source.

28. The method according to claim 17, wherein lithium carbonate is used as the lithium source, cobalt oxide is used as the cobalt source, lithium fluoride is used as the lithium source and the fluorine source, and magnesium fluoride is used as the magnesium source and the fluorine source.

29. The method according to claim 17,
wherein fluorine of the fluorine source is segregated at the surface portion of the positive electrode active material particle by the second heating on the composite oxide.

30. The method according to claim 17,
wherein the compound comprising lithium and fluorine comprises lithium fluoride.

31. A method for manufacturing a lithium-ion secondary battery comprising a positive electrode, a negative electrode, and an electrolyte, the positive electrode comprising a positive electrode active material, the positive electrode active material comprising a positive electrode active material particle, the method comprising the steps of:
forming a mixture by mixing a lithium source, a cobalt source, a magnesium source, and a fluorine source;
performing a first heating on the mixture to form a lithium cobalt oxide comprising magnesium and fluorine, wherein the first heating is performed at a temperature higher than or equal to 800° C. and lower than 1100° C.;
coating a surface of the lithium cobalt oxide with a material comprising at least one of aluminum and titanium; and
performing a second heating on the coated lithium cobalt oxide to form the positive electrode active material particle, wherein the second heating performed at a temperature higher than or equal to 700° C. and less than or equal to 920° C.,
wherein the mixture comprises a magnesium compound and a compound comprising lithium and fluorine,
wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line when charged with a lithium metal counter electrode,
wherein the charging is performed at 25° C. by CCCV charge,
wherein the CCCV charge is performed at a current value of 0.5C and a voltage of 4.6V with a termination current of 0.01C, and
wherein 1C is set to 137 mA/g.

32. The method according to claim 31, wherein, in an EDX linear analysis of the positive electrode active material particle, a peak of an aluminum concentration is in a region deeper than a peak of a magnesium concentration.

33. The method according to claim 31, wherein lithium carbonate is used as the lithium source, cobalt oxide is used as the cobalt source, lithium fluoride is used as the lithium source and the fluorine source, and magnesium oxide is used as the magnesium source.

34. The method according to claim 31, wherein lithium carbonate is used as the lithium source, cobalt oxide is used as the cobalt source, lithium fluoride is used as the lithium source and the fluorine source, and magnesium fluoride is used as the magnesium source and the fluorine source.

35. The method according to claim 31,
wherein, for the charging, 1 mol/L lithium hexafluorophosphate is used as an electrolyte, a mixture of ethylene carbonate and diethyl carbonate at a volume ratio of 3:7 and vinylene carbonate at 2 wt % is used as an electrolyte solution, and 25-μm-thick polypropylene is used as a separator.

36. The method according to claim 31,
wherein the compound comprising lithium and fluorine comprises lithium fluoride.

37. A method for manufacturing a lithium-ion secondary battery comprising a positive electrode, a negative electrode, and an electrolyte, the positive electrode comprising a positive electrode active material, the positive electrode active material comprising a positive electrode active material particle, the method comprising the steps of:
mixing a lithium source, a cobalt source, a magnesium source, and a fluorine source to form a mixture;
performing a first heating on the mixture to form a composite oxide; and
performing a second heating on the composite oxide,
wherein a temperature of the second heating is lower than a temperature of the first heating,
wherein the positive electrode active material comprises a crystal grain boundary,
wherein magnesium of the magnesium source is segregated at the crystal grain boundary and a vicinity of the crystal grain boundary, and
wherein the mixture comprises a magnesium compound and a compound comprising lithium and fluorine.

38. The method according to claim 37, wherein the magnesium compound comprises magnesium oxide.

39. The method according to claim 37, wherein the magnesium compound comprises magnesium fluoride.

40. The method according to claim 37, wherein the temperature of the first heating is higher than or equal to 800° C. and lower than 1100° C.

41. The method according to claim 37,
wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line in a charged state, and
wherein the positive electrode active material has a property that the positive electrode active material comprises an O3 crystal structure in a discharged state.

42. The method according to claim 37,
wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line when a charged depth is 0.8 or greater, and
wherein the positive electrode active material has a property that the positive electrode active material comprises an O3 crystal structure when a charge depth is 0.06 or less.

43. The method according to claim 37,
wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line when charged with a lithium metal counter electrode at 25° C. and at 4.6 V.

44. The method according to claim 37,
wherein the positive electrode active material has a property that an X-ray diffraction pattern of the positive electrode active material has at least a first diffraction peak at 2θ of 19.30±0.20° and a second diffraction peak at 2θ of 45.55±0.10°, as analyzed by powder X-ray diffraction with a CuKα1 line when charged with a lithium metal counter electrode, wherein the charging is performed at 25° C. by CCCV charge, wherein the CCCV charge is performed at a current value of 0.5C and a voltage of 4.6V with a termination current of 0.01C, and wherein 1C is set to 137 mA/g.

45. The method according to claim 44, wherein, for the charging, 1 mol/L lithium hexafluorophosphate is used as an electrolyte, a mixture of ethylene carbonate and diethyl carbonate at a volume ratio of 3:7 and vinylene carbonate at 2 wt % is used as an electrolyte solution, and 25-μm-thick polypropylene is used as a separator.

46. The method according to claim 37, wherein the vicinity of the crystal grain boundary is a region of 10 nm from the crystal grain boundary.

47. The method according to claim 37, wherein lithium carbonate is used as the lithium source, cobalt oxide is used as the cobalt source, lithium fluoride is used as the lithium source and the fluorine source, and magnesium oxide is used as the magnesium source.

48. The method according to claim 37, wherein lithium carbonate is used as the lithium source, cobalt oxide is used as the cobalt source, lithium fluoride is used as the lithium source and the fluorine source, and magnesium fluoride is used as the magnesium source and the fluorine source.

49. The method according to claim 37, wherein the compound comprising lithium and fluorine comprises lithium fluoride.

* * * * *